US012771612B2

(12) United States Patent
Somasundaram et al.

(10) Patent No.: US 12,771,612 B2
(45) Date of Patent: Oct. 20, 2026

(54) ARTIFICIAL INTELLIGENCE TECHNIQUES FOR CONNECTIONS NETWORKING

(71) Applicant: Microsoft Technology Licensing, LLC, Redmond, WA (US)

(72) Inventors: Lakshman Vairavan Somasundaram, San Francisco, CA (US); Arvind Murali Mohan, Sunnyvale, CA (US); Adam Jason Kaplan, Brooklyn, NY (US); Nicholas Theodore Pezarro, San Francisco, CA (US); Xincen Yu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 18/758,052

(22) Filed: Jun. 28, 2024

(65) Prior Publication Data

US 2025/0337653 A1 Oct. 30, 2025

Related U.S. Application Data

(60) Provisional application No. 63/640,078, filed on Apr. 29, 2024.

(51) Int. Cl.
*G06F 15/173* (2006.01)
*H04L 41/12* (2022.01)
(Continued)

(52) U.S. Cl.
CPC .............. *H04L 41/12* (2013.01); *H04L 41/16* (2013.01); *H04L 67/131* (2022.05)

(58) Field of Classification Search
CPC ........ H04L 41/12; H04L 41/16; H04L 67/131
See application file for complete search history.

(56) References Cited

U.S. PATENT DOCUMENTS 9,558,242 B2 * 1/2017 Stuttle ............... G06F 16/24578
2023/0325735 A1 * 10/2023 Torstensen ........... G06Q 10/101
705/7.17

FOREIGN PATENT DOCUMENTS

CN 115487508 A 12/2022

OTHER PUBLICATIONS

Roth, Daniel., "Bringing Professionals Together with Games", accessed on link https://www.linkedin.com/pulse/bringing-professionals-together-games-daniel-roth-mxnfe/, May 1, 2024, 5 pages.

(Continued)

*Primary Examiner* — Padma Mundur
(74) *Attorney, Agent, or Firm* — KDW Firm PLLC

(57) ABSTRACT

Artificial intelligence techniques for connections networking are described. In one embodiment, for example, a method comprises receiving a natural language query to group a set of entities by a first machine learning model trained on a public dataset, generating a set of entity groups by the first machine learning model based on the natural language query and the set of entities, generating a set of connections entity groups based on the set of entity groups by a second machine learning model trained on a private dataset, selecting a member identifier (ID) representing a member of a connections networking system associated with an entity from a connections entity group of the set of connections entity groups, and sending a recommendation for a networking service to an electronic device based on the member ID. Other embodiments are described and claimed.

20 Claims, 27 Drawing Sheets

(51) Int. Cl.
*H04L 41/16* (2022.01)
*H04L 67/131* (2022.01)

(56) References Cited

OTHER PUBLICATIONS

International Search Report and Written Opinion received for PCT Application No. PCT/US2025/023767, mailed on Jul. 11, 2025, 11 pages.

* cited by examiner

ARTIFICIAL INTELLIGENCE TECHNIQUES FOR CONNECTIONS NETWORKING

This application claims the benefit of and priority to previously filed U.S. Provisional Patent Application Ser. No. 63/640,078, filed Apr. 29, 2024, entitled "ARTIFICIAL INTELLIGENCE TECHNIQUES FOR CONNECTIONS NETWORKING", which is hereby incorporated by reference in its entirety.

BACKGROUND

A social networking system is an online platform where connections can create profiles, connect with friends, family, and colleagues, and share various types of content such as photos, videos, and status updates. These platforms often offer features like messaging, groups, events, and news feed to keep connections engaged and connected. connections networking systems facilitate communication, networking, and content sharing among connections, creating a digital community where people can interact and engage with others in their social circle or with like-minded individuals. Similarly, a connections networking system allows individuals to connect with colleagues, potential employers, and other professionals in their industry. It is geared towards professional networking, job searching, and recruiting. Professionals can create a profile showcasing their work experience, skills, and education, as well as connect with others in their field. Connections networking systems also provide a platform for sharing content, participating in discussions, and accessing industry news and insights.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Overview

Figure 1:
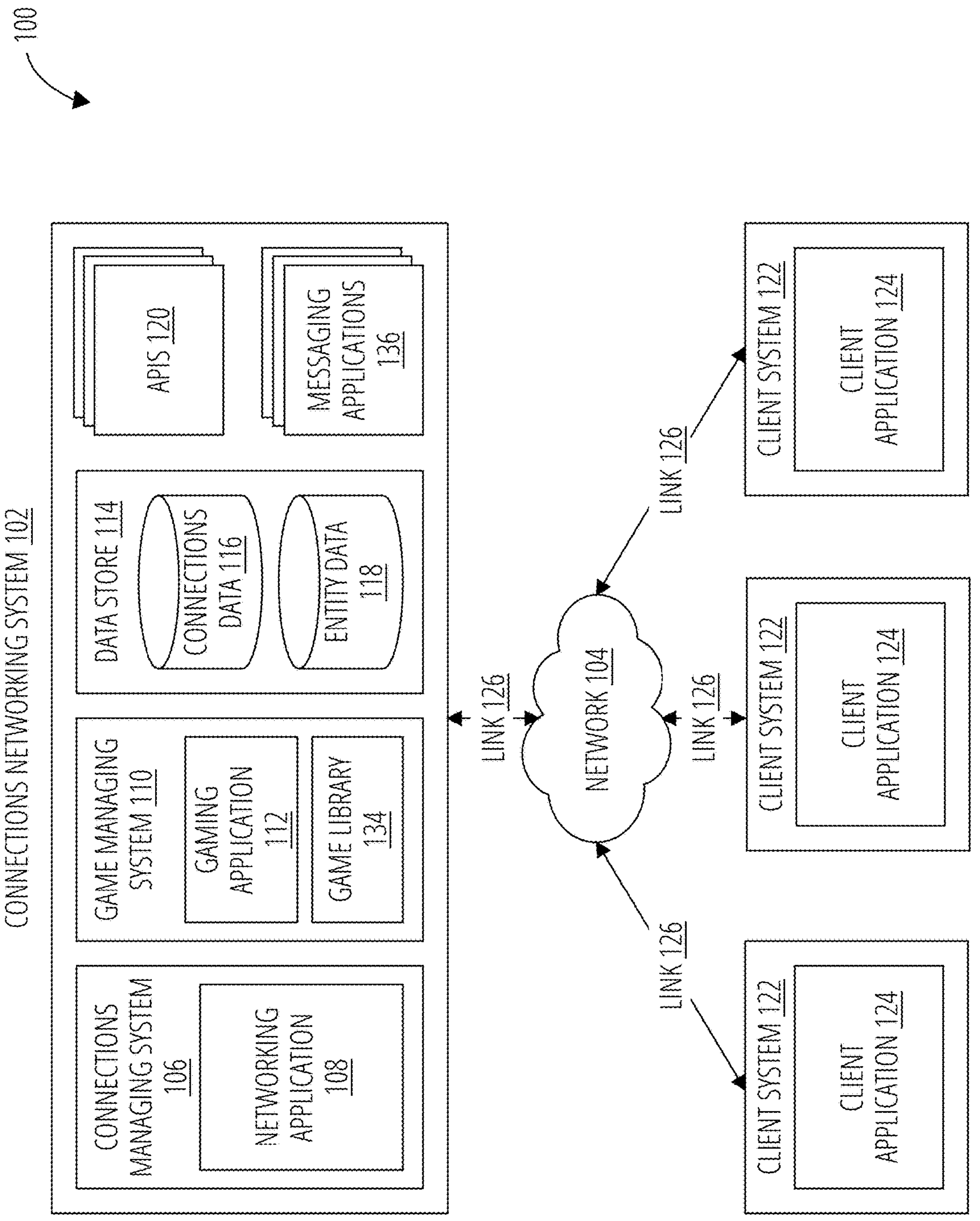
FIG. 1 illustrates a network environment in accordance with one embodiment.

Embodiments are generally directed to a connections networking system. Example methods, systems, and computer programs are directed to artificial intelligence (AI) and machine learning (ML) techniques to support applications and/or services provided by a connections networking system. In one innovation, the disclosed system encompasses an AI framework designed to optimize the categorization and connectivity of users and entities associated with an online connections networking system.

In various embodiments, the AI system incorporates an advanced computing apparatus equipped with specialized circuitry and memory to store executable instructions. Once these instructions are activated by system circuitry, a series of AI-driven processes are initiated. The first of these processes involves system engagement with a natural language query. Utilizing a first machine learning model that has been comprehensively trained on a public dataset, such as a large language model (LLM), the system interprets the query to categorize a collection of entities into distinct entity groups. This categorization is not merely based on superficial indicators but is deeply informed by the nuanced understanding the model has gained through its extensive training. Moving beyond a single grouping phase, the AI system engages in a second grouping phase that leverages a second machine learning model. The second machine learning model, such as an LLM, is refined through training on a private dataset maintained by the connections networking system. The second machine learning model is trained to generate a network of intricate connections among the previously identified entity groups to form a set of connections entity groups. It achieves this by parsing the unique characteristics and relationships in the entity groups, introducing a new dimension of connectivity analysis. In some embodiments, the first machine learning model and/or the second machine learning model implements multiple LLMs in a generative-critique iterative process.

Once the connections entity groups are formed, the AI system uses an identification algorithm to select a specific member identifier (ID) representing a member (e.g., a person or user) of the connections networking system associated with one or more connections entity groups. The member ID serves as a digital representation of an individual's membership within a larger network of connections, pinpointing their position within the complex web of member and entity relationships. The AI system then generates a personalized networking service recommendation. The recommendation is directly informed by the insights gained through the selection of the member ID and the formation of the entity groups, ensuring that they are both relevant and valuable to the recipient. In one embodiment, for example, the recommendation is associated with an online electronic game offered by the connections networking system, such as playing a game, inviting others to play the game, joining a team or league, establishing or renewing relationships with other members and entities, fostering friendly competition between members or entities, promoting brand awareness, job applications, generating content, and other networking services offered by the connections networking system. By dispatching these tailored suggestions to an electronic device associated with the member ID, the AI system completes its objective of enhancing networking efficacy, all while maintaining a seamless and intuitive user experience.

Overview

Embodiments are generally directed to a connections networking system. Some embodiments are particularly directed to AI and ML techniques to support applications and/or services provided by a connections networking system. Examples of applications and/or services include gaming applications and/or gaming services to generate and manage one or more games for members (e.g., users, individuals or persons) of the connections networking system. The gaming applications are designed to generate and manage game play of a game to increase interaction and engagement between a member and applications and/or services offered by the connections networking system, or between different members of the connections networking system to form or strengthen connections (e.g., relationships) between members. In one embodiment, for example, an AI system utilizes various ML models to perform downstream tasks such as grouping entities (e.g., teams) for gaming applications, recommending players from the grouped entities to play a game provided by the gaming applications, and ranking scores for players or entities in leaderboards for the gaming applications to foster competitiveness or rivalries between entities. One purpose of the gaming applications is to create, reignite and deepen relationships through games. Members can view games played by other connections in their network, challenge connections to beat high scores, post scores directly into a network feed, post a game edition identifier to let connections know recent or real-time scores, quickly navigate between games, promote healthy competition among members and teams, promote company brands, take advantage of products and/or services offered by a connections networking system, and other benefits or advantages provided by the gaming applications and/or connections networking system. Although exemplary embodiments are described in connection with a particular AI system or an ML model, the principles described herein can also be applied to other types of AI systems and ML models as well. Embodiments are not limited in this context.

In general, a connections networking system is an online system that provides a set of software applications designed to connect individuals and organizations across various industries globally. It serves as an online space for professionals to create a profile that highlights their job experience, skills, education, and professional interests. The profiles may also include demographic information, communication-channel information, relationship information, and other information associated with a user. The connections networking system allows users to connect with one another, share updates, publish articles, and search for job opportunities. Additionally, it offers companies the ability to post job listings, promote their brand, and share industry-related news. A connections networking system facilitates professional networking, career development, and industry collaboration, making it a valuable tool for individuals and businesses to expand their professional network and opportunities.

The connections networking system may send content or messages related to its services to a mobile device, desktop device, or other computing device associated with a user. A user may also install software applications on a mobile device, a desktop device, or other computing device of the user for accessing a user profile of the user and other data within the connections networking system. The connections networking system may generate a personalized set of content objects to display to a user, such as a newsfeed of aggregated stories of other users connected to the user, recommendations for jobs, targeted advertisements, and other networking services.

The connections networking system may maintain a connections graph representing relationships between users of the communications networking system. Applying network theory, the connections graph represents user relationships as a set of nodes and edges. Nodes represent the individual actors within the networks, such as members of the connections networking system. Edges between nodes represent relationships between the actors. This often results in a complex graph-based structure that may serve as dense features for an ML model to make various predictions, such as recommending job openings to members or serving computational advertisements. There can be many types of nodes and many types of edges for connecting nodes. In its simplest form, a connections graph is a map of all of the relevant edges between all the nodes being studied.

The connections networking system may offer one or more online games. An online game is a game that is either partially or primarily played by one or more users who communicate through the Internet or other data communication protocols. Conventional online game sessions are hosted or managed by a game server, which is typically one or more dedicated computers managed by the connections networking system. Users typically initiate online game sessions by directly accessing a web page of the connections networking system via a web browser executing on a client device. Alternatively, client applications executing on client systems or console games may communicate with a server of the connections networking system to exchange in game play, obtain scores for games, provide game updates, and so forth.

Gaming platforms, which may be hosted by a separate online system or integrated with a connections networking system via a set of application programming interfaces (APIs), have become a useful way to host various online games that users can engage in playing over a network. Users can access a gaming platform through their client systems. The gaming platform may enable a user to play a game either independently or in collaboration with one or more other users. The gaming platform has a potential to engage users in online games and to enhance their gameplay experience.

In normal operation, a client system may access a game through a graphical user interface (GUI) of a client application rendered by an operating system (OS) executing on the client system, or a GUI of a website rendered by a web browser executing on the client system, or a gaming console. The user may select, via the GUI, the game from a list of games presented on the GUI. Once the user selects a game, the client system may execute a gaming protocol associated with the selected game. The gaming protocol may include instructions for coordinating in-game actions through API calls to a gaming server. In some cases, the gaming protocol may prompt the generation of a game container in a layer of a communication interface, such as a messaging application or a mobile application. The game container may contain the selected game in a partial-screen view or full-screen view of the GUI on an electronic display of the client system.

Conventional gaming platforms are deficient in a number of different ways. For example, a conventional gaming platform offers gaming services using conventional programming techniques. Conventional programming relies on explicit algorithms defined by programmers. This approach works well for problems with clear rules and logic but struggles with tasks that involve complex patterns or data structures that are difficult to articulate with rule-based logic. Further, conventional software does not inherently learn from new data. Once a program is written, its behavior remains static unless it is explicitly updated by developers. In addition, developers often need to perform manual feature engineering, which involves identifying and selecting the specific pieces of data that will be used to make decisions. This process can be extremely time-consuming and requires intimate domain knowledge. Still further, traditional software approaches can become unwieldy when dealing with high-dimensional data or when trying to model interactions between a large number of variables. Conventional programming typically requires that logic and knowledge be explicitly coded into the program. This is a limitation when dealing with problems where knowledge is difficult to articulate or when the logic is too complex. Further, developing conventional software to solve complex problems can require significant time and expertise to encode specific algorithms and logic. Additionally, maintaining and updating this codebase can be resource-intensive, especially as systems grow in complexity.

To solve these and other challenges, embodiments are generally directed to an improved gaming system using a model architecture suitable to support downstream prediction tasks for networking platforms, such as those used by connections networking systems and/or social networking systems. Examples of downstream prediction tasks may include generating predictions, suggestions or inferences for network services offered by networking platforms, such as gaming services, ranking services, recommendation services, content delivery services, networking application services, software as a service, and other types of networking operations. The AI system makes deployment of networking services more practical in large-scale industrial settings. Further, the AI system provides more accurate and precise predictions for downstream prediction tasks to support networking services, thereby allowing networking platforms to provide improved networking services and more value to their members.

Some embodiments use AI and ML techniques to support gaming applications and/or services to generate and manage one or more games for members or users of the connections networking system. Networking platforms, such as social networking systems and connections networking systems, often use AI and ML for various downstream tasks, such as providing recommendations, targeted advertising, and serving content. In one embodiment, for example, an AI system may use one or more ML models to support a gaming platform hosted by a connections networking system. Specifically, the AI system may use one or more ML models for various operations or services of the gaming platform, such as identifying one or more entities associated with members or players of the connections networking system, grouping related entities to form teams, recommending players of the related entities having common characteristics to play a game either alone or in teams, forming players of one or more entities into player groups, scoring games for players and/or player groups, dynamically updating leaderboards with real-time scores for player groups, and other downstream tasks. Further, the AI system typically implements ML models for a ranking system or recommendation system to support such services.

In one embodiment, for example, the AI system uses ML models specifically trained on a combination of public data sources and private data sources. Examples of private data sources may include without limitation member data, connections data, or entity data collected by the connections networking system to support gaming applications hosted by the connections networking system. For example, the AI system may use a connections graph and/or an entity graph for a connections networking system. A connections graph often stores a wealth of information about its members, such as their industry, current jobs, previous job history, web site interactions, varying levels of connections to other members, demographics, education, interests, accomplishments, organization affiliations, conferences, and so forth. An entity graph stores information about entities that are members of a connections networking system. An ML model can potentially use this information as features for a prediction task, such as recommending games, players, player groups, entity groups, updating leaderboards for scores, and other gaming services.

In one embodiment, for example, a connections networking system may implement an AI system that uses a dual-model architecture to improve a quality and accuracy of predictions. Specifically, the AI system uses multiple ML models, such as Large Language Models (LLMs), to generate and then check or critique a result to enhance a quality, accuracy, or creativity of the output. For example, a first LLM receives a prompt or instruction from a user. This can be a question, a task to generate text (like a story, code, or a design specification), or any request for information. Based on its trained knowledge and algorithms, the first LLM processes the input to understand the task and generates an output that addresses the prompt. This output is essentially the model's best attempt to fulfill the request given its understanding and training data. The output generated by the first LLM is then passed to the second LLM, which acts as a reviewer, critic, or checker. This second LLM has been trained or is tasked to analyze, critique, or evaluate the output based on specific criteria such as accuracy, logic, ethical considerations, adherence to guidelines, or creativity. The second LLM processes the received output, examining it for any issues or areas where it might be improved. It checks against its own training data, rules, or guidelines, depending on its designed purpose. After review, the second LLM generates feedback, corrections, or a critique of the first LLM's output. This might include suggestions for improvement, identification of errors or biases, or alternative approaches to the task. In some setups, the feedback from the second LLM can be fed back to the first LLM for it to learn from its mistakes or to adjust the output accordingly. Alternatively, the feedback might be presented to a human user for consideration and manual adjustment of the output. This collaborative process leverages the strengths of both models, where the first focuses on creation and generation based on the request, and the second on critical evaluation and improvement. It is used to improve the reliability, accuracy, and quality of the final output, ensuring that it meets specific standards or criteria. Such a setup can be particularly useful in applications requiring high levels of accuracy, creativity, and adherence to complex guidelines, as in supporting gaming services for a connections networking system. Other embodiments are described and claimed.

An AI system using these and other model advancements overcome various technical challenges of conventional systems, such as diminishing returns, overfitting, divergence, different gains across applications, and other technical challenges. Further, the AI system may quickly determine which set of features improve accuracy for a given prediction task. As previously discussed, connections networking system may store a wealth of information about its members, such as their industry, current jobs, previous job history, web site interactions, varying levels of connections to other members, demographics, education, interests, accomplishments, organization affiliations, conferences, and so forth. An ML model can potentially use this information as features for a prediction task, such as predicting custom content for a feed, advertisements, job recommendations, article recommendations, connections, and other networking services. The AI system may effectively and efficiently learn which of these features, or combination of features, actually improve accuracy for a given prediction task. Further, the AI system can operate at web-scale for large cloud-based production systems used by connections networking systems. In addition, the AI system may support ranking systems for serving content, providing game recommendations, player recommendations, entity recommendations, job recommendations, performing feed ranking, serving targeted advertising, predicting advertising, and other types of networking platform services to engage and provide value to members.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED EMBODIMENTS

FIG. 1 illustrates an example network environment 100 associated with a connections networking system 102. Network environment 100 includes a connections networking system 102 and one or more client systems 122 connected to each other by a network 104.

This disclosure contemplates any suitable network 104. As an example and not by way of limitation, one or more portions of a network 104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 104 may include one or more networks 104.

Links 126 may connect each client system 122 to the connections networking system 102 via the network 104. This disclosure contemplates any suitable link 126. In particular embodiments, one or more links 126 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 126 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 126, or a combination of two or more such links 126. Links 126 need not necessarily be the same throughout a network environment 100. One or more first links 126 may differ in one or more respects from one or more second links 126.

In particular embodiments, a client system 122 may be an electronic device including hardware, software, or embedded logic components or a combination of two or more such components and capable of carrying out the appropriate functionalities implemented or supported by a client system 122. As an example and not by way of limitation, a client system 122 may include a computer system such as a desktop computer, notebook or laptop computer, netbook, a tablet computer, e-book reader, global positioning system (GPS) device, camera, personal digital assistant (PDA), handheld electronic device, cellular telephone, smartphone, wearable device, other suitable electronic device, or any suitable combination thereof. This disclosure contemplates any suitable client systems 122. A client system 122 may enable a network user at a client system 122 to access a network 104. A client system 122 may enable its user to communicate with other users at other client systems 122, such as via messaging applications 136.

In particular embodiments, a client system 122 may include a client application 124, which may be a web browser, and may have one or more add-ons, plug-ins, or other extensions. A user at a client system 122 may enter a Uniform Resource Locator (URL) or other address directing a web browser to a particular server such as a server or server data center for the connections managing system 106 and/or the game managing system 110, and the web browser may generate a Hyper Text Transfer Protocol (HTTP) request and communicate the HTTP request to the server. The server may accept the HTTP request and communicate to a client system 122 one or more Hyper Text Markup Language (HTML) files responsive to the HTTP request. The client system 122 may render a web interface (e.g. a webpage) based on the HTML files from the server for presentation via an electronic display of the client system 122 to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as Asynchronous JAVASCRIPT (AJAX), and XML), and the like. Herein, reference to a web interface encompasses one or more corresponding source files (which a browser may use to render the web interface) and vice versa, where appropriate.

In particular embodiments, the client application 124 may be an application operable to provide various computing functionalities, services, and/or resources, and to send data to and receive data from the other entities of the network 104, such as the connections networking system 102 and/or the game managing system 110. For example, the client application 124 may be a connections networking application, a messaging application for messaging with users of a messaging network/system, a gaming application, an internet searching application, and so forth.

In particular embodiments, the client application 124 may be storable in a memory and executable by a processor of the client system 122 to render user interfaces, receive user input, send data to and receive data from the connections networking system 102. The client application 124 may generate and present user interfaces to a user via a display of the client system 122. For example, the client application 124 may generate and present user interfaces based at least in part on information received from the connections networking system 102 and/or the game managing system 110 via the network 104.

In particular embodiments, the connections networking system 102 may be a network-addressable computing system that can host a connections network. The connections networking system 102 may generate, store, receive, and send connections networking data, such as, for example, user-profile data, concept-profile data, connection-graph information, or other suitable data related to the online connection network. The connections networking system 102 may be accessed by the other components of network environment 100 either directly or via a network 104. As an example and not by way of limitation, a client system 122 may access the connections networking system 102 using the client application 124, which may be a web browser or a native application associated with the connections networking system 102 (e.g., a mobile connections networking application, another suitable application, or any combination thereof) either directly or via a network 104.

In particular embodiments, the connections networking system 102 may include a connections managing system 106. The connections managing system 106 may be a server application hosted on a computing server device for managing the online connections network hosted on the connections networking system 102. The connections managing system 106 may comprise one or more physical servers or virtual servers hosting one or more networking applications 108. The servers may comprise a unitary server or a distributed server spanning multiple computers or multiple data centers. In particular embodiments, the connections managing system 106 may include hardware, software, or embedded logic components or a combination of two or more such components for carrying out the appropriate functionalities implemented or supported by connections managing system 106. Although the connections managing system 106 is shown with a single networking application 108, it should be noted that this is not by any way limiting and this disclosure contemplates any number of networking applications 108.

In particular embodiments, the connections networking system 102 may include a data store 114. The data store 114 may be used to store various types of information. In particular embodiments, the information stored in the data store 114 may be organized according to specific data structures. In particular embodiments, the data store 114 may be a relational, columnar, correlation, or other suitable database. Although this disclosure describes or illustrates particular types of databases, this disclosure contemplates any suitable types of databases. Particular embodiments may provide interfaces that enable a client system 122 or a connections networking system 102 to manage, retrieve, modify, add, or delete, the information stored in the data store 114.

In particular embodiments, the connections networking system 102 may store connections data 116 for one or more users of the connections networking system 102. In one embodiment, for example, the connections data 116 may be organized as a connections graph in the data store 114. In particular embodiments, a connections graph may include multiple nodes, which may include multiple user nodes each corresponding to a particular user or multiple concept nodes each corresponding to a particular concept, and multiple edges connecting the nodes. The connections networking system 102 may provide users of the online connections network the ability to communicate and interact with other users. In particular embodiments, users may join the online connections network via the connections networking system 102 and then add connections (e.g., relationships) to a number of other users of the connections networking system 102 to whom they want to be connected. Herein, the term "connection" may refer to any other user of the connections networking system 102 with whom a user has formed a friendship, association, or relationship via the connections networking system 102.

In particular embodiments, the connections networking system 102 may provide users with the ability to take actions on various types of items or objects, supported by the connections networking system 102. As an example and not by way of limitation, the items and objects may include groups or connections networks to which users of the connections networking system 102 may belong, events or calendar entries in which a user might be interested, computer-based applications that a user may use, transactions that allow users to apply to job openings or post job openings via the service, interactions with advertisements that a user may perform, or other suitable items or objects. A user may interact with anything that is capable of being represented in the connections networking system 102 or by an external system of a third-party system, which is separate from the connections networking system 102 and coupled to the connections networking system 102 via a network 104.

In particular embodiments, the connections networking system 102 also includes user-generated content objects, which may enhance a user's interactions with the connections networking system 102. User-generated content may include anything a user can add, upload, send, message, or "post" to the connections networking system 102. As an example and not by way of limitation, a user communicates posts to the connections networking system 102 from a client system 122. Posts may include data such as status updates or other textual data, articles, job openings, company information, awards, location information, photos, videos, links, music or other similar data or media. Content may also be added to the connections networking system 102 by a third-party through a "communication channel," such as a newsfeed or content stream.

In particular embodiments, the connections networking system 102 may include a variety of servers, sub-systems, programs, modules, logs, and data stores. In particular embodiments, the connections networking system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The connections networking system 102 may also include suitable components such as network interfaces, security mechanisms, load balancers, failover servers, management-and-network-operations consoles, privacy software, and other suitable components, or any suitable combination thereof.

In particular embodiments, the connections networking system 102 may include one or more user-profile stores for storing user profiles. A user profile may include, for example, biographic information, demographic information, behavioral information, social information, professional information, or other types of descriptive information, such as work experience, educational history, hobbies or preferences, interests, affinities, or location. Interest information may include interests related to one or more categories. Categories may be general or specific. A connection store may be used for storing connection information about users. The connection information may indicate users who have similar or common work experience, group memberships, hobbies, educational history, or are in any way related or share common attributes. The connection information may also include user-defined connections between different users and content (both internal and external).

A web server may be used for linking the connections networking system 102 to one or more of the client systems 122 via a network 104. The web server may include a mail server or other messaging functionality for receiving and routing messages between the connections networking system 102 and one or more client systems 122. An API-request server may allow a gaming platform, a third-party system, a messaging system, and/or a game managing system 110 to access information from the connections networking system 102 by calling one or more APIs 120. An action logger may be used to receive communications from a web server about a user's actions on or off the connections networking system 102. In conjunction with the action log, a third-party-content-object log may be maintained of user exposures to third-party-content objects. A notification controller may provide information regarding content objects to a client system 122. Information may be pushed to a client system 122 as notifications, or information may be pulled from a client system 122 responsive to a request received from a client system 122. Authorization servers may be used to enforce one or more privacy settings of the users of the connections networking system. A privacy setting of a user determines how particular information associated with a user can be shared. The authorization server may allow users to opt in to or opt out of having their actions logged by the connections networking system 102 or shared with other systems (e.g., a third-party system), such as, for example, by setting appropriate privacy settings. Third-party-content-object stores may be used to store content objects received from third parties, such as a third-party system. Location stores may be used for storing location information received from client systems 122 associated with users. Advertisement-pricing modules may combine connections information, the current time, location information, or other suitable information to provide relevant advertisements, in the form of notifications, to a user.

In particular embodiments, the connections networking system 102 may include a game managing system 110 to manage one or more gaming applications 112 to generate and manage one or more games. Similar to the connections managing system 106, the game managing system 110 may comprise one or more physical servers or virtual servers hosting one or more gaming applications 112. The servers may comprise a unitary server or a distributed server spanning multiple computers or multiple data centers. In particular embodiments, the game managing system 110 may include hardware, software, or embedded logic components or a combination of two or more such components for carrying out the appropriate functionalities implemented or supported by game managing system 110. Although the game managing system 110 is shown with a single gaming application 112, it should be noted that this is not by any way limiting and this disclosure contemplates any number of gaming applications 112.

The game managing system 110 may be a network-addressable computing system that can host an online gaming network. For instance, the game managing system 110 may enable users across the Internet to play a variety of games with each other or individually. The game managing system 110 may be accessed by one or more entities of the network environment 100 either directly or via the network 104. As an example and not by way of limitation, a messaging system may access the game managing system 110 by way of one or more APIs 120 (e.g., API calls). API calls may be handled by an API hander, such as an API handler.

In particular embodiments, the game managing system 110 may include a game library 134. The game library 134 may include a plurality of online games provided by the gaming applications 112 hosted on the game managing system 110. The game library 134 may include games categorized and/or grouped by their respective genres. For example, the game library 134 may include games grouped by action, adventure, racing, puzzle, etc. In some embodiments, the game library 134 is a data store that is accessible and/or modifiable by the game managing system 110. For instance, the game managing system 110 may be able to manage, retrieve, modify, add, or delete, the information stored in game library 134.

In particular embodiments, the game managing system 110 may be one of a web-based gaming platform that may be located on and is part of an online connections network itself accessible through a web browser, a desktop-based gaming platform that may integrate one or more connections networking features of the online connections network and may be running as a dedicated or standalone application on the client system 122 of a user, or a messaging-application-based gaming platform (also interchangeably referred to sometimes as a mobile platform or a mobile-based gaming platform) that may be integrated into messaging applications 136 of the online connections network where users may be able to play games with their connections or contacts via the messaging applications 136. For example, a user may play a game with another user within a message thread of the messaging application. In another example, a user may play a game with another user within a video chat of the messaging application.

Figure 2:
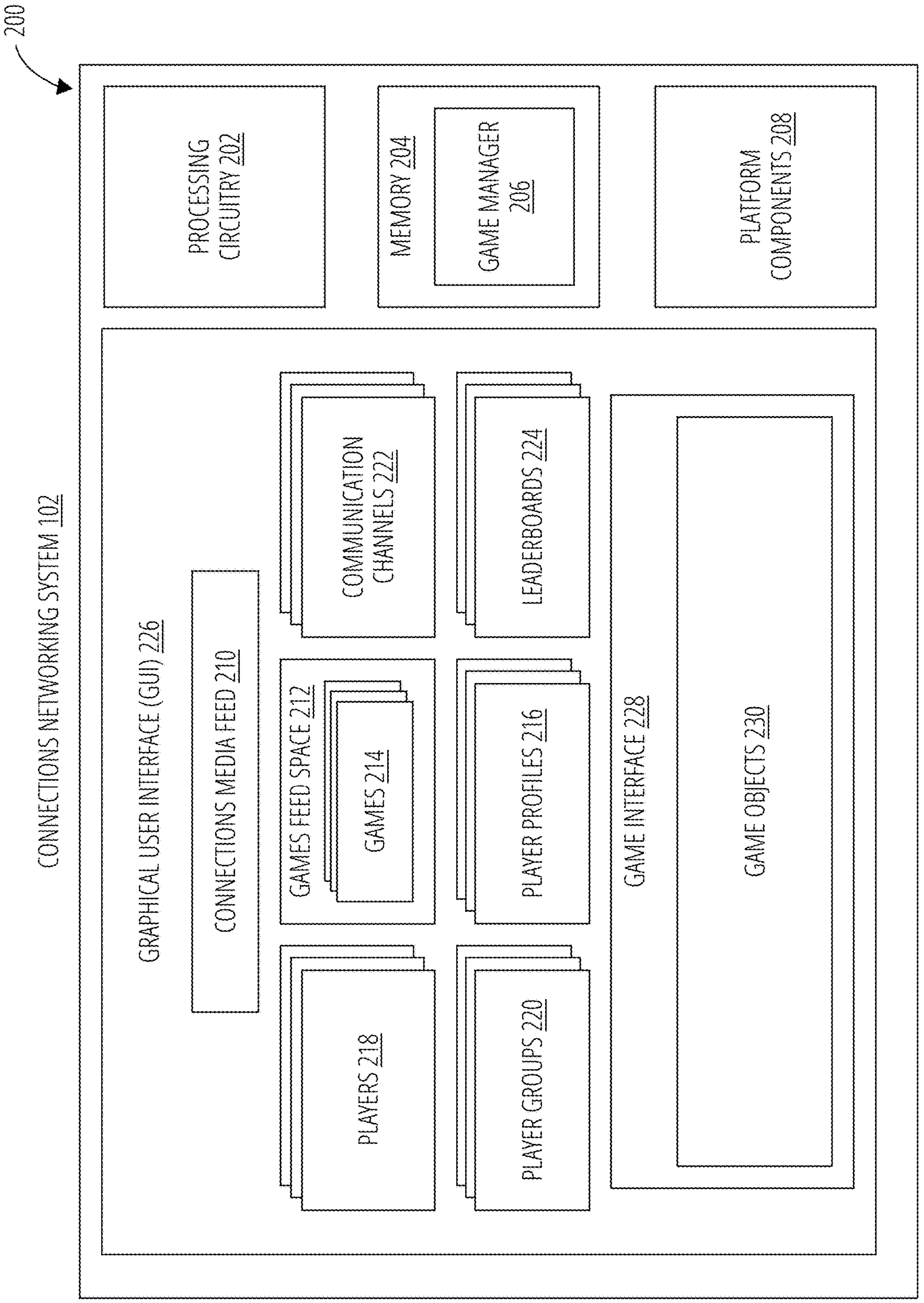
FIG. 2 illustrates connections networking system in accordance with one embodiment.

FIG. 2 illustrates an operating environment 200 for the connections networking system 102. As depicted in FIG. 2, the connections networking system 102 may comprise processing circuitry 202, a memory 204, and platform components 208. The memory 204 may store instructions, that when executed by the processing circuitry 202, causes the processing circuitry 202 to perform game management operations. For example, the processing circuitry 202 may execute instructions for a game manager 206 to perform game management operations, as described in more detail with reference to FIG. 4. The connections networking system 102 may further comprise various software elements and GUI elements to facilitate game play between users of the connections networking system 102, such as presented on a GUI 226.

The connections networking system 102 may present the GUI 226 via a web browser to a website hosting the connections networking system 102 or a GUI executing on a client application 124 of a client system 122. The GUI 226 may present various GUI objects, such as a connections media feed 210, a games feed space 212, links to games 214, players 218, player groups 220, communication channels 222, and leaderboards 224. The GUI 226 may also illustrate a game interface 228 with one or more game objects 230 associated with one or more games 214 executed by one or more gaming applications 112. The game interface 228 may comprise a full view or a partial view of the GUI 226, depending on a particular GUI control (e.g., a toggle button), a communication channel, a size of an electronic display of a client system 122, or a default setting.

The GUI 226 may present a set of player profiles 216 associated with the players 218. The game managing system 110 may use the player profiles 216 may organize the players 218 into player groups 220 as described further with reference to FIG. 3.

The game managing system 110 may execute one or more gaming applications 112 to generate and manage one or more games 214 that one or more players 218 can access and play, either alone as a single player or collectively as player groups 220 (e.g., leagues). For example, the game managing system 110 may provide a game library 134 containing the plurality of gaming applications 112 to players 218 and the players 218 can choose a desired one of the games 214 to play. There may be several ways that the players 218 may access the game managing system 110. For instance, the game managing system 110 may be a web-based platform that may be integrated as part of the connections networking system 102. In this case, links to various games may be present at some location on a GUI 226 of the connections networking system 102, such as the games feed space 212 or other portion of the GUI 226, for example. The user may click on a link associated with a particular game that may launch the gaming application 112 generating and managing that particular game within a web browser on the client system 122 of the user. The player profiles 216 has a handler to monitor for the click event. The gaming application 112 generates a game interface 228 to display one or more game objects 230 representing game play of games 214 on GUI 226.

Additionally or alternatively, the game managing system 110 may be a web-based platform that may be separate from the connections networking system 102. In this case, links to various games may be present at some location on a GUI 226 of the connections networking system 102, such as the games feed space 212, for example. The user may click on a link associated with a particular game that may generate an API call to launch the gaming application 112 generating and managing that particular game and present the game objects 230 within the game interface 228 of a web browser on the client system 122 of the user.

Additionally or alternatively, the game managing system 110 may initiate real-time games through one or more communication channels 222, such as in a video communications channel or a messaging channel such as a short messaging service (SMS) channel or a multimedia messaging service (MMS) channel provided by the messaging applications 136. For example, the client system 122 may initiate a game within a SMS, MMS, chat, and/or video communication between two or more users (e.g., a participant of the video communication). The video communication may be contained within a communication interface. As an example and not by way of limitation, a participant within a video chat may hit a button to initiate a game with another participant of the video chat. A protocol may be used to negotiate how to start the game with the other participant. As an example and not by way of limitation, the protocol may request whether the other participant would like to accept the game, pick a particular game, and/or adjust any settings for the game. The protocol may include instructions for coordinating in-game actions between the two or more participants, where game elements may be generated, where to put thumbnails of a video communication, and the like. Game containers may be generated within the communication interfaces on both devices (e.g., with a video chat application on the smartphones of the two participants) to display the game and immediately match (e.g., set the two participants into the same gaming session) the two participants together. By doing so, the matchmaking experience for finding people to play a game with may be improved by reducing the time to find another participant of a game (effectively reducing the time to zero). As an example and not by way of limitation, typically a participant may choose a game to play and after initiating a game session (e.g., online chess with another participant) the participant will wait in a queue to be matched to an appropriate player, which may be filtered through many different parameters (e.g., skill level, player location, player age, and the like). The initiation of a game session within the video chat eliminates this long process of matching a participant to another player of the game. After the game containers are generated, there may be an automatic transition from a full-screen view of the video communication to a thumbnail view of the video communication, with the game container taking over the screen (e.g., full screen view) of the participant's client system 122. As an example and not by way of limitation, if a participant in a video chat initiates a chess game with the other participant in a video chat, then the layer containing the video chat may be reduced in size from a full-screen view to a thumbnail view and positioned in a corner of the communication interface, and the chess game may be maximized to fit the screen of the participant's client system 122. Games may be selected, for example, from a "Games" tab or a list of games accessible from within the video communication. Although this disclosure describes initiating an activity within a video communication in a particular manner, this disclosure contemplates initiating an activity within a video communication in any suitable manner.

In particular embodiments, the client system 122 may execute a gaming protocol associated with the game. The client system 122 may execute a specific gaming protocol associated with the game the user selected. In particular embodiments, the client system 122 may execute a gaming protocol that includes instructions to coordinate in-game actions between the user of the client system 122 and another user of another client system 122 through API calls to the game managing system 110. In particular embodiments, the client system 122 may send a request to a second user to execute the gaming protocol associated with the game through game managing system 110. In particular embodiments, the client system 122 may receive a confirmation that the second user has executed the gaming protocol associated with the game. In particular embodiments, the gaming protocol may include settings to configure the game within the communication interface. As an example and not by way of limitation, the configurable settings may include the number of rounds played, difficultly level, and other settings associated with the game. In particular embodiments, the user of the client system 122 and the other users participating in the video communication may have user profiles that include gaming-moment information and user preferences for each user. As an example and not by way of limitation, the user profile of a user may include gaming-moment information, such as number of wins, high scores, and the like for a game and user preferences, such as video quality, audio volume, and the like. In particular embodiments, the client system 122 may match the users within the video communication to play the selected game. In particular embodiments, the client system 122 may compare one or more user preferences in the user profiles of each participant of the video communication to execute the gaming protocol. As an example and not by way of limitation, if a first user prefers to have three rounds for a game and a second user prefers to have five rounds for a game, the client system 122 may settle for the user preferences of the user who selected the game, make a compromise between the two user settings, or request a user which settings to implement. Although this disclosure describes executing a gaming protocol associated with a game in a particular manner, this disclosure contemplates executing a gaming protocol associated with a game in any suitable manner.

Figure 3:
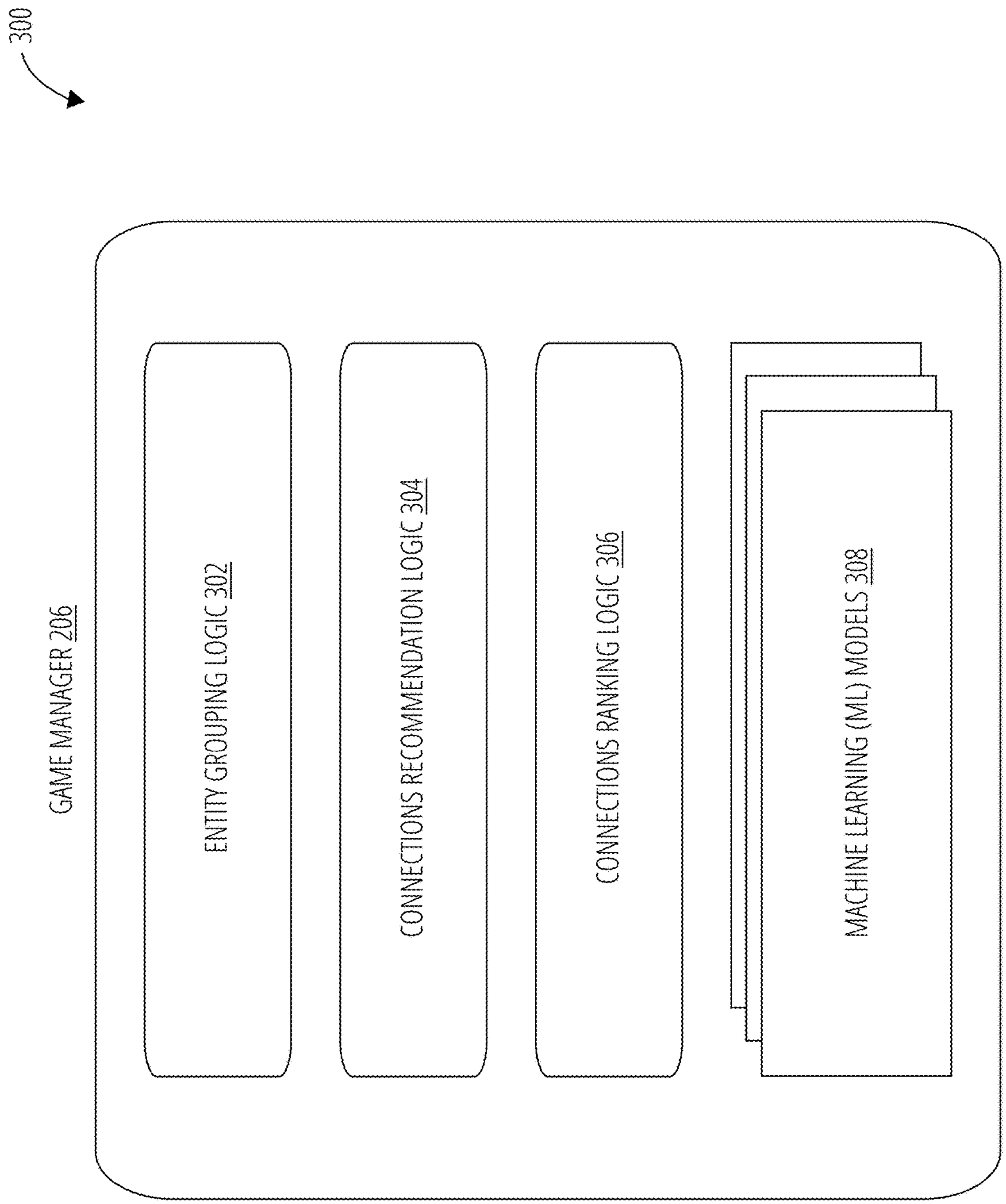
FIG. 3 illustrates game manager in accordance with one embodiment.

FIG. 3 illustrates an example a game manager 206 for the game managing system 110 of the connections networking system 102. The game manager 206 is a software application designed to implement various functionalities, features, and/or operations for the game managing system 110. Specifically, the game manager 206 manages execution of an entity grouping logic 302, a connections recommendation logic 304, and a connections ranking logic 306. Each of the applications may be implemented using one or more ML models 308.

The entity grouping logic 302 generally operates to categorize a list of entities into entity groups. An entity represents any organized collection of one or more individuals or persons that operates under specific legal frameworks, which govern their formation, operation, liability, and taxation. Examples of entities include, without limitation, sole proprietorships, partnerships, corporations, limited liability company (LLC), non-profit organization, cooperative (co-op), trust, joint venture, franchise, limited liability partnership (LLP), governmental agency, multinational corporation (MNC), and other entity types. Some embodiments use the term "company" as a representative entity type. However, embodiments are not limited to this example.

The entity grouping logic 302 automatically groups companies into entity groups using one or more ML models 308, thereby enabling efficient and accurate organization of companies into categories based on similarities in various attributes and metrics. The use of ML models 308 address the challenge of manually categorizing companies, which is time-consuming, prone to human error, and inefficient for large datasets. The demand for automated, accurate, and scalable methods for organizing companies into meaningful groups based on similarities has grown with the expansion of global business data.

The entity grouping logic 302 automatically groups companies into entity groups using the ML models 308 to process features derived from data collected on companies, including but not limited to, financial performance, industry classification, geographic location, product and service offerings, and market demographics. This process involves data collection, preprocessing, feature selection, model training, and application of the model for grouping. Example features may include industry codes, revenue size, number of employees, and geographic presence. The ML models 308 are trained utilizing a machine learning algorithm suitable for clustering or classification tasks, such as K-means clustering, hierarchical clustering, or neural networks, to learn the patterns in the data that indicate groupings. Once trained, the ML models 308 are applied to a dataset of companies to assign each company to a specific entity group based on similarities learned during the training phase. Performance of the ML models 308 is evaluated using appropriate metrics, such as silhouette score for clustering models, and adjustments to the ML models 308 are made as necessary to improve accuracy and effectiveness. An example for the entity grouping logic 302 is described with reference to FIG. 4.

The connections recommendation logic 304 generally operates to recommend players 218 to play one or more games 214 generated and managed by one or more gaming applications 112 to enhance a gaming experience for the players 218. In online games, player satisfaction can significantly depend on the quality of multiplayer interactions, including team composition and opponent matching. The challenge lies in effectively matching players 218 in a way that accounts for skill level, play style compatibility, and other factors that influence game enjoyment and fairness. In the context of a connections networking system 102, the connections recommendation logic 304 attempts to recommend players 218 from entities within a same entity group, as generated by the entity grouping logic 302. For example, assume a first player works for a company A operating in the autonomous car industry. The connections recommendation logic 304 may recommend a second player that works for company B operating in the same autonomous car industry or a closely-related industry, such as the robotics industry.

The connections recommendation logic 304 may also use one or more ML models 308 for player recommendation. This process may involve collecting comprehensive data on players 218 from the connections data 116, including but not limited to gameplay statistics, skill levels, preferred roles, play times, social connections within the game, current employment, previous employment, educational background, interests, hobbies, articles posted, articles consumed, companies followed, and so forth. The player data collection may be from the connections data 116, the player profiles 216, or analysis of the player collected data to identify each player's strengths, weaknesses, preferences, and overall style of play. The connections recommendation logic 304 may implement one or more ML models 308 trained using a machine learning-based matchmaking algorithm that considers player profiles 216, historical match outcomes, and specific game session criteria (e.g., game mode, team size) to recommend player matches. Techniques such as clustering (to group similar players) and classification (to predict match outcomes) may be employed. The player recommendations may be dynamically adjusted based on real-time data, such as current availability, recent performance trends, and changes in player preferences. The connections recommendation logic 304 may incorporate a feedback mechanism allowing players 218 to rate their match experience. The connections recommendation logic 304 uses this feedback to further refine the matchmaking algorithm and player profiling. An example of the connections recommendation logic 304 is described with reference to FIG. 8.

The connections ranking logic 306 generally operates to rank entities within one or more leaderboards 224. The connections ranking logic 306 may rank entities according to ranking data and different ranking algorithms, such as based on a combination of game scores and number of daily players, for example. The connections ranking logic 306 may dynamically update one or more leaderboards 224 as new ranking data is generated. The connections ranking logic 306 may implement various distributed database techniques to accelerate updates to the one or more leaderboards 224 across different geographic locations, such as North America, South America, Europe, Asia, Africa, and so forth. An example of the connections ranking logic 306 is described with reference to FIG. 12.

Figure 4:
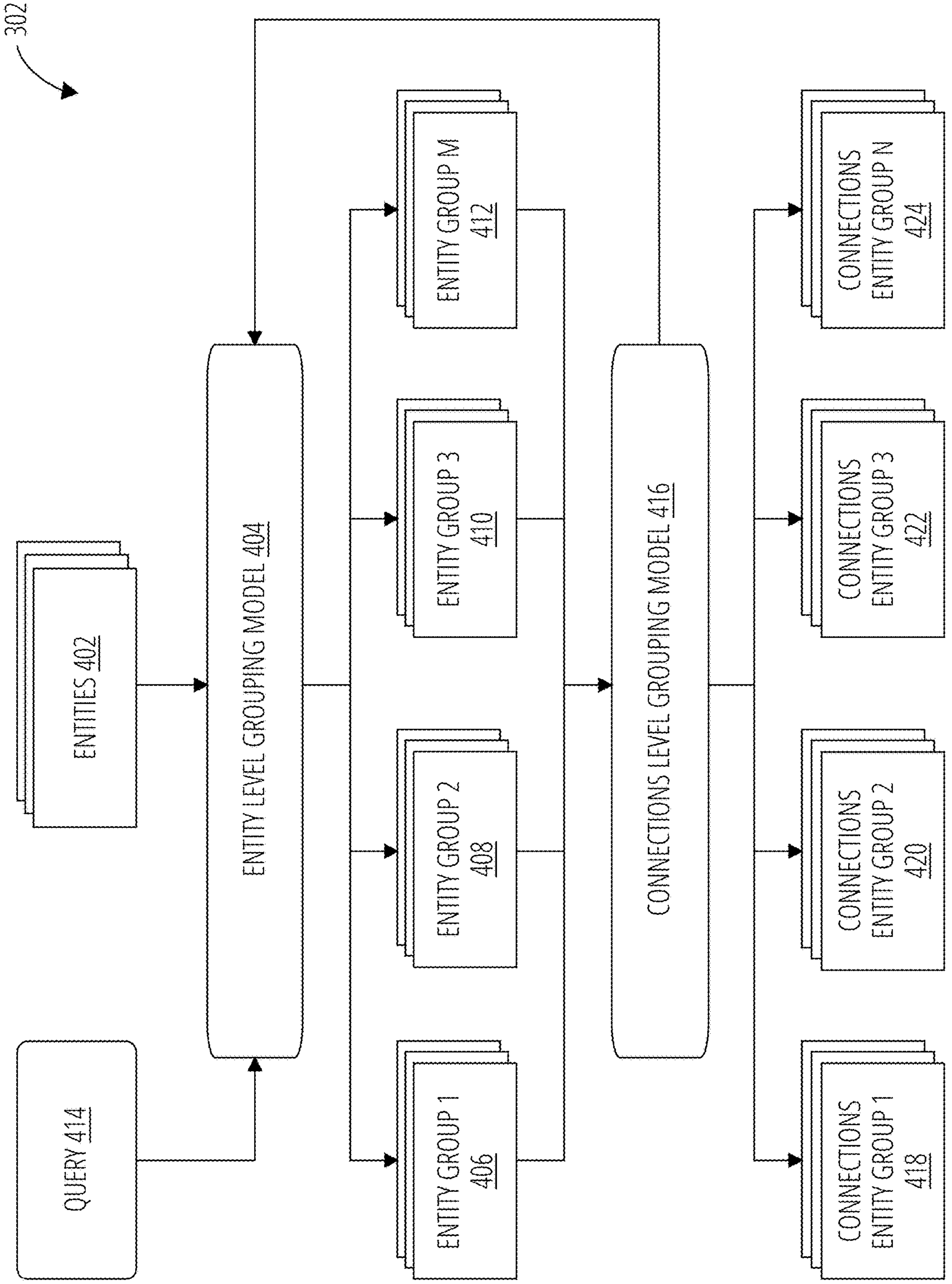
FIG. 4 illustrates an entity grouping logic in accordance with one embodiment.

FIG. 4 illustrates an example architecture or framework for an entity grouping logic 302. In one embodiment, for example, the entity grouping logic 302 implements two ML models 308 in sequence to categorize a list of entities into entity groups. For instance, the entity grouping logic 302 may implement an entity level grouping model 404 for entity grouping based on public data sources and a connections level grouping model 416 for entity grouping based on private data sources, such as connections data 116 associated with entities that are part of the eco-system for the connections networking system 102. In some cases, the ML models 308 may iteratively refine outputs until a terminating condition is reached, such as a number of epochs as defined by a hyperparameter, a score from a scoring algorithm used for the outputs reaches a defined threshold, a defined time period, a convergence score, or some other type of hyperparameter.

As depicted in FIG. 4, the entity level grouping model 404 of the entity grouping logic 302 receives as input a set of entities 402. The entity level grouping model 404 processes the set of entities 402 and outputs one or more entity groups 1 to M, such as entity group 1 406, entity group 2 408, entity group 3 410, and entity group M 412, where M represents any positive integer. Each entity group 1 to M may represent a set of two or more related entities.

In one embodiment, for example, the entity level grouping model 404 comprises a ML model such as a large language model (LLM) trained to generate the entity groups 1 to M. A LLM is a sophisticated form of artificial intelligence developed within the domain of machine learning, specifically designed to process, understand, and generate human language with a high degree of proficiency. These models are built on neural network architectures, particularly transformer models that excel in managing sequential data while ensuring efficient parallel processing. The distinctive feature of LLMs is their extensive number of parameters, often running into billions, allowing them to capture a wide array of linguistic nuances and patterns. This capability is cultivated through training on vast datasets comprising diverse text sources like books, articles, and digital content, enabling the models to learn a broad vocabulary and various styles of expression. The training regimen for LLMs involves presenting these datasets to the model, then iteratively adjusting its parameters to reduce discrepancies between its predictions and the actual data, a resource-intensive process that enhances the model's ability to generate contextually relevant and coherent text. As a result, LLMs possess remarkable text generation capabilities, delivering outputs that can rival those of human authors in terms of coherence, relevance, and sometimes even creativity. Beyond text generation, these models excel at language comprehension and analysis tasks, including summarization, language translation, question-answering, and sentiment analysis, making them invaluable across a spectrum of applications, from assistive writing technologies and conversational agents to content summarization and language translation tools. Examples of LLMs suitable for use as entity level grouping model 404 include, without limitation, a Generative Pre-trained Transformer (GPT) such as GPT-4 and beyond, a Bidirectional Encoder Representations from Transformers (BERT), a Text-to-Text Transfer Transformer (T5), a Robustly Optimized BERT Pretraining Approach (RoBERTa) model, an Efficiently Learning an Encoder that Classifies Token Replacements Accurately (ELECTRA), an XLNet, a GPT-Neo, a GPT-J, and other LLMs. Embodiments are not limited to these examples.

In one embodiment, for example, the entity level grouping model 404 is implemented using a ChatGPT model such as GPT-4, for example, trained on public data sources. The entity level grouping model 404 receives a query 414 generated by an automated prompt generator based on control directives from the game manager 206 and/or a human operator. The query 414 is designed to prompt the entity level grouping model 404 to perform a high level grouping of entities 402 based on standard industry information accessible via public sources. An example of a query 414 may comprise the following textual information: "Assume you are a financial analyst performing a competitive analysis of companies; Task: Divide all the companies listed into groups, provide a title for the group, total number of companies in the group and a reasoning for the grouping, every group should meet the following rules: RULE 1: Companies should be known competitors; RULE 2: Groupings should be understood by an average consumer to contain related companies; RULE 3: A company is connected to another company by providing similar products and services, targeting similar customers, competing for similar employees and being headquartered in the same country; RULE 4: Each company should appear only in one group; RULE 5: No company should be left out from the grouping; RULE 6: Each group should have 10 or more companies; RULE 7: Don't add additional companies that are not already on the list to the grouping."

Once the entity level grouping model 404 receives the query 414, it outputs the entity groups 1 to M, where each entity group M represents two or more related companies. Continuing with the previous example query 414, the entity level grouping model 404 assumes hypothetical groupings within three major industries to illustrate how such an analysis might look. For example, an entity group 1 406 may comprise: (1) Group Name: Tech Titans; (2) Industry: Technology; (3) Total Number of Companies: 10; (4) Reasoning: (4.1) this group includes companies that provide a range of consumer and business technology products and services; (4.2) they are known to compete for similar customer bases by offering operating systems, cloud services, personal computing devices, smartphones, and search engines; and (4.3) given their significant presence in the global market, they often vie for the same talent pool, especially in software engineering and digital marketing; and (5) [Tech Company Name 1, Tech Company Name 2, . . . , Tech Company Name 10]. An entity group 2 408 may comprise: (1) Group Name: Automotive Giants; (2) Industry: Automotive; (3) Total Number of Companies: 10; (4) Reasoning: (4.1) this grouping comprises companies engaged in manufacturing a variety of vehicles, including sedans, SUVs, trucks, and electric vehicles (EVs); (4.2) they compete directly in multiple global markets, aiming to attract similar demographics with their offerings; and (4.3) competition extends into innovations in electric vehicles, autonomous driving technologies, and sustainability practices; and (5) [Vehicle Company Name 1, Vehicle Company Name 2, . . . , Vehicle Company Name 10]. An entity group 3 410 may comprise: (1) Group Name: Retail Conglomerates; (2) Industry: Retail; (3) Total Number of Companies: 10; (4) Reasoning: (4.1) these companies are major players in the global retail market, encompassing both brick-and-mortar stores and e-commerce platforms; (4.2) they offer a diverse range of products from groceries to electronics, appealing to a wide consumer base; and (4.3) competition is fierce among these retailers for market share, customer loyalty, price leadership, and supply chain efficiency; and (5) [Retail Company Name 1, Retail Company Name 2, . . . , Retail Company Name 10].

This setup exemplifies how competitive analysis can be structured, ensuring each group meets the outlined rules by being recognizable competitors within the same industry, offering similar products and services, and competing for similar customers and talent. Each company is listed in only one group, adhering to the directive that no company should be placed in multiple groups or left out.

Once the entity level grouping model 404 receives the query 414, it outputs the entity groups 1 to M, where each entity group M represents two or more related companies, to the connections level grouping model 416. The connections level grouping model 416 is designed to further refine or reorganize the entity groups 1 to M based on connections data 116. The connections level grouping model 416 may also comprise a ML model such as an LLM. Where the LLM of the entity level grouping model 404 is trained on public data sources, however, the LLM of the connections level grouping model 416 is trained on private data sources maintained by the connections networking system 102, such as the connections data 116. Since the connections level grouping model 416 is trained or fine-tuned using training datasets that include specific terms used by the connections networking system 102, the connections level grouping model 416 will provide more refined groups of entities relevant to the entities and members of the connections networking system 102.

In one embodiment, for example, the entity level grouping model 404 implements a connections-based embedding model, such as a holistic embedding model, trained on the connections data 116. The entity level grouping model 404 transforms high-dimensional data into a more manageable, lower-dimensional space, while preserving the essential relationships within the data. Particularly prevalent in the field of natural language processing (NLP), these models are adept at converting textual data into numerical vectors, thus facilitating a wide array of computational tasks. By deploying embedding models, algorithms can efficiently process text, recognizing and utilizing the semantic proximity of words, phrases, or even entire documents. Such embeddings are pivotal for handling the inherent sparsity and high dimensionality of linguistic data, enabling the effective execution of tasks like classification, text analysis, recommendation, and more. Notably, embedding models encompass a range of implementations tailored to various data types. In NLP, word embeddings such as Word to Vector (Word2Vec), Global Vectors for Word Representation (GloVe), and FastText stand out by providing a way to represent individual words as vectors, reflecting their semantic properties based on linguistic context. These models can discern syntactic patterns and semantic relationships, making words with similar meanings cluster together in the vector space. Beyond words, there are models like Sentence to Vector (Sent2Vec) and Document to Vector (Doc2Vec), and advancements such as BERT and its derivatives, which extend the embedding approach to capture the essence of sentences, paragraphs, or entire documents. Unlike static word embeddings, where a word maintains a consistent vector representation irrespective of context, contextual embedding models like BERT and GPT offer dynamic representations, allowing the meaning of a word to shift based on its usage in varied sentences. Embedding models also find applications beyond text, such as in computer vision, where they convert images into vectors to support tasks like classification. In the realm of recommender systems, embeddings are instrumental in mapping users and items into a shared vector space, thereby enhancing recommendation accuracy by identifying similarities based on vector proximity.

The connections level grouping model 416 receives the set of entity groups 1 to M from the entity level grouping model 404, processes the set of entity groups 1 to M, and it outputs a set of connections entity groups 1 to N, such as connections entity group 1 418, connections entity group 2 420, connections entity group 3 422 and connections entity group N 424, where N represents any positive integer.

The connections level grouping model 416 performs entity grouping based on private data sources, such as connections data 116 associated with entities that are part of the eco-system for the connections networking system 102. For a professional networking services company such aiming to group organizations relevant to its ecosystem, the focus might shift towards industries and companies that either heavily utilize professional networking for growth, talent acquisition, and business development, or those that provide complementary services enhancing the professional networking experience. For example, a connections entity group 1 418 may comprise: (1) Group Name: Technology and Software Giants; (2) Industry: Technology and Software; (3) Total Number of Companies: 10; (4) Reasoning: (4.1) this group encompasses companies known for leading in software development, cloud services, and creating platforms that facilitate professional connectivity, collaboration, and remote work; (4.2) these companies are key players in enhancing how professionals network, share knowledge, and collaborate globally; and (4.3) they are interconnected in competing for top tech talent and often utilize professional networking services for recruitment and business development; and (5) [Tech Company Name 1, Tech Company Name 2, . . . , Tech Company Name 10]. A connections entity group 2 420 may comprise: (1) Group Name: Human Resources & Recruitment Services; (2) Industry: Human Resources and Staffing; (3) Total Number of Companies: 10; (4) Reasoning: (4.1) companies in this group specialize in staffing, recruiting, professional development, and human resources technologies; (4.2) as direct users and providers of professional networking services, they leverage such platforms for talent sourcing, job placements, and professional growth initiatives; and (4.3) they are closely related in their pursuit to match job seekers with employment opportunities and are pivotal in the professional networking ecosystem; and (5) [HR Company Name 1, HR Company Name 2, . . . , HR Company Name 10]. A connections entity group 3 422 may comprise: (1) Group Name: Telecommunications & Connectivity Providers; (2) Industry: Telecommunications; (3) Total Number of Companies: 10; (4) Reasoning: (4.1) this grouping includes companies that build and provide the fundamental infrastructures and services enabling professional networking platforms to operate and thrive; and (4.2) by offering essential connectivity, these firms support the digital backbone that allows for remote professional engagement, online networking, and digital communication, critical for modern professional networking; and (5) [Telecommunications Company Name 1, Telecommunications Company Name 2, . . . , Telecommunications Company Name 10].

In this analysis, companies are grouped based on their significant roles within the professional networking ecosystem, which are those that produce technology and software tools used for networking, firms specializing in the human aspect of professional networking such as recruitment and HR services, and telecommunications giants that provide the necessary infrastructure for these activities. Each group adheres to the rules by being market competitors within the same industry, targeting similar customer bases (both businesses and professionals), and competing for a similar talent pool, thus embodying a comprehensive professional networking landscape.

Figure 5:
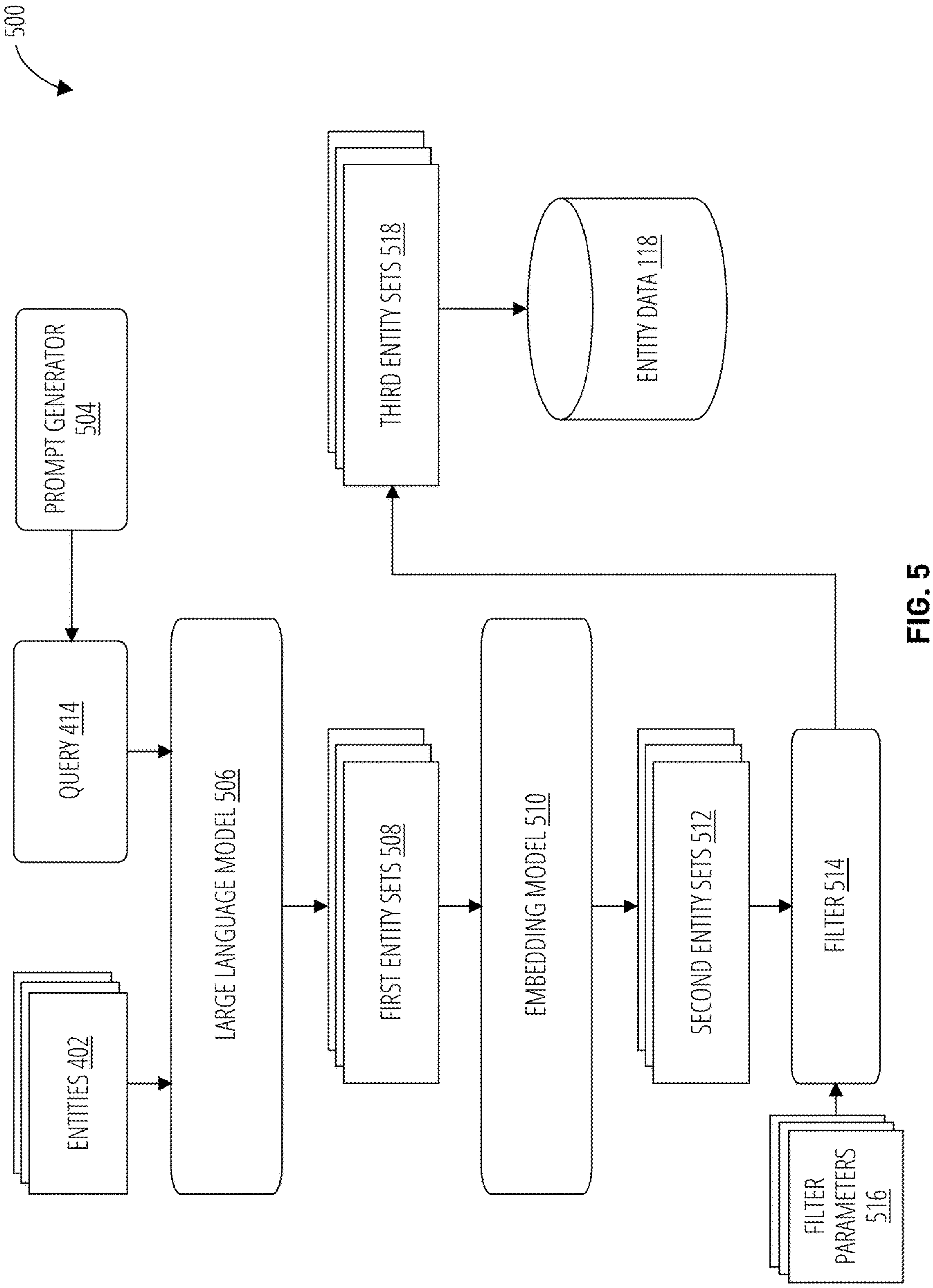
FIG. 5 illustrates a logic diagram in accordance with one embodiment.

FIG. 5 illustrates a logic diagram 500 that provides example operations for an entity grouping logic 302. As previously described, the entity grouping logic 302 implements two ML models 308 in sequence to categorize a list of entities into entity groups. For instance, the entity grouping logic 302 may implement an entity level grouping model 404 for entity grouping based on public data sources, such as large language model 506, and a connections level grouping model 416 for entity grouping based on private data sources, such as embedding model 510. One example of private data sources includes connections data 116 associated with entities that are part of the eco-system for the connections networking system 102.

While the logic diagram 500 depicts the entity grouping logic 302 using two ML models 308, it may be appreciated that the entity grouping logic 302 may use a single ML model as well. For example, the entity grouping logic 302 may implement a large language model 506 by itself, an embedding model 510 by itself, or a combination of the large language model 506 and the embedding model 510. In one embodiment, for example, the large language model 506 may be implemented using only the embedding model 510 trained on the connections data 116. Embodiments are not limited in this context.

As depicted in the logic diagram 500, the entity level grouping model 404 of the entity grouping logic 302 may be implemented as a large language model 506, such as a transformer model like ChatGPT 4.0 and beyond, for example. The large language model 506 receives as input a set of entities 402 and a query 414.

A prompt generator 504 may automatically generate the query 414. Additionally, or alternatively, a human operator may generate the query 414. An example of a query 414 may comprise the following textual information: "Assume you are a financial analyst performing a competitive analysis of companies; Task: Divide all the companies listed into groups, provide a title for the group, total number of companies in the group and a reasoning for the grouping, every group should meet the following rules: RULE 1: Companies should be known competitors; RULE 2: Groupings should be understood by an average consumer to contain related companies; RULE 3: A company is connected to another company by providing similar products and services, targeting similar customers, competing for similar employees and being headquartered in the same country; RULE 4: Each company should appear only in one group; RULE 5: No company should be left out from the grouping; RULE 6: Each group should have 10 or more companies; RULE 7: Don't add additional companies that are not already on the list to the grouping."

Once the large language model 506 receives the query 414, it outputs first entity sets 508 comprising two or more related companies to the embedding model 510. The embedding model 510 is designed to further refine or reorganize the first entity sets 508 based on connections data 116. The embedding model 510 may also comprise a ML model such as an LLM. Where the LLM of the large language model 506 is trained on public data sources, however, the LLM of the embedding model 510 is trained on private data sources maintained by the connections networking system 102, such as the connections data 116.

The embedding model 510 receives the first entity sets 508 from the large language model 506, processes the first entity sets 508, and it outputs second entity sets 512. Each of second entity sets 512 comprises two or more related companies as further refined by the connections data 116. The embedding model 510 outputs the second entity sets 512 to a filter 514.

The filter 514 receives the second entity sets 512, and filters the entities within each of the second entity sets 512 according to one or more filter parameters 516. The filter parameters 516 may represent different characteristic or properties associated with an entity, such as a company or business. Examples of filter parameters 516 may include without limitation values representing: (1) a legal structure of an entity, such as corporations, partnerships, sole proprietorships, and limited liability companies (LLCs) are examples of legal structures dictating liability, taxation, and regulations; (2) industry sector of an entity, such as companies operating within specific industries such as technology, healthcare, finance, manufacturing, and retail, which influence their strategies and operations; (3) scale or size of an entity, such as from small local businesses to large multinational corporations, impacting their market reach, resources, and influence; (4) market presence of an entity, such as the extent to which a company is known, its brand recognition, and its share in the market it operates; (5) revenue and profitability of an entity, such as an amount of money a company generates through its operations and the financial gain it secures after all expenses have been deducted; (6) a growth rate of an entity, such as how quickly a company is expanding in terms of sales, market share, and overall size; (7) innovation and technology adoption of an entity, such as a degree to which a company integrates new technologies and innovative practices into its products, services, and processes; (8) sustainability and ESG practices of an entity, such as a focus on environmental, social, and governance factors, reflecting the company's commitment to operating in a sustainable and socially responsible manner; (9) work culture and employee engagement of a company, such as an environment and ethos of the company workplace, including leadership style, employee satisfaction, and engagement levels; (10) customer focus and engagement of an entity, such as an extent to which a company understands and meets its customers' needs and the strategies used to engage and retain customers; (11) supply chain management of an entity, such as an efficiency and resilience of a company's supply chain, including sourcing of materials, logistics, and distribution of final products; (12) competition and market position of an entity, such as a company's standing relative to its competitors and its strategy for maintaining or improving this position; (13) regulatory compliance and legal standing of an entity, such as an extent to which a company adheres to laws and regulations governing its operation, including those related to labor, environment, and industry standards; (14) international operations, such as whether a company operates in multiple countries, including its global strategy, presence, and adaptability to different markets; (15) product or service portfolio, such as a diversity and range of a company's offerings, including the innovation and relevance of its products or services. Embodiments are not limited to these examples.

The filter 514 receives the second entity sets 512 and it filters the second entity sets 512 based on the filter parameters 516. The filter 514 outputs third entity sets 518 after filtering operations. The third entity sets 518 are stored as part of the entity data 118.

Figure 6:
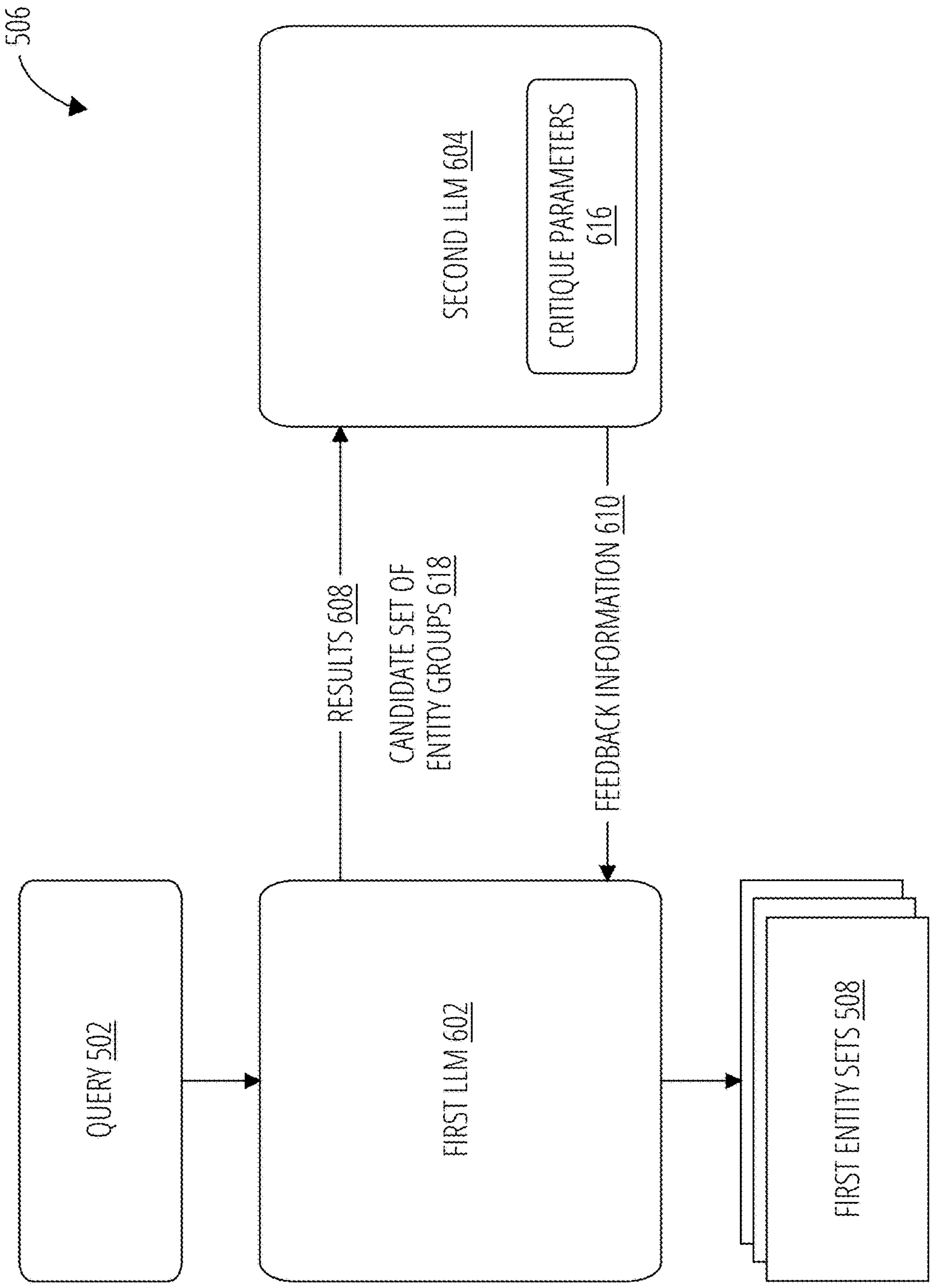
FIG. 6 illustrates machine learning model in accordance with one embodiment.

FIG. 6 illustrates an example framework for the large language model 506 of the entity grouping logic 302. As described with reference to FIG. 5, the large language model 506 of the entity grouping logic 302 receives a query 502 and processes the query 502 to generate first entity sets 508.

In one embodiment, the large language model 506 may implement a single-model architecture using a single LLM. In one embodiment, the large language model 506 may implement a process or algorithm combining a dual-model architecture comprising a first and a second LLM to generate and then check or critique a result involves a collaboration between the two models, usually aimed at enhancing the quality, accuracy, or creativity of the output. For example, the large language model 506 may comprise a first LLM 602 and a second LLM 604. The first LLM 602 is trained to perform LLM based grouping into canonical entities using the public data sources available to train the model to generate the first entity sets 508. The second LLM 604 is trained to perform LLM based grouping critique of the first entity sets 508 based on a set of critique parameters 616. In one embodiment, the first LLM 602 and the second LLM 604 may be implemented using the same or similar ML models 308. In one embodiment, the first LLM 602 and the second LLM 604 may be implemented using different ML models 308.

By way of example, the first LLM 602 receives a prompt or instruction from a user, such as a query 414. Based on its trained knowledge and algorithms, the first LLM 602 processes the input to understand the task and generates an output that addresses the query 414. This output is essentially the model's best attempt to fulfill the request given its understanding and training data. The results 608 generated by the first LLM 602 are then passed to the second LLM 604, which acts as a reviewer, critic, or checker. This second LLM 604 has been trained or is tasked to analyze, critique, or evaluate the results 608 based on critique parameters 616 representing specific criteria such as accuracy, logic, ethical considerations, adherence to guidelines, or creativity. The second LLM 604 processes the received results 608, examining it for any issues or areas where it might be improved. It checks against its own training data, rules, or guidelines, depending on its designed purpose. After review, the second LLM 604 generates feedback information 610, which comprises corrections, or a critique of the results 608 from the first LLM 602. This might include suggestions for improvement, identification of errors or biases, or alternative approaches to the task. In some setups, the feedback information 610 from the second LLM 604 can be fed back to the first LLM 602 for it to learn from its mistakes or to adjust the output accordingly. Alternatively, the feedback information 610 might be presented to a human user for consideration and manual adjustment of the results 608. This collaborative process leverages the strengths of both models, where the first focuses on creation and generation based on the request, and the second on critical evaluation and improvement. This dual-model technique is used to improve the reliability, accuracy, and quality of the final output, ensuring that it meets specific standards or criteria. Such a setup can be particularly useful in applications requiring high levels of accuracy, creativity, and adherence to complex guidelines, such as grouping entities 402 into entity groups.

By way of example, the first LLM 602 receives the entities 402 and it performs LLM based grouping of the entities 402 into canonical entity groups following accepted industry principles, standards, or rules (e.g., industry, sector, etc.). The first LLM 602 sends a first version of the first entity sets 508 as results 608 to the second LLM 604. The second LLM 604 receives the results 608, and it performs a review or critique of the first version of the first entity sets 508 using the critique parameters 616. The second LLM 604 sends a critique and/or suggested improvements as feedback information 610 for the results 608. The first LLM 602 receives the feedback information 610, and it generates a second version of the first entity sets 508 for output to the second LLM 604 as results 608. The second LLM 604 sends a critique and/or suggested improvements as feedback information 610 for the results 608. The first LLM 602 may exchange results 608 and feedback information 610 for any number of iterations until a terminating condition is reached as defined by one or more hyperparameters for the large language model 506.

In one embodiment, the first LLM 602 and the second LLM 604 are designed to consolidate different segments, subsidiaries, divisions or groups into a single entity while processing the entities 402. This reduces or removes any issues of the large language model 506 grouping two different subsidiaries of a single company as different entities 402.

Figure 7:
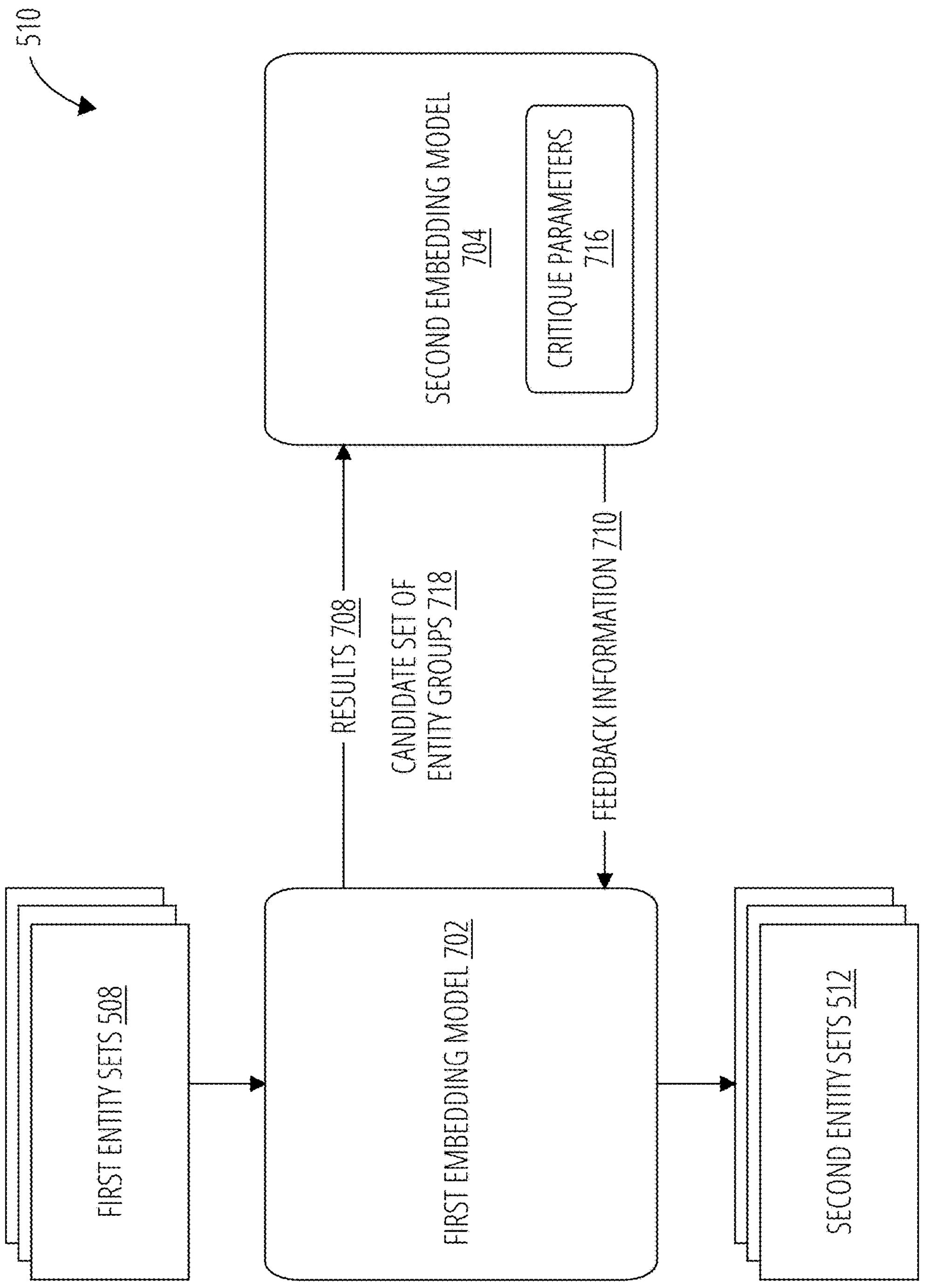
FIG. 7 illustrates machine learning model in accordance with one embodiment.

FIG. 7 illustrates an example framework for the embedding model 510 of the entity grouping logic 302. As described with reference to FIG. 5, the embedding model 510 of the entity grouping logic 302 receives first entity sets 508 and it generates second entity sets 512.

In one embodiment, embedding model 510 may implement a single-model and/or dual-model framework similar to the large language model 506. The embedding model 510 may implement a process or algorithm combining a first and a second embedding model to generate and then check or critique a result involving a collaboration between the two models, usually aimed at enhancing the quality, accuracy, or creativity of the output. For example, the embedding model 510 may comprise a first embedding model 702 and a second embedding model 704.

The first embedding model 702 is trained to perform an additional layer of criteria for groupings, sometimes referred to as "decorations," such as industry, size, sector, and other non-canonical grouping parameters. The first embedding model 702 uses into canonical entities using the public data sources available to train the model to generate the second entity sets 512. The second embedding model 704 is trained to perform a grouping critique of the 1012 based on a set of critique parameters 716. In one embodiment, the first embedding model 702 and the second embedding model 704 may be implemented using the same or similar ML models 308. In one embodiment, the first embedding model 702 and the second embedding model 704 may be implemented using different ML models 308.

In a manner similar to the large language model 506, the first embedding model 702 and the second embedding model 704 may exchange results 708 and feedback information 710 for any number of iterations until a terminating condition is reached as defined by one or more hyperparameters for the embedding model 510. By way of example, the first embedding model 702 receives the first entity sets 508 and it refines the first entity sets 508 based on parameters such as non-canonical parameters, application specific parameters, game specific parameters, player specific parameters, or parameters derived from the connections data 116 and/or the entity data 118 of the connections networking system 102. The first embedding model 702 sends a first version of the second entity sets 512 as results 708 to the second embedding model 704. The second embedding model 704 receives the results 708, and it performs a review or critique of the first version of the second entity sets 512 using the critique parameters 716. For example, the second embedding model 704 uses a set of parameters designed to cluster the entities 402 into competitive groups with rationale output. The second embedding model 704 sends a critique and/or suggested improvements as feedback information 710 for the results 708. The first embedding model 702 receives the feedback information 710, and it generates a second version of the second entity sets 512 for output to the second embedding model 704 as results 708. The second embedding model 704 sends a critique and/or suggested improvements as feedback information 710 for the results 708. The first embedding model 702 may exchange results 708 and feedback information 710 for any number of iterations until a terminating condition is reached as defined by one or more hyperparameters for the embedding model 510.

In one embodiment, the embedding model 510 may implement a third embedding model, such as an LLM validation model. The LLM validation model may implement another set of parameters to confirm or validate the second entity sets 512, such as ensuring that subsidiaries of a same entity are not represented as two different entities.

Figure 8:
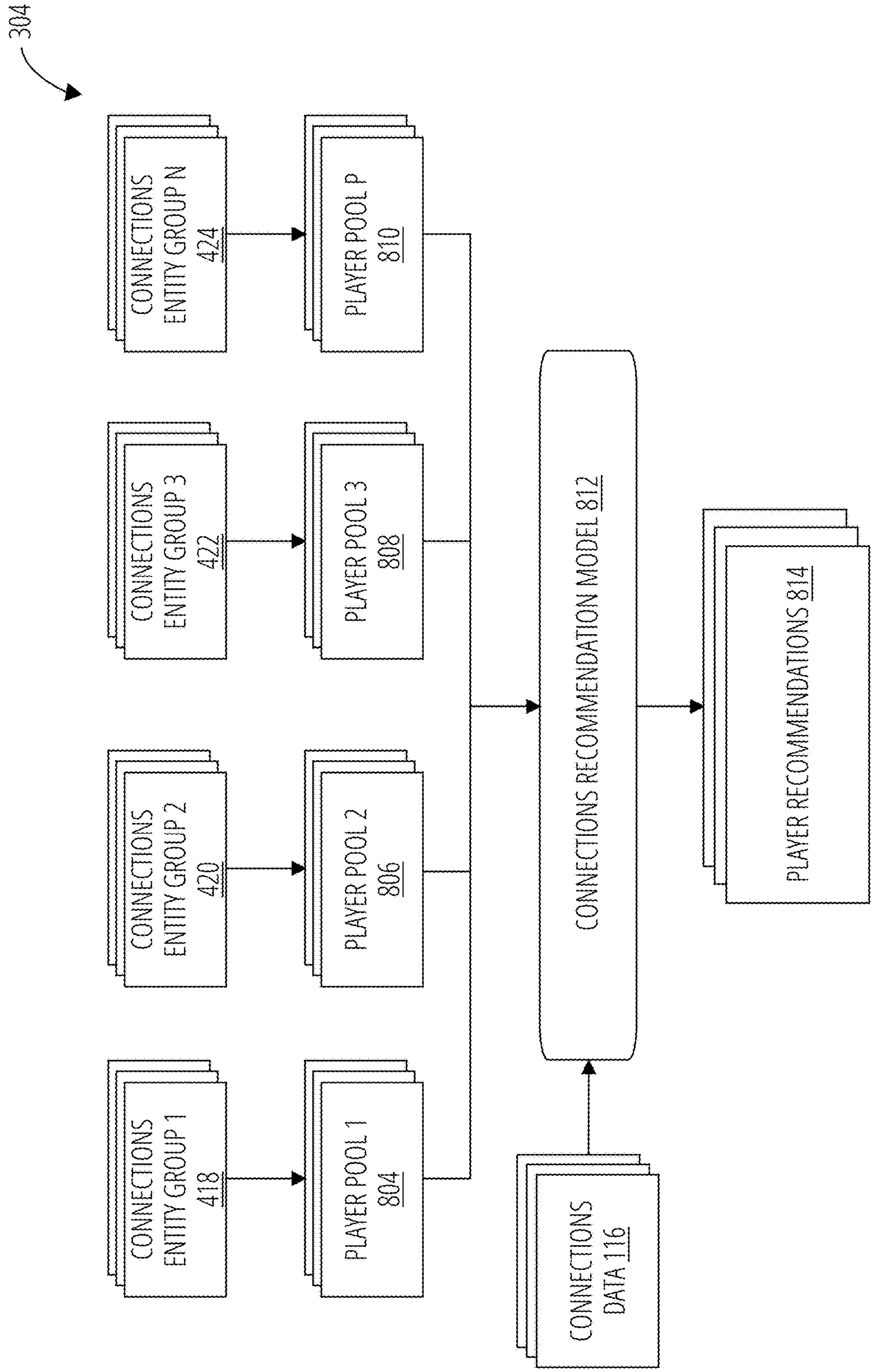
FIG. 8 illustrates connections recommendation logic in accordance with one embodiment.

FIG. 8 illustrates an example of a framework for a connections recommendation logic 304. In one embodiment, the connections recommendation logic 304 includes a connections recommendation model 812. The connections recommendation model 812 is a ML model, such as one of ML models 308.

Once the entity grouping logic 302 generates connections entity groups 1 to N, each of the entity groups comprise one or more of the entities 402. Each of the entities 402 may comprise multiple players 218. In one embodiment, the entity grouping logic 302 combines the players 218 from each of the entities 402 of a connections entity group to form a player pool for the connections entity group. A player pool represents a set of candidate players 218 for one or more games 214. The connections recommendation logic 304 performs this process for all the connections entity groups 1 to N to generate player pools 1 to P, respectively, where P represents any positive integer. For example, the connections recommendation logic 304 may form player pool 1 804 from the connections entity group 1 418, player pool 2 806 from the connections entity group 2 420, player pool 3 808 from the connections entity group 3 422, and player pool P 810 from the connections entity group N 424. In this manner, players 218 from within a same player pool P can compete with each other.

Once the entity grouping logic 302 generates the player pools 1 to P, the connections recommendation model 812 processes each of the players 218 within a player pool P to select, predict, or infer a set of player recommendations 814. The player recommendations 814 represent one or more players 218 of a player pool that are suitable for playing one or more games 214 either alone or in competition with each other. The connections recommendation model 812 receives as input, connections data 116 for each of the players 218 within a player pool P to assist in this decision. The connections recommendation model 812 may send the player recommendations 814 to a ranking model or a recommendation model to generate a recommendation for a member of the connections networking system 102 to play one or more games 214, either alone or in competition with another one of the players 218.

By way of example, assume the connections entity group 1 418 includes 3 entities including a company A, a company B, and a company C. Further assume company A has 10 employees that are members of connections networking system 102, company B has 20 employees that are members of connections networking system 102, and company C has 30 employees that are members of connections networking system 102. The entity grouping logic 302 may form a player pool with 60 players (10+20+30). The connections recommendation model 812 receives a first input comprising a player pool P comprising multiple players 218, and a second input comprising connections data 116 for one or more of the players 218 in the player pool P. The connections recommendation model 812 uses the connections data 116 to generate player recommendations 814. The player recommendations 814 may optionally be sent to a ranking model and/or a recommendation model, that in turn provides a recommendation to one or more of the players 218 in the player pool P based on the player recommendations 814. The recommendation model may use the player recommendations 814 to make recommendations to players 218 for intra-company or inter-company competitions, as measured by the leaderboards 224. For example, a recommendation model may send a recommendation to employee 1 of company A to play one or more games 214 to promote intra-company competition between company A and company B or company C. In another example, a recommendation model may send a recommendation to employee 1 of company A to play one or more games 214 against employee 2 of company A to promote inter-company competition. In yet another example, the recommendation model may send a recommendation to employee 2 of company A to join employee 1 of company A in a team effort against employees of company B. The recommendation model may generate a variety of recommendations to the players 218, and embodiments are not limited to these examples.

The connections recommendation model 812 recommends players 218 that might want to game with each other based on various criteria. For example, the connections recommendation model 812 may recommend players 218 that have shown an affinity or interest in playing one or more games 214, such as playing a game within a defined threshold of days (e.g., one week), sharing a game, liking a game, sending invitations to other players 218 to play the game, and so forth. Examples of other criteria may include without limitation players 218 from a same entity, rival entities grouped together on one or more leaderboards 224, players 218 from past entities, players 218 from same educational institutions (e.g., high school, college, etc.), players 218 having a same or similar job function or job title, players 218 sharing connections, players 218 identified by feed signals, re-posting of articles, sharing of articles, job openings, job applications, and so forth. Embodiments are not limited to these examples.

The recommendation model may send recommendations to players 218 in a number of different ways. Examples include direct or group messages sent via one or more communication channels 222, game objects 230 presented on the GUI 226 or game interface 228 before, during, or after one or more games 214, advertisements, emails, and so forth. Embodiments are not limited in this context.

Figure 9:
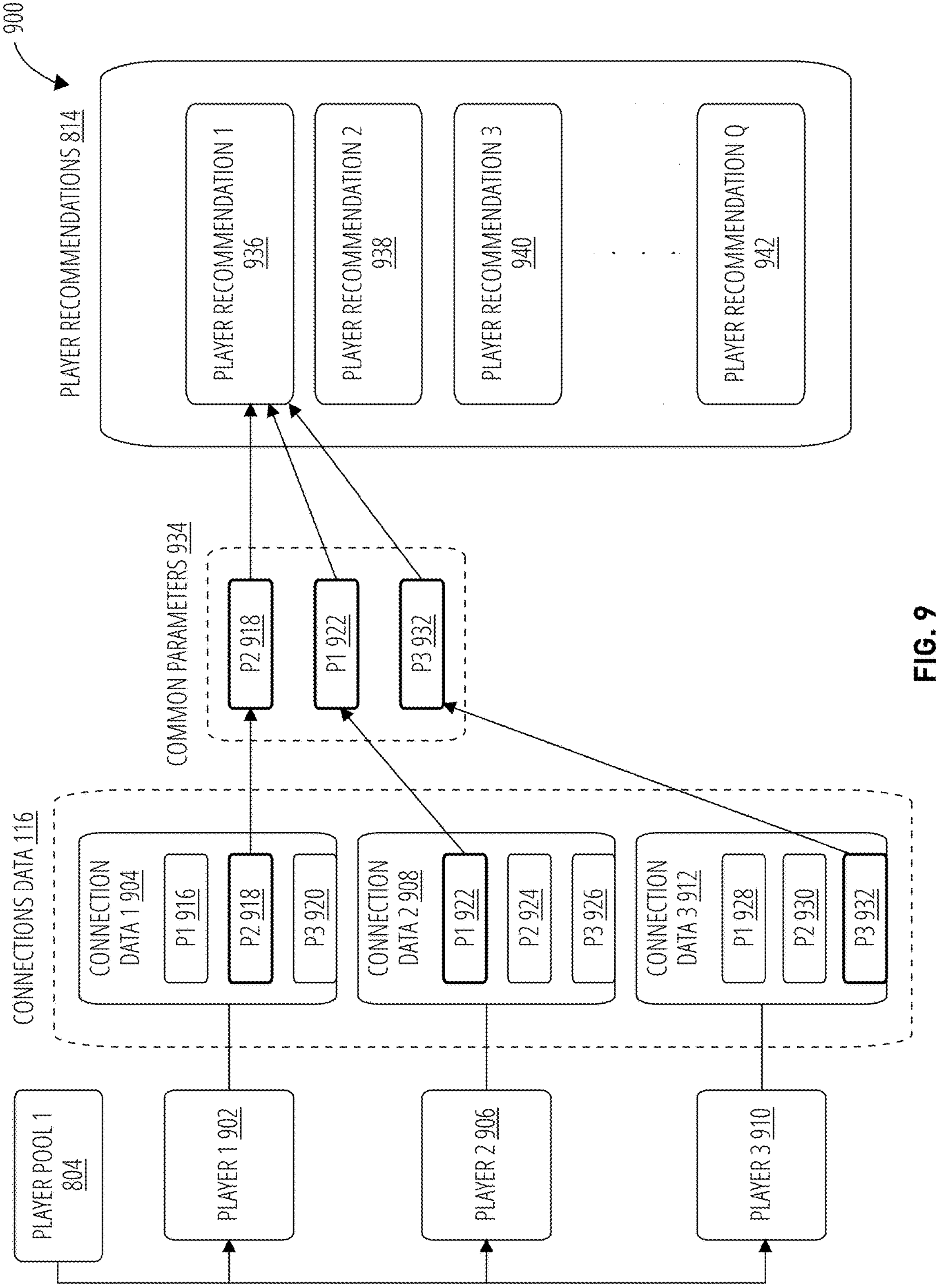
FIG. 9 illustrates a logic diagram in accordance with one embodiment.

FIG. 9 illustrates a logic diagram 900 providing an example of operations of the entity grouping logic 302. The logic diagram 900 depicts the player pool 1 804 comprising a set of three players 218 including a player 1 902, a player 2 906, and a player 3 910. The logic diagram 900 further depicts connections data 116 for each of the three players 218 including connection data 1 904, connection data 2 908, and connection data 3 912 for player 1 902, player 2 906, and player 3 910, respectively.

The connections data 116 may include one or more parameters representing information about the players 218. As previously described, the connections networking system 102 may store connections data 116 for one or more users of the connections networking system 102, such as players 218. The connections data 116 may include, for example, demographics, preferences, gameplay statistics, skill levels, preferred roles, play times, connections within the connections networking system 102, connections within the game, current employment, previous employment, educational background, interests, hobbies, articles posted, articles consumed, companies followed, historical match outcomes, specific game session criteria (e.g., game mode, team size) to recommend player matches, current availability, recent performance trends, player preferences, player feedback, analysis of the player collected data to identify each player's strengths, weaknesses, preferences, and overall style of play, leaderboard statistics, and other information associated with one or more of the players 218. The connections data 116 may comprise any number of different parameters representing different aspects of the connections data 116.

The connections recommendation model 812 may use the connections data 116 to analyze the players 218 and predict a set of one or more player recommendations 814. By way of example, assume the connection data 1 904 for the player 1 902 includes a parameter 1 916, parameter 2 918, and parameter 3 920. Further assume the connection data 2 908 for the player 2 906 includes parameter 1 922, parameter 2 924, and parameter 3 926. Finally, assume the connection data 3 912 for the player 3 910 includes parameter 1 928, parameter 2 930, parameter 3 932. The connections recommendation model 812 is trained to analyze the connections data 116, and it identifies a set of common parameters 934 comprising parameter 2 918 of the connection data 1 904 associated with the player 1 902, parameter 1 922 of the connection data 2 908 associated with the player 2 906, and parameter 3 932 of the connection data 3 912 associated with the player 3 910. For example, assumes the common parameters 934 represent job titles (e.g., coder level 1, coder level 2, etc.) or length of service (e.g., 1 year, 5 year, 10 year, etc.) for company A, company B, and/or company C. The connections recommendation model 812 may generate a set of player recommendations 814 that includes a player recommendation 1 936 to one or more of player 1 902, player 2 906, and/or player 3 910. The connections recommendation model 812 may perform similar operations to generate parameter 1 928, player recommendation 3 940, and player recommendation Q 942, where Q represents any positive integer.

Figure 10:
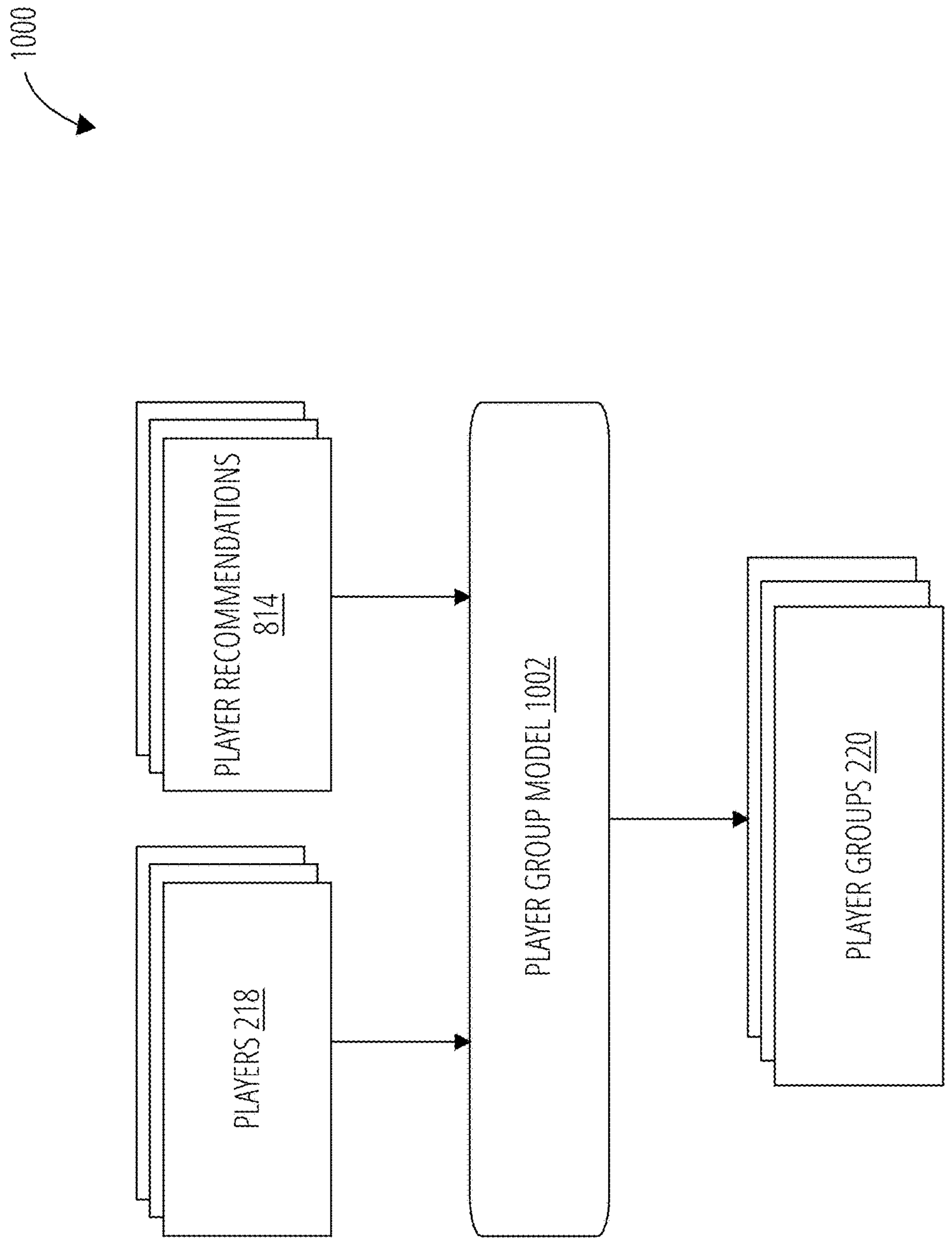
FIG. 10 illustrates an entity grouping logic in accordance with one embodiment.

FIG. 10 illustrates a logic diagram 1000. The logic diagram 1000 illustrates an example of a framework for the player group model 1002. In one embodiment, the player group model 1002 is a ML model from the ML models 308.

As depicted in FIG. 10, the player group model 1002 receives a first input comprising one or more of the players 218 from one or more of the player pools 1 to P, and a second input comprising one or more player recommendations 814 for the players 218. The player group model 1002 is trained to suggest, predict, and/or infer a set of one or more player groups 220 comprising some or all of the players 218. The player groups 220 may correspond to different entities 402 from the entity group 1 to M or the connections entity group 1 to N. One or more of the player groups 220 may form teams for a league where players 218 from each of the player groups 220 play one or more games 214. Scores from the players 218 from each of the player groups 220, or collective scores from all the players 218 from a player group, may be used to update the one or more leaderboards 224 associated with the one or more games 214.

Figure 11A:
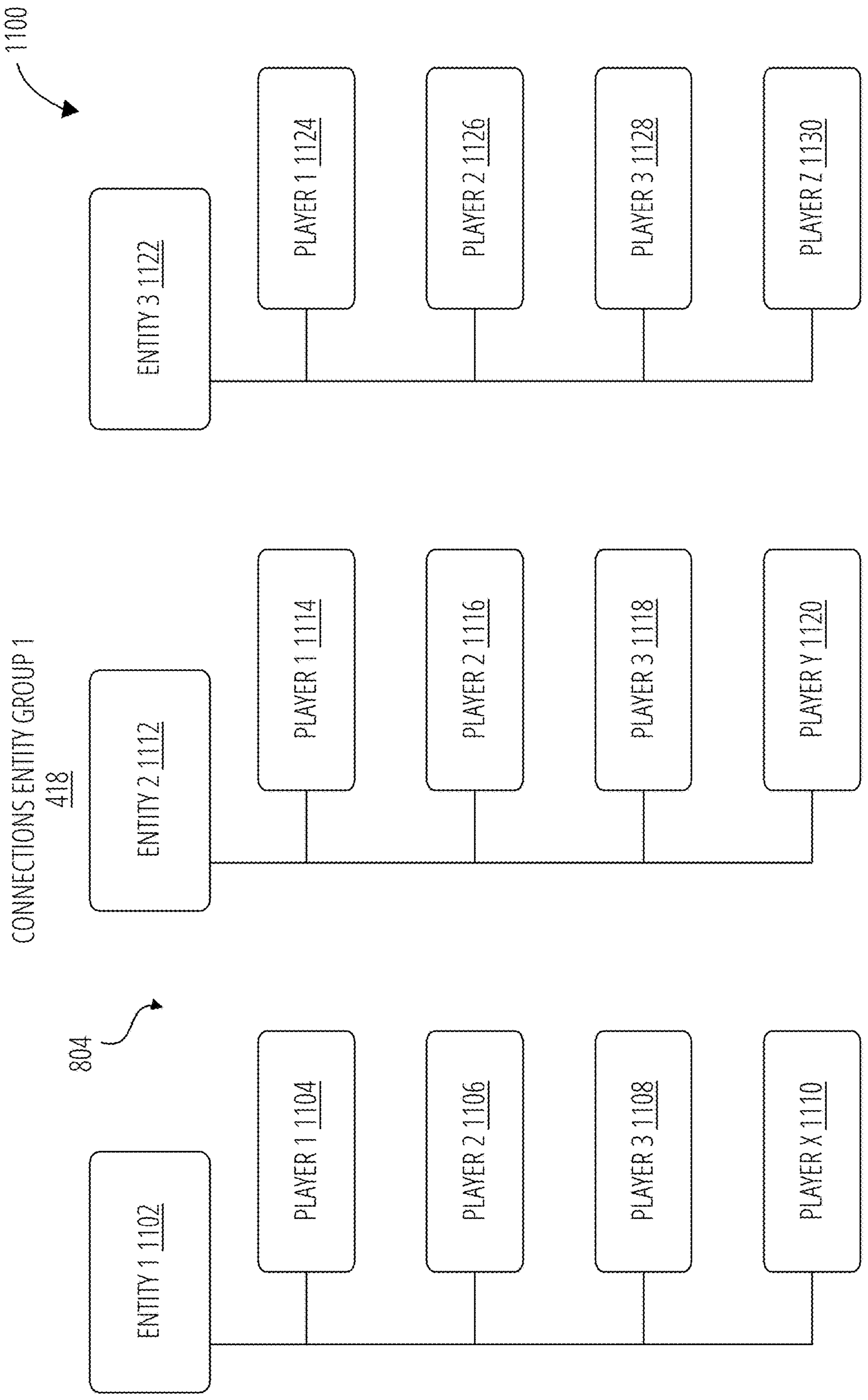
FIG. 11A illustrates a logic diagram in accordance with one embodiment.

FIG. 11A illustrates a logic diagram 1100 representing an example of operations performed by the player group model 1002. As depicted in FIG. 11A, assume the connections entity group 1 418 comprises three entities including entity 1 1102, entity 2 1112, and entity 3 1122, where each entity comprises players 218 from player pool 1 804 for the connections entity group 1 418. Further assume, the entity 1 1102 comprises player 1 1104, player 2 1106, player 3 1108, and player X 1110, the entity 2 1112 comprises player 1 1114, player 2 1116, player 3 1118, and player Y 1120, and the entity 3 1122 comprises player 1 1124, player 2 1126, player 3 1128, and player Z 1130, where X, Y, and Z represent any positive integers. The player group model 1002 may receive the players 218 from the player pool 1 804 and the player recommendations 814 from the connections recommendation model 812 to generate one or more player groups 220 for the three entities comprising entity 1 1102, entity 2 1112, and entity 3 1122, as depicted in FIG. 11B.

Figure 11B:
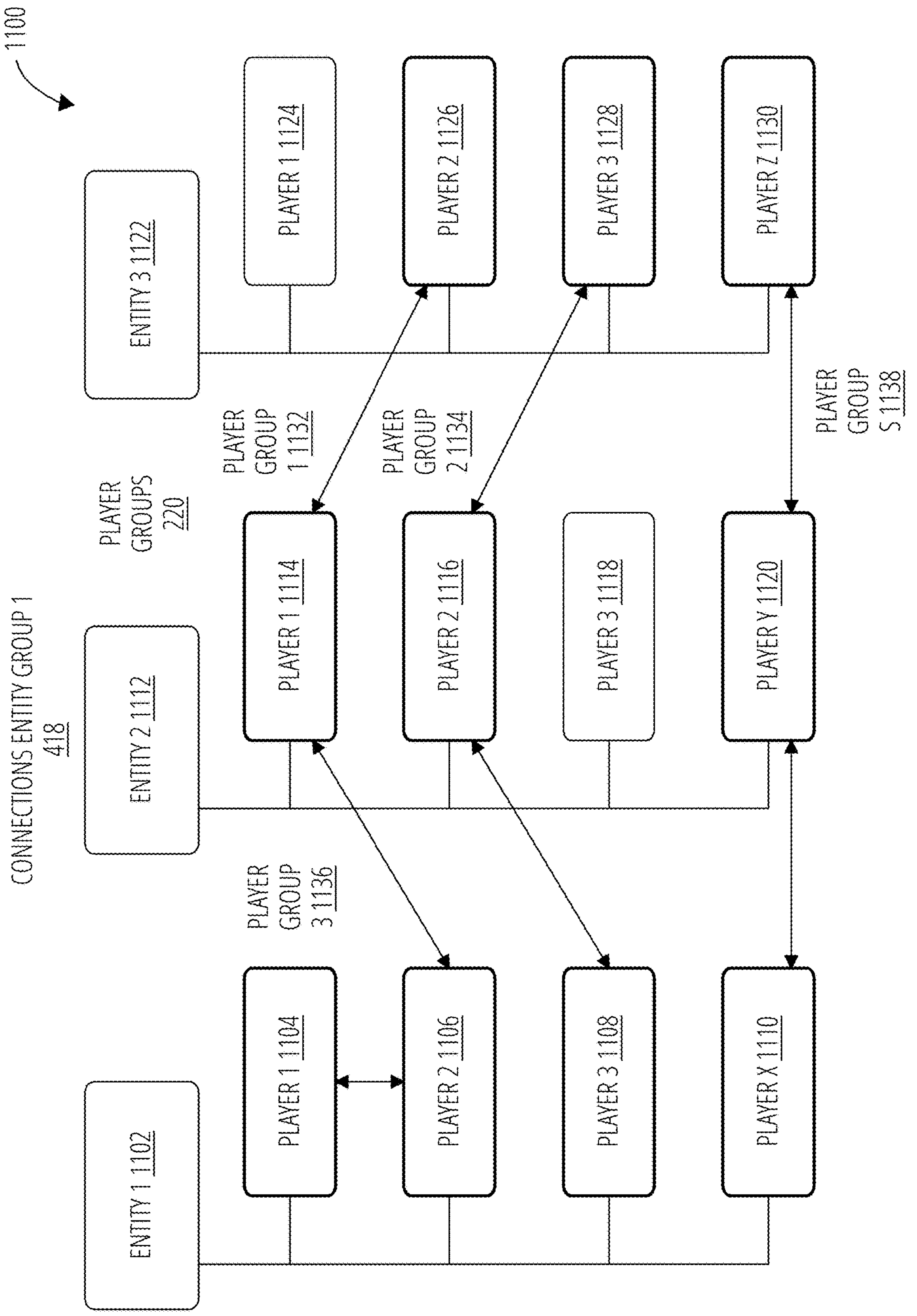
FIG. 11B illustrates a logic diagram in accordance with one embodiment.

FIG. 11B illustrates the logic diagram 1100 representing an example of operations performed by the player group model 1002. As described with reference to FIG. 11A, the player group model 1002 may receive the players 218 from the player pool 1 804 and the player recommendations 814 from the connections recommendation model 812 to generate one or more player groups 220 for the three entities comprising entity 1 1102, entity 2 1112, and entity 3 1122, as depicted in FIG. 11B. For example, assume the player group model 1002 uses the player recommendations 814 to generate a player group 1 1132 comprising player 2 1106 of entity 1 1102, player 1 1114 of entity 2 1112, and player 2 1126 of entity 3 1122, a player group 2 1134 comprising player 3 1108 of entity 1 1102, player 2 1116 of entity 2 1112, and player 3 1128 of entity 3 1122, a player group 3 1136 comprising player 1 1104 and player 2 1106 of the entity 1 1102, and a player group S 1138 comprising player X 1110 of entity 1 1102, player Y 1120 of entity 2 1112, and player Z 1130 of entity 3 1122. The player group 1 1132, player group 2 1134, and player group S 1138 are examples of inter-entity player groups, while player group 3 1136 is an example of intra-entity player groups.

Figure 12:
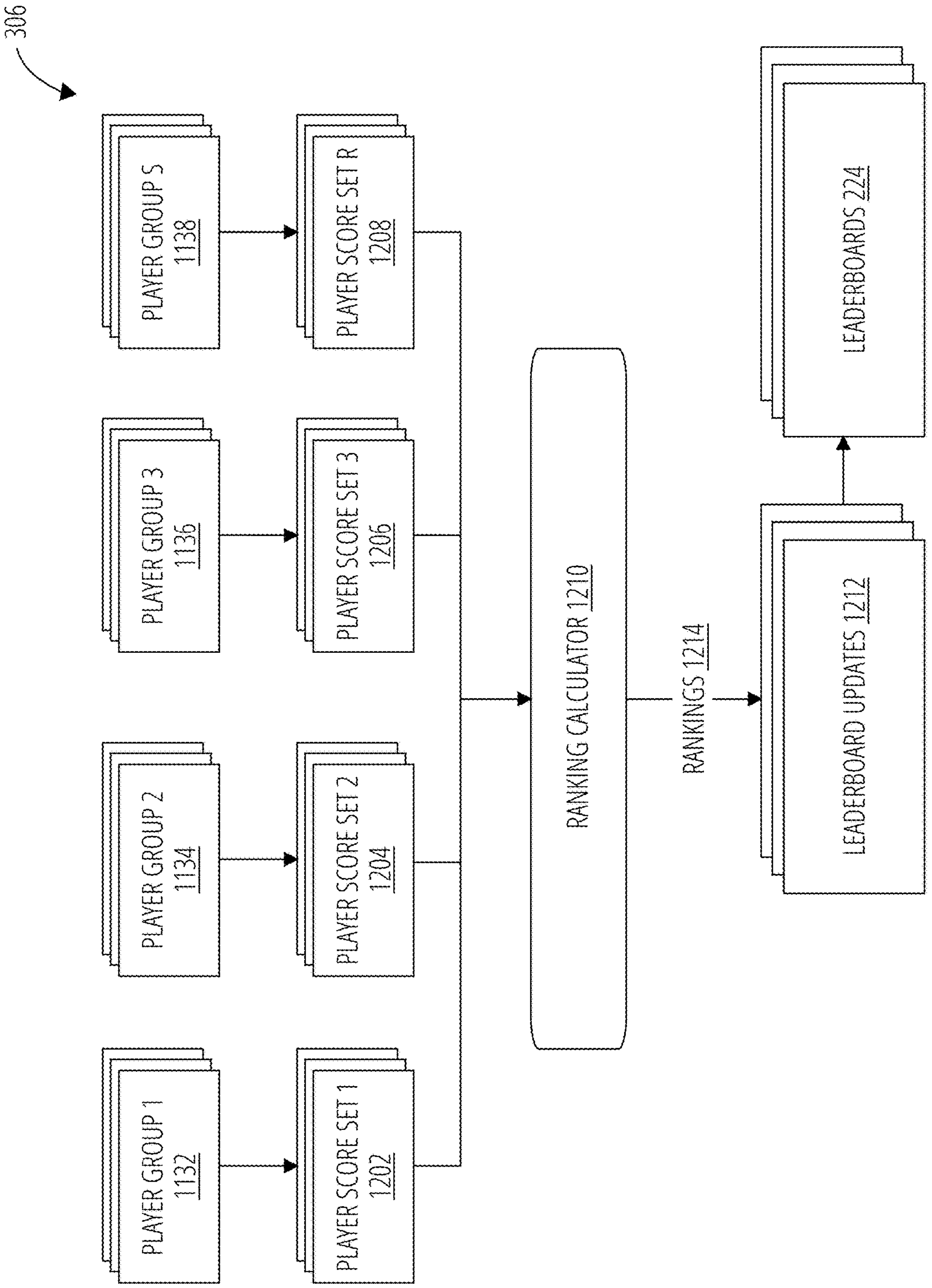
FIG. 12 illustrates a connections ranking logic in accordance with one embodiment.

FIG. 12 illustrates an example framework for the connections ranking logic 306. The connections ranking logic 306 comprises a ranking calculator 1210 that is configured to receive a first input comprising the player groups 1 to S and a second input comprising player score set 1 to R, where R represents any positive integer. The ranking calculator 1210 then calculates a set of leaderboard updates 1212 that are used to update information presented by the leaderboards 224.

By way of example, once the player group model 1002 generates the player groups 1 to S, the connections ranking logic 306 collects scores from one or more games 214 played by the players 218 of each of the player groups 1 to S. For example, a player score set 1 1202 may comprise past or current scores from players 218 of player group 1 1132 playing one or more games 214, player score set 2 1204 from players 218 of player group 2 1134 playing one or more games 214, player score set 3 1206 from players 218 of player group 3 1136 playing one or more games 214, and player score set R 1208 from players 218 of player group S 1138 playing one or more games 214. The ranking calculator 1210 receives the player score sets 1 to R, and generates leaderboard updates 1212 for the leaderboards 224.

In one embodiment, the ranking calculator 1210 uses a combination of game score and a number of daily active players to calculate a ranking score for an entity. For example, the ranking calculator 1210 may calculate a ranking score for an entity using Equation (1), as follows:

$$RS_e = (W1 * GS) + (W2 * P) \qquad \text{EQUATION (1)}$$

In Equation (1), $RS_e$ represents a ranking score for an entity, GS represents an average game score for the entity, and P represents a number of daily active players from the entity divided by a number of daily unique players from the entity. The variables W1 and W2 are weights assigned based on a combination that results in a maximum number of times a leaderboard is shared by members. This information may be derived from the connections networking system 102, such as the connections data 116 and/or the entity data 118.

The ranking calculator 1210 may generate the leaderboard updates 1212 on a periodic, aperiodic, or on-demand basis. In one embodiment, for example, the ranking calculator 1210 dynamically generates leaderboard updates 1212 in a real-time or near real-time basis while the players 218 are playing the games 214 or as soon as possible thereafter.

In a web-scale online system such as connections networking system 102, it may take a relatively long period of time to update the leaderboards 224 when server systems are geographically remote from each other, such as in different regions of the world. Depending on a given location for a server system and players 218, it may take several seconds to minutes to updates the leaderboards 224. Therefore, the connections ranking logic 306 updates the leaderboards 224 using the leaderboard updates 1212 using several techniques designed to accelerate propagation of the leaderboard updates 1212 across various server systems that may be located around the world.

A latency associated with leaderboard updates 1212 may vary depending on a particular online system, database type, and geographic region. For example, assume the connections networking system 102 uses a database such as Apache Kafka, developed by the Apache Software Foundation. Kafka is an open-source stream-processing software platform designed to handle real-time data feeds with high throughput and low latency. It functions as a distributed system, running across a cluster that can span multiple data centers, where it stores records in categorically organized topics. One of Kafka's key strengths is its ability to manage vast volumes of data efficiently, marking it ideal for scenarios necessitating the processing of large data streams in real-time. Additionally, it is built to be fault-tolerant, ensuring data replication and automatic recovery from node failures, thus preventing data loss. Kafka's architecture allows for scalability, enabling the addition of more nodes to the cluster without downtime while automatically balancing the load. Its design prioritizes low latency to support applications requiring instant responsiveness. The durability of data within Kafka is also a critical feature, supported by data replication and configurable retention policies, which ensure long-term data storage. Kafka employs a publish-subscribe model, allowing producers to publish messages to topics from which consumers can then subscribe and consume. This versatility makes Apache Kafka a popular choice for a wide range of applications, including event sourcing, real-time stream processing, log aggregation, and as a robust message broker, thereby decoupling data producers from consumers.

Further assume the connections networking system 102 uses a Not Only Structured Query Language (SQL) (NoSQL) database management system. NoSQL databases represent a broad class of database management systems that diverge from the traditional relational model. These databases are designed to provide high scalability, flexibility in schema design, and optimized performance for specific types of data and access patterns, making them ideal for big data and real-time web applications. NoSQL databases are categorized into four main types: key-value stores, document stores, wide-column stores, and graph databases. Key-value stores offer simple and fast data retrieval using keys; document stores handle data in formats like JSON and allow nested structures; wide-column stores are optimized for querying large datasets and offer high scalability; graph databases excel at managing data with complex relationships and networks. NoSQL systems often feature capabilities such as easy replication, horizontal scaling, and fine-tuned data consistency models to support a wide range of applications, from social networks to real-time analytics. A NoSQL database management system is a document-oriented data store designed to handle large-scale, high-traffic, and high-availability requirements. The NoSQL database management system may offer sharding and replication, consistency, change capture, a representational state transfer (REST) application programming interface (API), and multi-tenancy features.

In one embodiment, for example, the connections ranking logic 306 may implement a "nearline" solution. For example, once a player finishes a game and receives a valid score, the connections ranking logic 306 may fire one or more Kafka events, such as one for a school, one for a company, and so forth. The Kafka events may include a player's school or company, a new game score, a game type, and/or a puzzle identifier (ID). A Kafka consumer ingests the Kafka events, and it prepares for writing the Kafka events to the NoSQL database. The Kafka consumer writes data from the Kafka events to the NoSQL database, and it uses a multi-colocation (multi-colo) filter to filter the data based on an ID, such as a company ID or a school ID, for example.

For example, if a Kafka mode 300 is selected, the Kafka consumer hashes the ID and performs MOD 300, such as for 0-99 write to LTX1, for 100-199 write to LVA1, and for 200-299 write to LOR1. The NoSQL database is updated with data as LTX1, such as game type, puzzle ID, organization ID, organization type, current player count+1, and current score+new score. The NoSQL database is next updated with the same data as LVA1 and then LOR1.

In one embodiment, for example, the connections ranking logic 306 may implement an Apache Flink solution. Apache Flink is an open-source stream processing framework for big data. It is designed to process continuous streams of data at high throughput and with low latency. When people refer to "Flink for Kafka," they are discussing the integration of Apache Flink with Apache Kafka, where Kafka serves as a source, sink, or both in a stream processing pipeline. Flink can consume data from Kafka topics, where Kafka acts as the source of the data streams. Flink jobs can read these streams to process data in real-time. This setup is commonly used for event-driven applications, analytics, and real-time monitoring systems. Flink can also publish processed data back to Kafka, using Kafka as a sink. Processed data streams from Flink can be output into Kafka topics for further consumption by other systems or for durable storage. This allows for the processed data to be readily available for additional applications, analytics, or data warehousing tools. Apache Flink is designed to handle stateful computations over data streams, allowing for complex event processing, windowing, and state management across large volumes of data. The integration with Kafka leverages Kafka's strengths in managing high-throughput, durable, and scalable data streams, making the combination of Flink and Kafka powerful for real-time analytics and processing use cases. The combination is particularly useful for scenarios requiring real-time data processing from Kafka topics, such as real-time analytics, monitoring, event sourcing, and feature extraction for machine learning models. Flink's advanced windowing capabilities, fault tolerance, and exactly-once processing guarantees complement Kafka's scalable messaging, making it a popular choice for developers building scalable and resilient streaming applications.

By way of example, once a player finishes a game and receives a valid score, the connections ranking logic 306 may fire one or more Kafka events, such as one for a school, one for a company, and so forth. The Kafka events may include a player's school or company, a new game score, a game type, and/or a puzzle identifier (ID). Flink gets the Kafka events based on a Kafka topic. A multi-colo filter then filters the data based on an ID, such as a company ID or a school ID, for example. For example, if a Kafka mode 300 is selected, the Kafka consumer hashes the ID and performs MOD 300, such as for 0-99 write to LTX1, for 100-199 write to LVA1, and for 200-299 write to LOR1. The NoSQL database is updated with data as LTX1, such as game type, puzzle ID, organization ID, organization type, current player count+1, and current score+new score. The NoSQL database is next updated with the same data as LVA1 and then LOR1.

Figure 13:
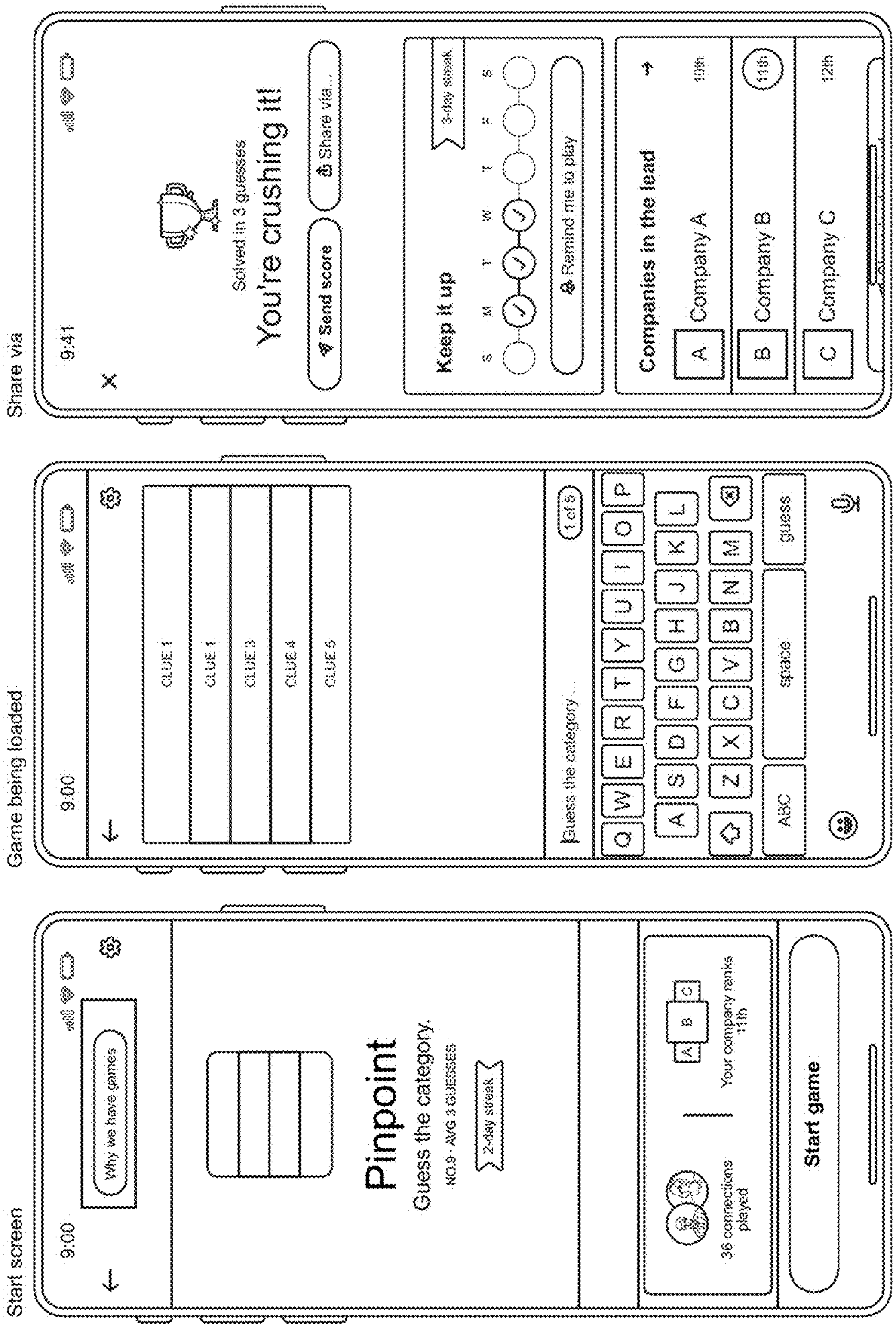
FIG. 13 illustrates a set of graphical users interfaces (GUIs) for a game in accordance with one embodiment.

FIG. 13 depicts an example of a first set of GUIs 226 and/or game interface 228 for a game called "Pinpoint" provided by a gaming application 112 of the game managing system 110 of the connections networking system 102. The first set of GUIs 226 comprise, for example, a start screen, an example of game play, and an end screen at completion of the game. The game managing system 110 of the connections networking system 102 may offer other games as well. Embodiments are not limited to this example.

Figure 14:
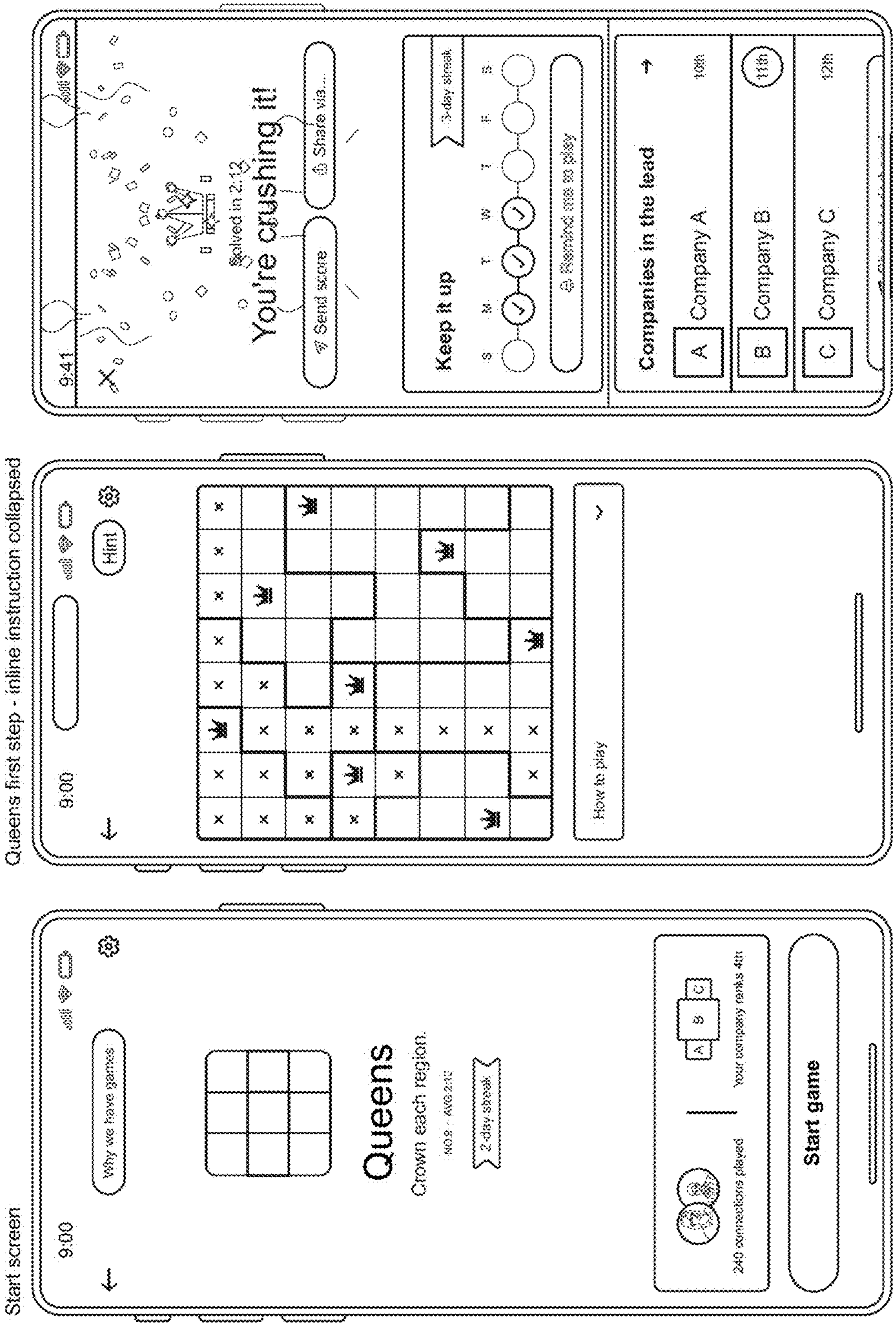
FIG. 14 illustrates a set of GUIs for a game in accordance with one embodiment.

FIG. 14 depicts an example of a second set of GUIs 226 and/or game interface 228 for a game called "Queens" provided by a gaming application 112 of the game managing system 110 of the connections networking system 102. The second set of GUIs 226 comprise, for example, a start screen, an example of game play, and an end screen at completion of the game. The game managing system 110 of the connections networking system 102 may offer other games as well. Embodiments are not limited to this example.

Figure 15:
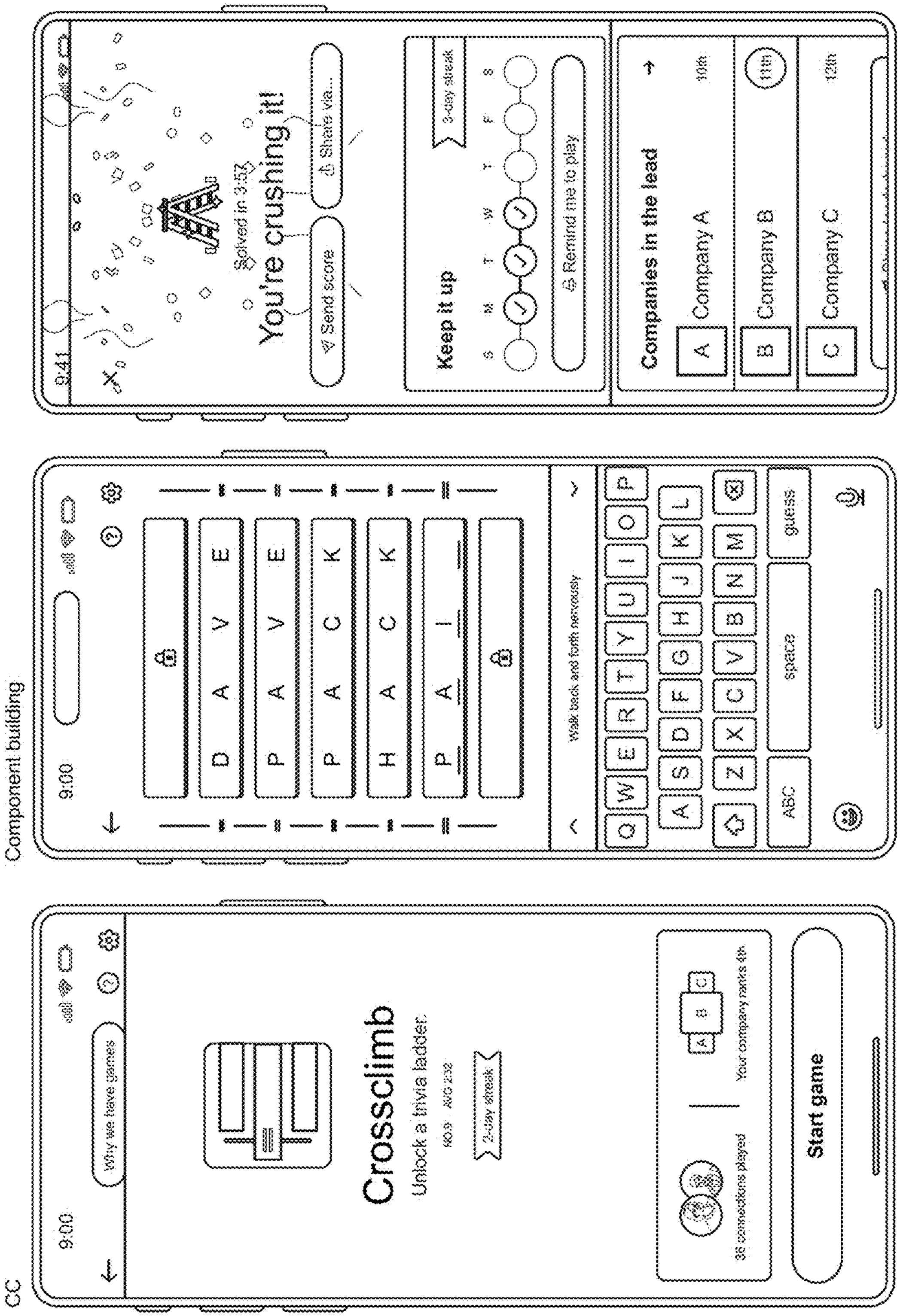
FIG. 15 illustrates a set of GUIs for a game in accordance with one embodiment.

FIG. 15 depicts an example of a third set of GUIs 226 and/or game interface 228 for a game called "Crossclimb" provided by a gaming application 112 of the game managing system 110 of the connections networking system 102. The third set of GUIs 226 comprise, for example, a start screen, an example of game play, and an end screen at completion of the game. The game managing system 110 of the connections networking system 102 may offer other games as well. Embodiments are not limited to this example.

Figure 16:
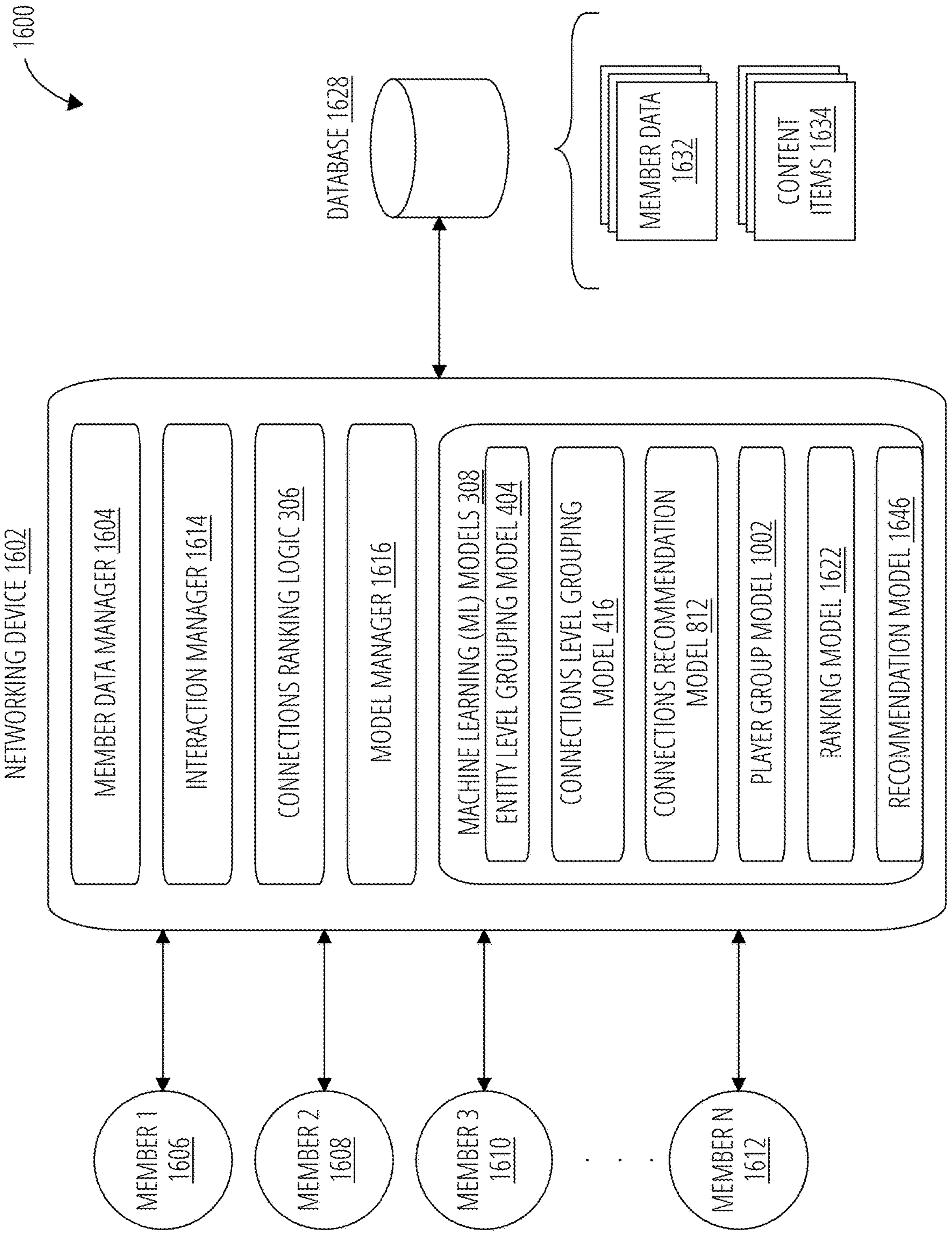
FIG. 16 illustrates a networking system in accordance with one embodiment.

FIG. 16 illustrates a networking platform 1600. The networking platform 1600 is an example of networking platform components that is suitable for implementation by a connections networking system as described herein.

The networking platform 1600 comprises a networking device 1602. The networking device 1602 comprises a member data manager 1604, an interaction manager 1614, the connections ranking logic 306, a model manager 1616, and one or more ML models 308. The ML models 308 may comprise an entity level grouping model 404, connections level grouping model 416, connections recommendation model 812, large language model 506, embedding model 510, first LLM 602, second LLM 604, first embedding model 702, and/or second embedding model 704, as previously described. In addition, the ML models 308 may include a ranking model 1622 and a recommendation model 1646.

The networking device 1602 may comprise or implement a ranking model 1622. The ranking model 1622 assigns a score or rank to a set of items or entities based on their relevance to a particular query or context. This concept is useful for information retrieval, recommendation systems, search engines, and other applications where the goal is to prioritize or order a list of items according to their perceived importance or suitability. In the context of a ranking model 1622, a ML model is trained to learn the underlying patterns and preferences in the data in order to assign appropriate ranks to items. For example, in a search engine, the ranking system might prioritize web pages based on their relevance to a user's query, while in a recommendation system, the ranking system could order products or content based on their predicted appeal to a user. ML models used in ranking models 1622 often leverage algorithms such as learning-to-rank (LTR) methods, which aim to directly optimize a ranking function based on pairs or lists of items and their associated relevance or preference scores. This allows the ML model to learn to order items in a way that aligns with human judgments or user behavior. Overall, a ranking model 1622 enhances the user experience by presenting the most relevant or preferred items at the top of the list, ultimately increasing the likelihood of satisfying the user's needs or preferences.

The networking device 1602 may comprise or implement a recommendation model 1624 designed to output a recommendation. The recommendation model 1624 is a type of algorithm or system designed to predict or suggest items of interest to users based on their preferences or behavior. These systems are useful in various applications, such as connections networking systems, social networking systems, e-commerce platforms, streaming services, content curation, and personalized marketing, with the goal of providing users with relevant and engaging recommendations. The recommendation model 1624 typically leverages ML techniques to analyze user data, item characteristics, and historical interactions in order to make personalized recommendations. Recommendation model 1624 may encompass several types, including collaborative filtering, content-based filtering, hybrid methods, and matrix factorization and embedding models. These systems are designed to predict or suggest items to users based on their preferences and interactions. For example, collaborative filtering analyzes user-item interactions to identify similarities between users or items, while content-based filtering recommends items based on their attributes. Hybrid methods combine both approaches, and matrix factorization and embedding models represent users and items as vectors in a latent space. Regardless of the specific type, recommendation model 1624 leverages machine learning techniques to provide personalized, relevant recommendations, thereby enhancing user experience and engagement in various domains such as connections networking systems, e-commerce, content curation, and personalized marketing. Recommendation model 1624 enhances user experience, increasing user engagement, and driving business outcomes by effectively matching users with relevant content, products, or services. ML models used in recommendation models 1624 are trained to understand and model user preferences, item characteristics, and contextual information to provide personalized and valuable recommendations to users.

The member data manager 1604 manages member data 1632 for one or more members 1-N, such as member 1 1606, member 2 1608, member 3 1610, and member N 1612, where N represents any positive integer. The member data 1632 may be stored by the networking device 1602 or an external database 1628. The database 1628 may store one or more content items 1634.

The interaction manager 1614 may monitor and collect interaction data associated with one or more members 1-N. The interaction data represents interactions between a member 1-N and an interface of the networking device 1602, such as graphical user interface (GUI) presented by a web site generated by the networking device 1602 for the networking platform 1600. Interaction data between a member 1-N and the networking device 1602 of the networking platform 1600 pertains to the recorded activities and communications that occur when the member interacts with the networking device 1602. Collectively, this interaction data is utilized by the connections networking system to enhance user experience, facilitate networking opportunities, personalize content delivery, and improve system functionalities, such as recommendation algorithms and professional development tools. The interaction manager 1614 stores the interaction data as part of the member data 1632.

In the context of the networking platform 1600, interaction data helps shape member experience and enhances system functionality. This data encompasses a range of member activities and interactions as captured by the networking device 1602. Beginning with profile visits, the interaction manager 1614 records which profiles have been viewed by the member, as well as tracking who has visited the member's own profile. This bidirectional visibility offers both parties insights into potential networking and collaborative opportunities. Search queries form another critical part of the interaction data. Members routinely engage with the networking device 1602 search function to discover jobs, connect with other professionals, or seek out information related to their professional interests. The networking device 1602 captures these search terms, providing a valuable window into the member's intent and areas of interest. Content engagement reveals how members interact with various forms of content on the platform. Whether it's through engaging with posts, articles, comments, or expressing themselves via likes, shares, and reactions, each action is logged by the networking device 1602. This data not only reflects the member's interests and preferences but also fosters a vibrant community discourse. Connection requests hold significant value, capturing detailed sent and received networking propositions. This includes tracking of requests that are accepted, pending, or declined, painting a comprehensive picture of networking efforts and outcomes. Messaging data records the direct interactions between the members. This includes the exchange of messages, capturing the content, timing, and identifiers of the parties involved, thereby facilitating direct communication within the professional community. The interaction manager 1614 also monitors job applications initiated by users through the networking device 1602. This includes the tracking of application statuses and any direct communications with potential employers, offering users a streamlined job search experience. Moreover, recommendations and endorsements provide insight into the member's professional standing within the networking platform 1600. Data relating to professional skills endorsements, written recommendations, and the receipt of badges or other forms of recognition speak volumes about the member's reputation and expertise. Lastly, notification interactions are tracked, including the member's responses to system-generated reminders, updates, and alerts. This not only enhances member engagement but also ensures that members remain informed and responsive to relevant activities within their professional network. In sum, the collection and analysis of interaction data between members and the networking platform 1600 constitute a rich source of insights. These interactions facilitate the creation of a dynamic and responsive networking device 1602 that caters to the professional needs and aspirations of its members, thereby reinforcing the value and utility of the networking platform 1600.

The model manager 1616 may manage training operations and/or inferencing operations for the ML models 308. For training, the model manager 1616 may implement a training system to train the each of the ML models 308. An example of a training system is described in more detail with reference to FIG. 21.

Once the model manager 1616 trains the ML models 308, the model manager 1616 may control or manage inferencing operations for the networking device 1602. For example, the model manager 1616 may monitor interaction data associated with a member N of the networking platform 1600 and select the member N to deliver a networking service to the member N. For example, the model manager 1616 may receive interaction data for the member N, retrieve member data 1632 associated with member N from the database 1628, process the member data 1632 for member N using one or more of the ML models 308, select one or more content items 1634 from the database 1628 that may be of interest to the member N based on output of the ML models 1626, deliver the one or more content items 1634 to an electronic device associated with the member N, recommend one or more players 218, recommend one or more games 214, and so forth.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 17:
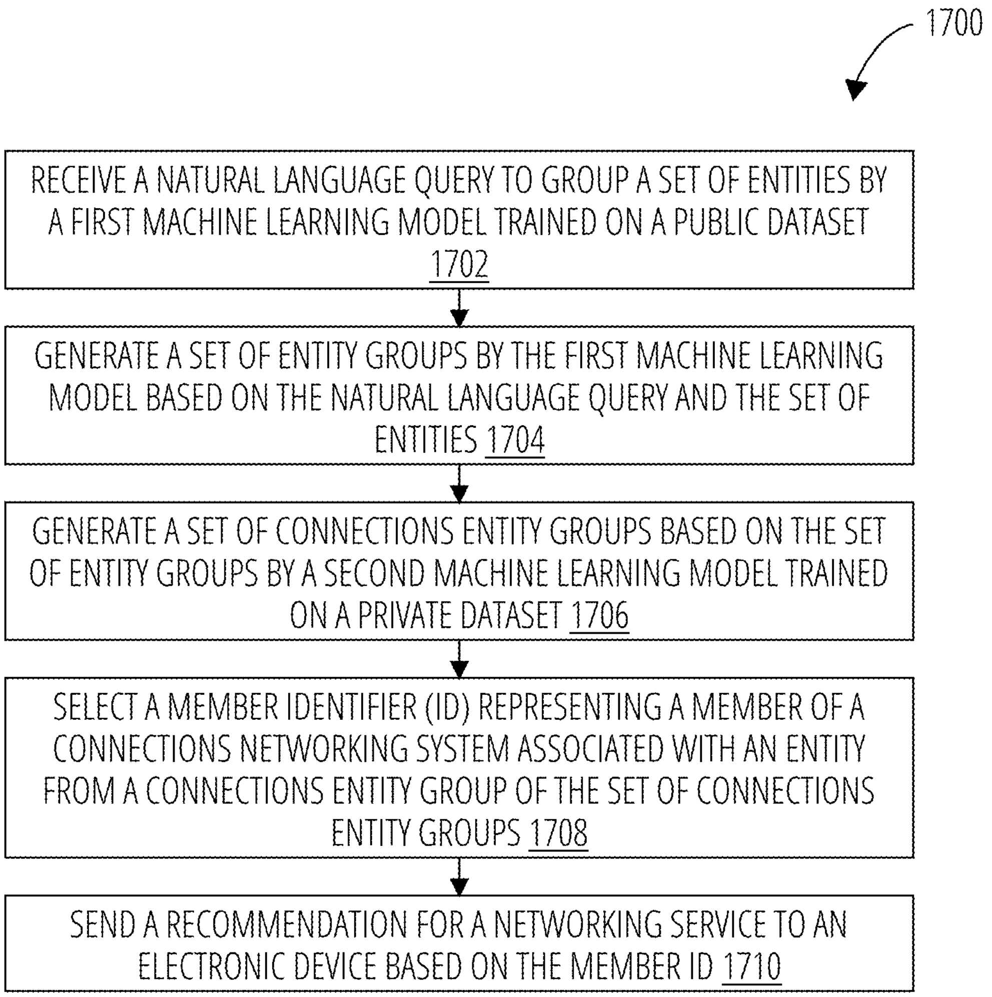
FIG. 17 illustrates a logic flow in accordance with one embodiment.

FIG. 17 illustrates an embodiment of a logic flow 1700. The logic flow 1700 may be representative of some or all of the operations executed by one or more embodiments described herein. For example, the logic flow 1700 may include some or all of the operations performed by devices or entities within the networking platform 1600, such as the networking device 1602. More particularly, the logic flow 1700 illustrates an example where the networking device 1602 performs a set of inferencing operations using the network environment 100 and/or the AI system 300.

As depicted in FIG. 17, in block 1702, logic flow 1700 receives a natural language query 414 to group a set of entities 402 by a first machine learning model trained on a public dataset. In block 1704, logic flow 1700 generates a set of entity groups by the first machine learning model based on the natural language query and the set of entities. In block 1706, logic flow 1700 generates a set of connections entity groups based on the set of entity groups by a second machine learning model trained on a private dataset. In block 1708, logic flow 1700 selects a member identifier (ID) representing a member of a connections networking system associated with an entity from a connections entity group of the set of connections entity groups. In block 1710, logic flow 1700 sends a recommendation for a networking service to an electronic device based on the member ID.

By way of example, an entity level grouping model 404 receives a natural language query 414 to group a set of entities 402 trained on a public dataset of training information, such as collected on a public database, the Internet, government agencies, and so forth. The entity level grouping model 404 generates a set of entity groups, such as entity group 1 406, entity group 2 408, entity group 3 410, and entity group M 412, based on the natural language query 414 and the set of entities 402. A connections level grouping model 416 receives as input the entity groups, and it generates a set of connections entity player groups 220 based on the set of entity groups. The connections level grouping model 416 is trained on a private dataset, such as connections data 116 and/or entity data 118 of the connections networking system 102. The member data manager 1604 selects a member identifier (ID) representing a member, such as member 1 1606, member 2 1608, member 3 1610, or member N 1612, of a connections networking system 102 associated with an entity 1 1102, entity 2 1112, or entity 3 1122 from a connections entity group 1 418 of the set of connections entity player groups 220. The recommendation model 1624 receives the selected member, and it sends a recommendation for a networking service to an electronic device, such as client system 122, based on the member ID. For example, the recommendation model 1624 generates and sends a recommendation for the member to join one or more player groups 220, an invite to play a game from the game library 134 either alone or as part of a team, an entity-specific competition, or an entity-level tournament against other teams, entities, or player groups 220, to connect with a member, to follow a member or an entity, to purchase a product or service, and other types of recommendations associated with, or relevant to, the connections networking system 102.

In one embodiment, for example, the entity level grouping model 404 receives the natural language query 414 by a first LLM 602 of the entity level grouping model 404. The first LLM 602 generates a candidate set of entity groups 618 as part of results 608. A second LLM 604 of the entity level grouping model 404 receives the candidate set of entity groups 618, and it generates feedback information 610 for the candidate set of entity groups 618 using a set of critique parameters 616 embedded for the second LLM 604. The entity level grouping model 404 generates the set of entity groups based on the candidate set of entity groups 618 generated by the first LLM 602 and the feedback information 610 from the second LLM 604. The first LLM 602 and the second LLM 604 may exchange information in any number of iterations as defined by a hyperparameter or until a terminating condition is reached.

In one embodiment, for example, a filter 514 is configured to filter the set of connections entity groups based on a set of filter parameters 516. Non-limiting examples of filter parameters 516 include an entity location, an entity type, or an entity size. For example, the large language model 506 may receive a set of entities 402 and a query 414. The query 414 may originate from a user, such as an individual, a member, an entity, and so forth. Additionally, or alternatively, the prompt generator 504 may generate the query 414. The large language model 506 generates first entity sets 508, where each of the first entity sets 508 comprises one or more of the entities 402, based on the query 414. In one embodiment, the large language model 506 uses the first LLM 602 and the second LLM 604 to generate the first entity sets 508. An embedding model 510 receives the first entity sets 508, and it generates second entity sets 512. Similar to the large language model 506, the embedding model 510 uses multiple ML models, such as first embedding model 702 and second embedding model 704. The first embedding model 702 generates a candidate set of entity groups 718. The second embedding model 704 critiques the candidate set of entity groups 718 using one or more critique parameters 716. The second embedding model 704 generates feedback information 710. The first embedding model 702 uses the feedback information 710 to generate the second entity sets 512. The filter 514 filters the second entity sets 512 using the filter parameters 516 to obtain third entity sets 518. The AI system 300 stores the third entity sets 518 as the entity data 118 of the connections networking system 102.

In one embodiment, for example, the recommendation model 1624 of the networking device 1602 sends a recommendation for playing one or more games 214 executed by one or more gaming applications 112 as a networking service of the connections networking system 102. For example, the recommendation model 1624 uses the connections data 116 for member 1 1606 to send a recommendation to member 2 1608 to play a game with member 1 1606 or join a team with member 1 1606.

In one embodiment, for example, the connections ranking logic 306 updates one or more leaderboards 224 for one or more gaming applications 112 based on the set of connections entity groups. For example, the ranking calculator 1210 receives player score sets, such as player score set 1 1202, player score set 2 1204, player score set 3 1206, and player score set R 1208, for players 218 in the player group 1 1132, player group 2 1134, player group 3 1136, and player group S 1138, respectively. The ranking calculator 1210 generates a set of rankings 1214 from the player scores. The connections ranking logic 306 uses the rankings 1214 to generate a set of leaderboard updates 1212. The connections ranking logic 306 uses the leaderboard updates 1212 to update the leaderboards 224. The connections networking system 102 and/or the client systems 122 may present the leaderboards 224 on a user interface.

In one embodiment, for example, the ranking calculator 1210 receives a game score for one or more games 214 executed by one or more gaming applications 112 associated with the member ID, such as a member ID for the member 1 1606. The ranking calculator 1210 generates a ranking score for the member ID based on the game score, and it ranks the member ID on one or more leaderboards 224 for the one or more gaming applications 112.

In one embodiment, for example, the ranking calculator 1210 receives multiple game scores for multiple games executed by the gaming application associated with the entity from the connections entity group of the set of connection entity groups. The ranking calculator 1210 generates a ranking score for the entity based on the multiple game scores, and the connections ranking logic 306 ranks the entity on a leaderboard using leaderboard updates 1212 for the gaming application. The ranking calculator 1210 generates the ranking score for the entity based on the multiple game scores by multiplying a first weight parameter by an average game score for the multiple game scores to obtain a first intermediate value, multiplying a second weight parameter by a number of member IDs associated with the entity divided by a number of daily unique member IDs associated with the entity to obtain a second intermediate value, and adding the first intermediate value and the second intermediate value to generate the ranking score for the entity. The first weight parameter and the second weight parameter are configurable values.

In one embodiment, for example, the connections recommendation logic 304 generates a player pool for the entity of the connections entity group of the set of connections entity groups, the player pool comprising multiple member IDs representing members of the connections networking system associated with the entity, receives connections data for the multiple member IDs, generates a set of player recommendations for the entity of the connections entity group by a third machine learning model based on the connections data and the multiple member IDs, and forms a player group for the entity of the connections entity group by a fourth machine learning model based on the set of player recommendations. For example, the connections recommendation logic 304 generates a player pool 1 804, player pool 2 806, player pool 3 808, and/or player pool P 810 for an entity 1 1102 of a connections entity group 1 418 of the set of connections entity groups. For example, the player pool 1 804 comprises multiple member IDs representing members of the connections networking system 102 associated with the entity 1 1102. A connections recommendation model 812 receives connections data 116 for the multiple member IDs, and it generates a set of player recommendations 814 for the entity 1 1102 of the connections entity group 1 418 based on the connections data 116 and the multiple member IDs. A player group model 1002 forms a player group, such as one of the player groups 220, for the entity 1 1102 of the connections entity group 1 418 from the players 218 based on the set of player recommendations 814.

In one embodiment, for example, the connections recommendation logic 304 generates a player pool for the connections entity group of the set of connections entity groups, the player pool comprising the member ID representing the member of the connections networking system associated with the entity from the connections entity group of the set of connection entity groups, receiving connections data associated with the member ID, the connections data representing a second member ID for a second member of the connections networking system, and sending a recommendation for playing a game executed by the gaming application to an electronic device of the second member ID. For example, the connections recommendation logic 304 generates a player pool 1 804, player pool 2 806, player pool 3 808, and/or player pool P 810 for the connections entity group 1 418 of the set of connections entity groups. For example, the player pool 1 804 comprises a member ID representing member 1 1606 of the connections networking system 102 associated with the entity 1 1102 from the connections entity group 1 418 of the set of connection entity groups. The connections recommendation model 812 receives connections data 116 associated with the member ID representing member 1 1606, such as connections data 116 representing a second member ID for member 2 1608 of the connections networking system 102. The recommendation model 1624 sends a recommendation for playing a game executed by the gaming application to the client system 122 associated with the second member ID and used by the member 2 1608.

Figure 18:
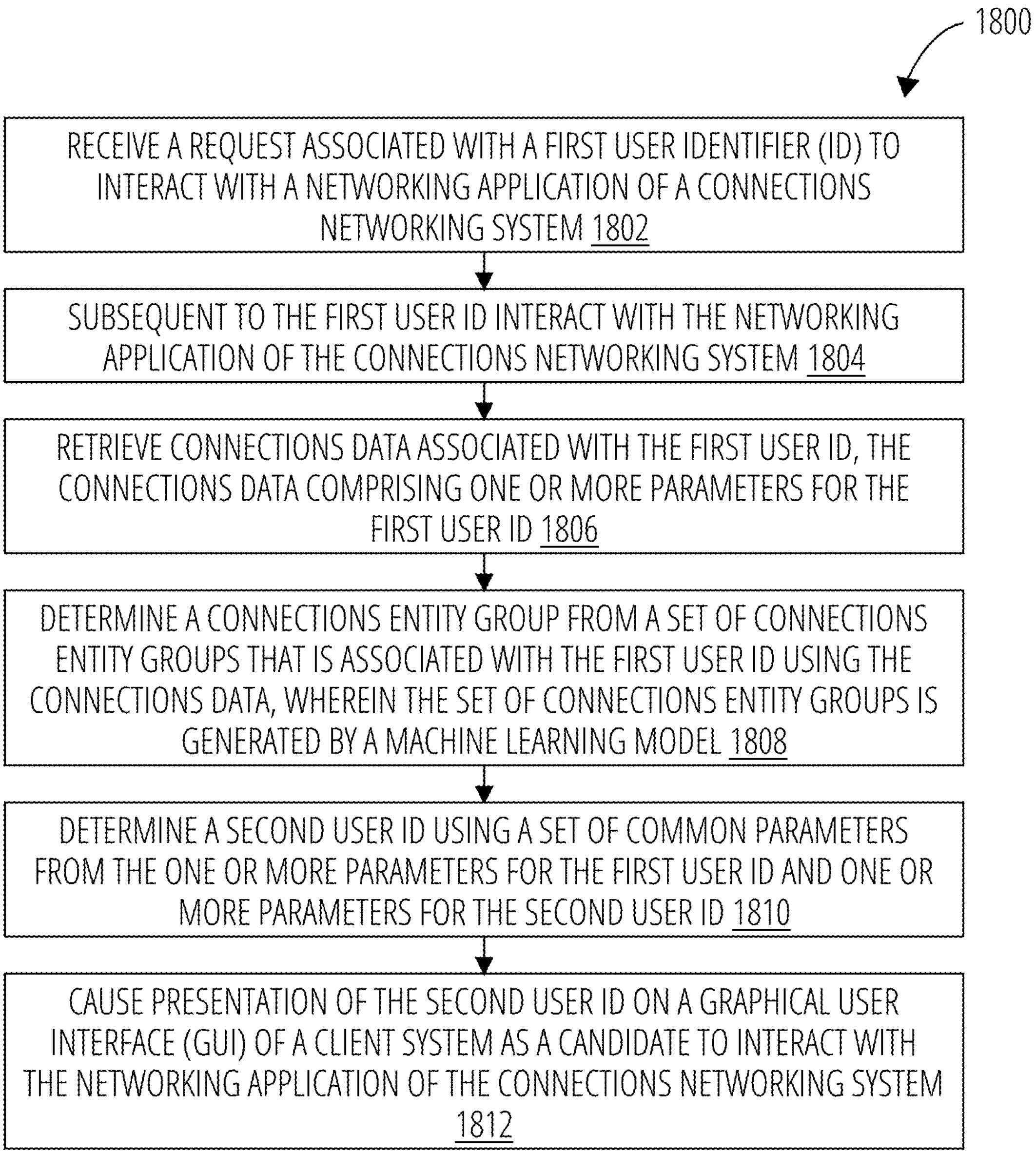
FIG. 18 illustrates a logic flow in accordance with one embodiment.

FIG. 18 illustrates an embodiment of a logic flow 1800. The logic flow 1800 may be representative of some or all of the operations executed by one or more embodiments described herein. For example, the logic flow 1800 may include some or all of the operations performed by devices or entities within the networking platform 1600, such as the networking device 1602. More particularly, the logic flow 1800 illustrates an example where the networking device 1602 performs a set of inferencing operations using the network environment 100 and/or the AI system 300.

In block 1802, logic flow 1800 receives a request associated with a first user identifier (ID) to interact with a networking application of a connections networking system. In block 1804, logic flow 1800 subsequent to the first user ID interacts with the networking application of the connections networking system. In block 1806, logic flow 1800 retrieves connections data associated with the first user ID, the connections data comprising one or more parameters for the first user ID. In block 1808, logic flow 1800 determines a connections entity group from a set of connections entity groups that is associated with the first user ID using the connections data, wherein the set of connections entity groups is generated by a machine learning model. In block 1810, logic flow 1800 determines a second user ID using a set of common parameters from the one or more parameters for the first user ID and one or more parameters for the second user ID. In block 1812, logic flow 1800 causes presentation of the second user ID on a graphical user interface (GUI) of a client system as a candidate to interact with the networking application of the connections networking system.

By way of example, the networking device 1602 implements the logic flow 1800 and performs operations comprising receiving a request associated with a first user identifier (ID) to interact with a networking application 108 of a connections networking system 102. The networking device 1602 also includes, subsequent to the first user ID interacting with the networking application 108 of the connections networking system 102, retrieving connections data 116 associated with the first user ID, the connections data 116 comprising one or more parameters for the first user ID, determining a connections entity group 1 418 from a set of connections entity groups that is associated with the first user ID using the connections data 116, wherein the set of connections entity groups is generated by a machine learning model, such as the connections level grouping model 416, determining a second user ID using a set of common parameters 934 from the one or more parameters for the first user ID and one or more parameters for the second user ID, and causing presentation of the second user ID on a GUI 226 of a client system 122 as a candidate to interact with the networking application 108 of the connections networking system 102.

A ranking calculator 1210 of the networking device 1602 may also perform operations comprising determining a result of the first user ID interacting with the networking application 108 of the connections networking system 102, selecting the connections entity group 1 418 from the set of connections entity groups that is associated with the first user ID, the set of connections entity groups arranged in a sequential order such as rankings 1214, updating a position of the connections entity group 1 418 within the sequential order of the set of connections entity groups based on the result via leaderboard updates 1212, and causing presentation of the sequential order of the set of connections entity groups via the rankings 1214 on the leaderboards 224 of the GUI 226.

The networking device 1602 may also perform operations comprising generating a set of entity groups such as entity group 1 406, entity group 2 408, entity group 3 410, and entity group M 412 by a first machine learning model such as entity level grouping model 404. The entity level grouping model 404 outputs the entity groups to the connections level grouping model 416. The connections level grouping model 416 generates the set of connections entity groups connections entity group 1 418, connections entity group 2 420, connections entity group 3 422, and connections entity group N 424 based on the set of entity groups. In one embodiment, the entity level grouping model 404 is trained in a public dataset, such as found on public data sources on the Internet, and the connections level grouping model 416 is trained on a private dataset, such as the connections data 116 and/or entity data 118 of the connections networking system 102.

The networking device 1602 may also perform operations comprising receiving a natural language query 502 by a first LLM 602 of the entity level grouping model 404, generating a candidate set of entity groups 618 by the first LLM 602, generating feedback information 610 for the candidate set of entity groups 618 by a second LLM 604 of the entity level grouping model 404 using a set of critique parameters 616 for the second LLM 604, and generating the set of entity groups by the entity level grouping model 404 based on the candidate set of entity groups 618 generated by the first LLM 602 and the feedback information 610 from the second LLM 604.

The networking device 1602 may also perform operations comprising sending a message to the client system 122 associated with the second user ID to request an interaction with the networking application 108 of the connections networking system 102 with the first user ID. In one embodiment, for example, the networking application 108 is a gaming application 112.

The networking device 1602 may also perform operations comprising receiving a game score for one or more games 214 executed by the gaming application 112 associated with the first user ID, generating a ranking score for the first user ID based on the game score, and causing presentation of a ranking of the first user ID on one or more leaderboards 224 for the gaming application 112 on the GUI 226.

The networking device 1602 may also perform operations comprising receiving multiple game scores for multiple games 214 executed by the gaming application 112 associated with an entity 1 1102 from the connections entity group 1 418 of the set of connection entity groups, generating a ranking score for the entity 1 1102 based on the multiple game scores, and ranking the entity 1 1102 on one or more leaderboards 224 for the gaming application 112 on the GUI 226.

The networking device 1602 may also perform operations comprising generating the ranking score for the entity 1 1102 based on the multiple game scores by multiplying a first weight parameter by an average game score for the multiple game scores to obtain a first intermediate value, multiplying a second weight parameter by a number of user IDs associated with the entity divided by a number of daily unique user IDs associated with the entity to obtain a second intermediate value, and adding the first intermediate value and the second intermediate value to generate the ranking score for the entity.

The networking device 1602 may also perform operations comprising generating a player pool 1 804 for an entity 1 1102 of the connections entity group 1 418 of the set of connections entity groups, the player pool 1 804 comprising multiple user IDs representing users or players 218 of the connections networking system 102 associated with the entity 1 1102, receiving connections data 116 for the multiple user IDs, generating a set of player recommendations 814 for the entity 1 1102 of the connections entity group 1 418 by a third machine learning model such as the connections recommendation model 812 based on the connections data 116 and the multiple member IDs, and forming a player group 1 1132 for the entity 1 1102 of the connections entity group 1 418 by a fourth machine learning model such as the player group model 1002 based on the set of player recommendations 814.

Figure 19:
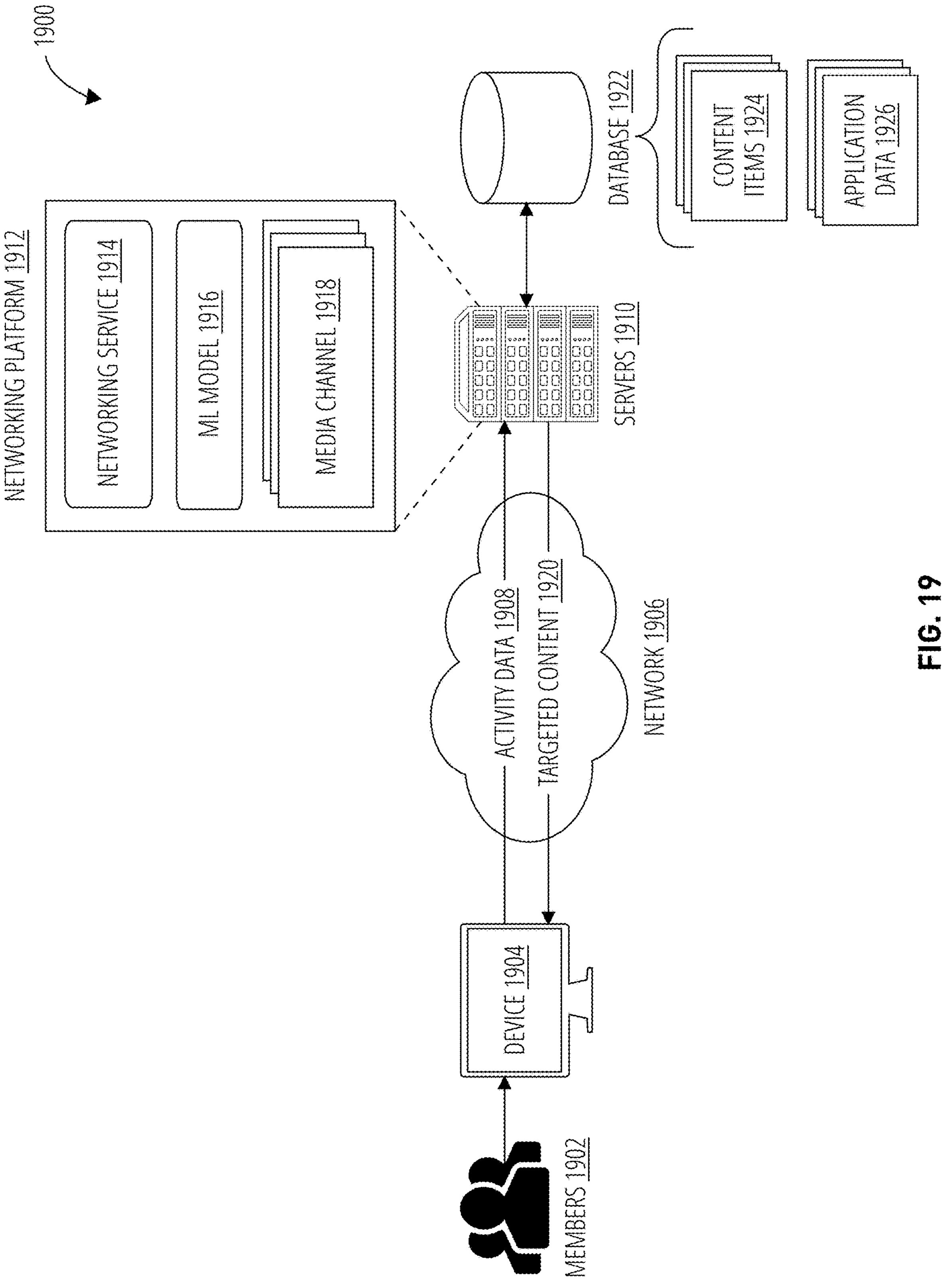
FIG. 19 illustrates a content delivery system in accordance with one embodiment.

FIG. 19 illustrates a networking system 1900. The networking system 1900 is an example of a connections networking system or a connections networking system designed to deliver targeted content 1920 to one or more members 1902 using, for example, the networking platform 1600. The targeted content 1920 may comprise, for example, recommendations, advertisements, content, messages, suggestions, hyperlinks, files, job postings, articles, and any other content offered by the networking system 1900.

The networking system 1900 comprises a device 1904, a set of one or more servers 1910, and a database 1922. The device 1904 and the servers 1910 may communicate information via a network 1906. The device 1904 may comprise an electronic device, such as a smartwatch, smartphone, tablet, laptop computer, desktop computer, and so forth. The servers 1910 may be implemented as part of a data center, such as a cloud computing system. The device 1904 and the servers 1910 may be implemented using an architecture as described in FIG. 25. The network 1906 may be implemented using an architecture as described in FIG. 26. Embodiments are not limited to these example implementations.

The one or more servers 1910 implements a networking platform 1912. In one embodiment, the networking platform 1912 includes at least one processor; at least one memory including instructions executable by the at least one processor; and an ML model 1916 comprising parameters and/or hyperparameters stored in the at least one memory. In one embodiment, for example, the ML model 1916 comprises an example of a residual DCN for an AI system implemented by the networking system 1900 to offer a networking service 1914 by the networking platform 1912 as described herein. The networking service 1914 may select one or more content items 1924 for delivery as targeted content 1920 over one or more media channels 1918 to the device 1904. A members 1902 may interact with a graphical user interface (GUI) to access the targeted content 1920 for presentation on the device 1904.

The servers 1910 may include networking platform 1912 implementing a networking service 1914 that is designed for providing a networking service to a members 1902 of the networking platform 1912. connections networking platforms offer a wide range of networking services to facilitate connections, career development, and knowledge sharing. Some examples of a networking service 1914 offered by the networking platform 1912 include without limitation: (1) users can create a professional profile to showcase their skills, work experience, education, and professional accomplishments; (2) users can connect with colleagues, industry professionals, and potential employers to expand their professional network; (3) messaging capabilities for direct communication between users, facilitating professional conversations and networking opportunities; (4) users can join and participate in industry-specific groups and communities to engage in discussions, share insights, and network with like-minded professionals; (5) search job listings and recruiting tools for users to search for employment opportunities, apply for jobs, and connect with talent; (6) users can share industry-related content, articles, and professional updates to showcase expertise and engage with their network; and (7) access learning resources, courses, and training programs to support ongoing professional development and skill enhancement. These networking services are designed to help professionals connect, collaborate, and grow their careers. Embodiments are not limited to these examples.

In an example process, the networking platform 1912 obtains activity data 1908 from a members 1902 via the device 1904. The members 1902 interacts with the networking platform 1912 via a user interface of the networking platform 1912. In some cases, portions of the user interface are displayed on a personal machine or device 1904 of the members 1902. The activity data 1908 represents various actions, activities or behaviors of the members 1902. For example, activity data 1908 may represent data collected as the members 1902 interacts with content items 1924 of the database 1922 served via the servers 1910. Session data is any activity data 1908 collected during a defined session time window, such as activity of the user over a 24 h period or some other time interval. For example, the members 1902 may interact with the device 1904 to communicate with networking platform 1912 of one or more of the servers 1910 to access one or more content items 1924 stored by the database 1922. The members 1902 may perform various activities, such as browsing a web site, searching for a job posting, reading content, watching a streaming video, messaging other members, or engaging in electronic commerce. The session data, including the activity data 1908, is transferred between the device 1904 and the servers 1910.

More particularly, the networking platform 1912 comprises the networking service 1914, which includes or accesses an ML model 1916 such as a residual DCN, and data for one or more media channels 1918. The networking service 1914 is responsible for creation of targeted content 1920 based on activity data 1908 and/or session data associated with the members 1902. The networking service 1914 uses the ML model 1916 to support such activities. The networking service 1914 then targets delivery of specific messages to users within user segments, such as targeted content 1920 for the members 1902, over one or more media channels 1918. The targeted content 1920 is a content item that is relevant to the members 1902 or a user segment, such as messages, predictions, recommendations, advertisements, or suggestions to improve user experience.

The targeted content 1920 is delivered through one or more of the media channels 1918. A media channel refers to a specific platform or medium through which targeted content, such as advertisements, are disseminated to a target user. Media channels 1918 can include various forms of digital and traditional media such as websites, mobile applications, social media platforms, television, radio, print publications, and outdoor advertising spaces. Each media channel possesses its own unique characteristics and user demographics, allowing advertisers to tailor their messages to reach the desired target user effectively. message provider, such as advertisers, often choose certain media channels based on factors such as user engagement, reach, cost, and the compatibility of the channel with their target market. An example of the media channel 1918 is a social media platform or a professional media platform, or some other mode of information transfer within the platform.

The networking platform 1912 or components thereof are implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) can also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Database 1922 is an organized collection of data. For example, the database 1922 stores data in a specified format known as a schema. The database 1922 can be structured as a single database, a distributed database, multiple distributed databases, or an emergency backup database. In some cases, a database controller manages data storage and processing in database 1922. In some cases, a user interacts with the database controller. In other cases, the database controller operates automatically without user interaction. The database 1922 is configured to store various content items 1924. The content items 1924 include any multimedia information suitable for presentation by the device 1904, such as HTML code to present websites, text, images, video, messages, advertisements, and so forth. In addition, the database 1922 may store application data 1926. The application data 1926 comprises information and data used by the networking platform 1912. For example, database client device 2002 is configured to store user session data, profiles, embeddings, budgets, cached application programming interface (API) requests, machine learning model parameters, training data, and other data.

Network 1906 facilitates the transfer of information between networking platform 1912, database 1922, and members 1902. Network 1906 is a computer network configured to provide on-demand availability of computer system resources, such as data storage and computing power. In some examples, the network 1906 provides resources without active management by the members 1902. The network 1906 includes data centers available to many users over the Internet. Some large cloud networks have functions distributed over multiple locations from central servers. A server is designated an edge server if it has a direct or close connection to a members 1902. In some cases, a cloud is limited to a single organization. In other examples, the cloud is available to many organizations. In one example, the network 1906 includes a multi-layer communications network comprising multiple edge routers and core routers. In another example, the network 1906 is based on a local collection of switches in a single physical location.

Figure 20:
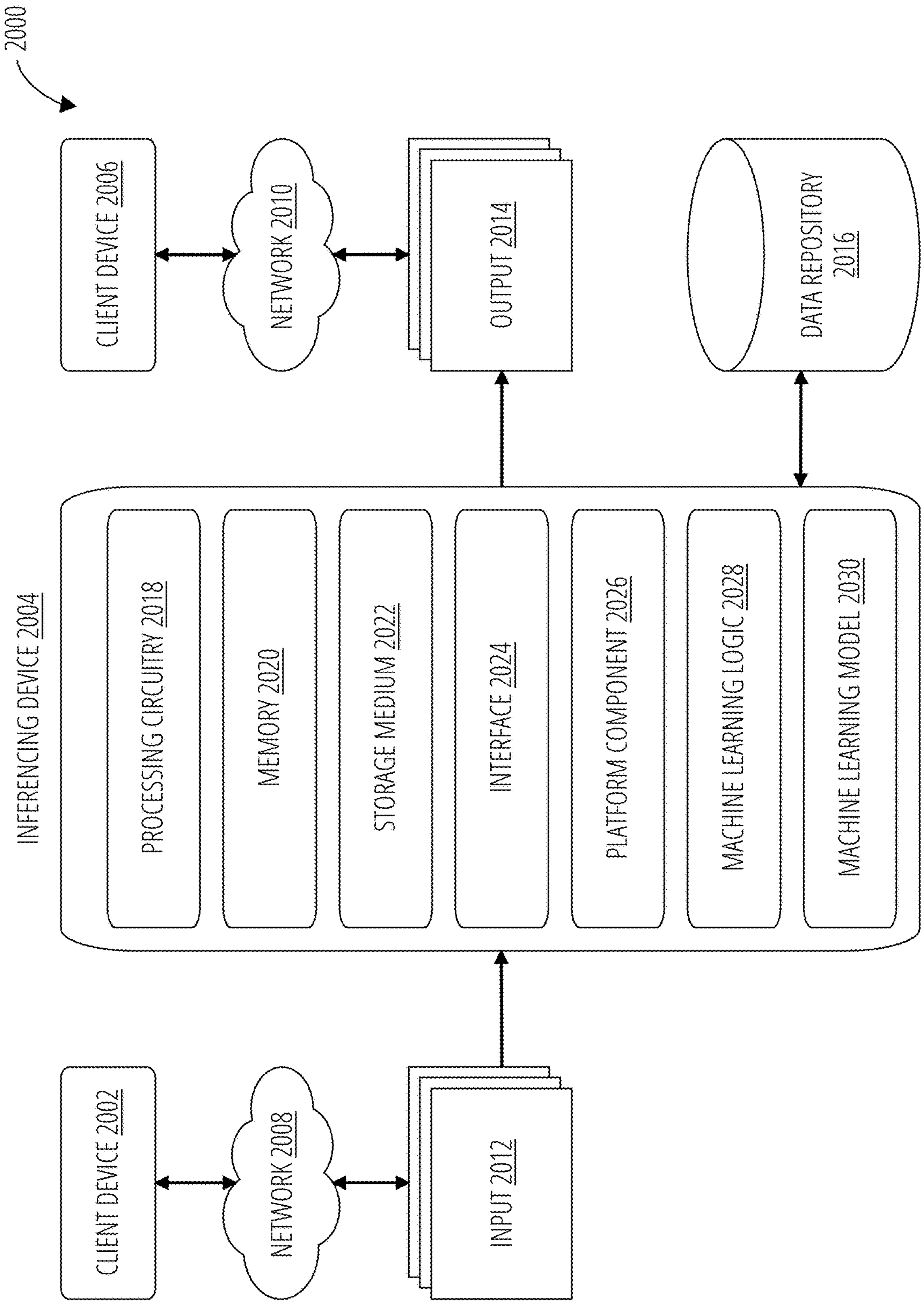
FIG. 20 illustrates a system in accordance with one embodiment.

FIG. 20 illustrates an embodiment of a system 2000. The system 2000 is suitable for implementing one or more embodiments as described herein. In one embodiment, for example, the system 2000 is an AI/ML system suitable for implementing models described with reference to any of the preceding description.

The system 2000 comprises a set of M devices, where M is any positive integer. FIG. 20 depicts three devices (M=3), including a client device 2002, an inferencing device 2004, and a client device 2006. The inferencing device 2004 communicates information with the client device 2002 and the client device 2006 over a network 2008 and a network 2010, respectively. The information may include input 2012 from the client device 2002 and output 2014 to the client device 2006, or vice-versa. In one alternative, the input 2012 and the output 2014 are communicated between the same client device 2002 or client device 2006. In another alternative, the input 2012 and the output 2014 are stored in a data repository 2016. In yet another alternative, the input 2012 and the output 2014 are communicated via a platform component 2026 of the inferencing device 2004, such as an input/output (I/O) device (e.g., a touchscreen, a microphone, a speaker, etc.).

Figure 25:
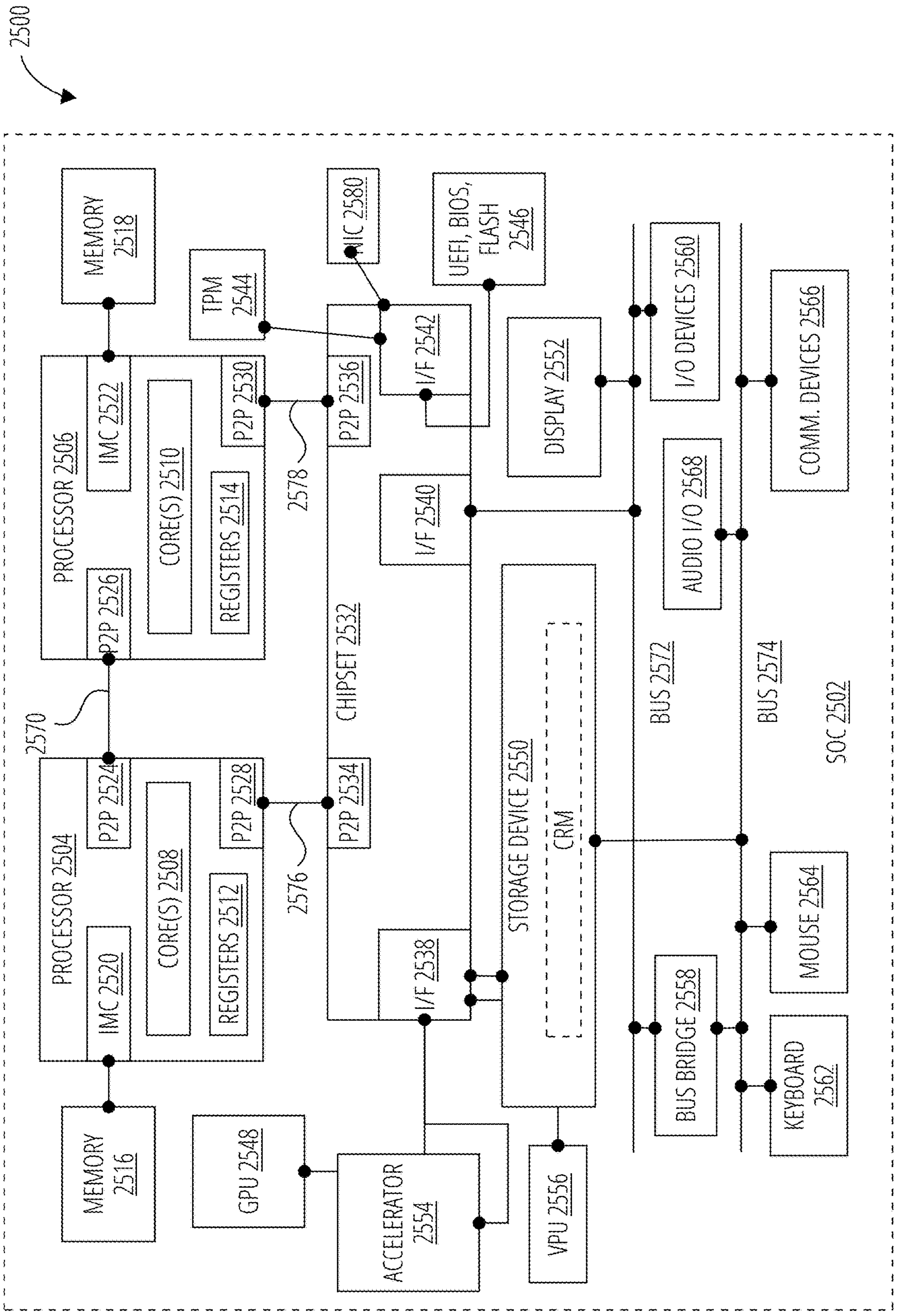
FIG. 25 illustrates a computing architecture in accordance with one embodiment.

As depicted in FIG. 20, the inferencing device 2004 includes processing circuitry 2018, a memory 2020, a storage medium 2022, an interface 2024, a platform component 2026, ML logic 2028, and an ML model 2030. In some implementations, the inferencing device 2004 includes other components or devices as well. Examples for software elements and hardware elements of the inferencing device 2004 are described in more detail with reference to a computing architecture 2500 as depicted in FIG. 25. Embodiments are not limited to these examples.

Figure 26:
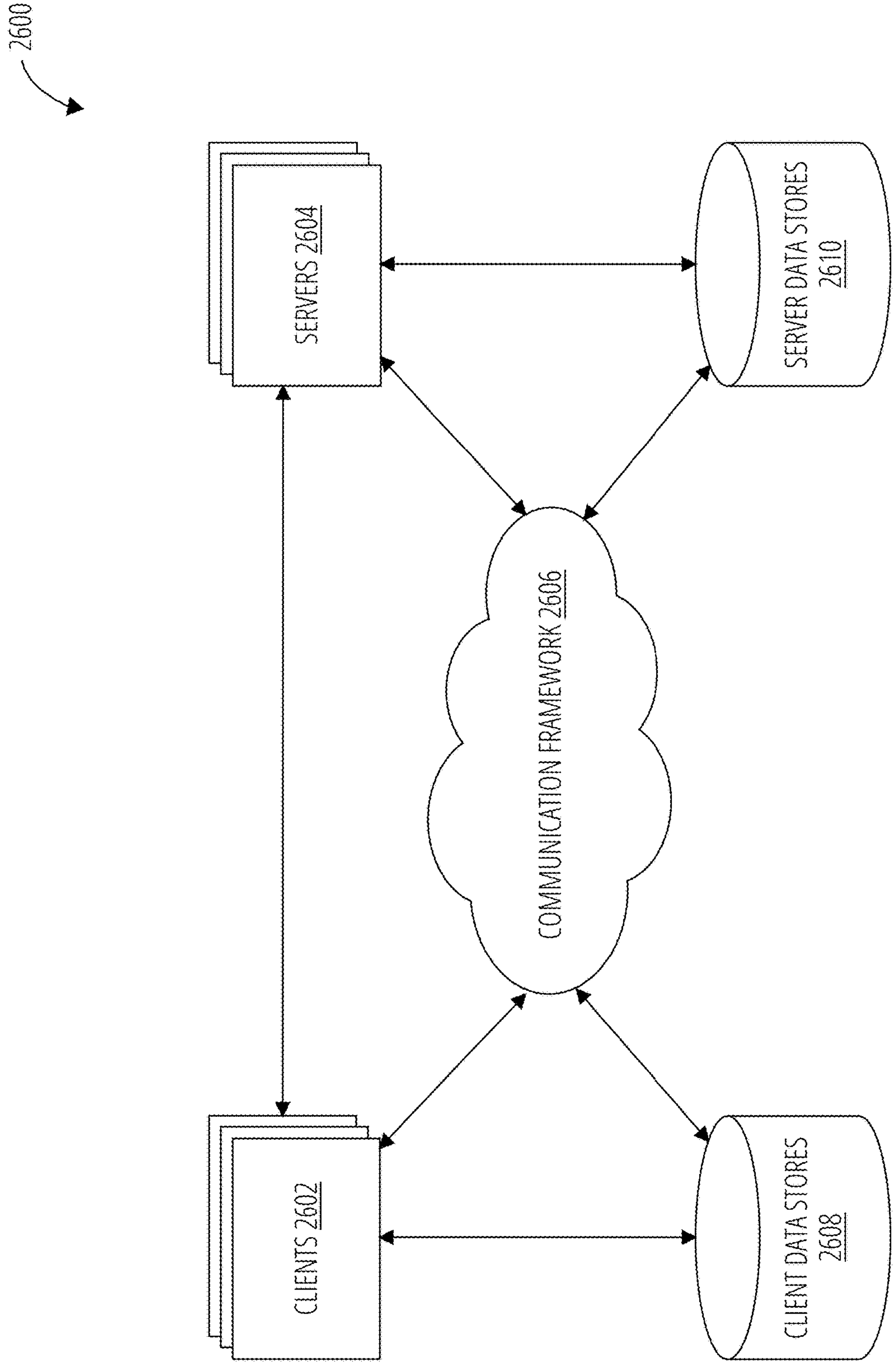
FIG. 26 illustrates a communications architecture in accordance with one embodiment.

The inferencing device 2004 is generally arranged to receive an input 2012, process the input 2012 via one or more AI/ML techniques, and send an output 2014. The inferencing device 2004 receives the input 2012 from the client device 2002 via the network 2008, the client device 2006 via the network 2010, the platform component 2026 (e.g., a touchscreen as a text command or microphone as a voice command), the memory 2020, the storage medium 2022 or the data repository 2016. The inferencing device 2004 sends the output 2014 to the client device 2002 via the network 2008, the client device 2006 via the network 2010, the platform component 2026 (e.g., a touchscreen to present text, graphic or video information or speaker to reproduce audio information), the memory 2020, the storage medium 2022 or the data repository 2016. Examples for the software elements and hardware elements of the network 2008 and the network 2010 are described in more detail with reference to a communications architecture 2600 as depicted in FIG. 26. Embodiments are not limited to these examples.

The inferencing device 2004 includes ML logic 2028 and an ML model 2030 to implement various AI/ML techniques for various AI/ML tasks. The ML logic 2028 receives the input 2012, and processes the input 2012 using the ML model 2030. The ML model 2030 performs inferencing operations to generate an inference for a specific task from the input 2012. In some cases, the inference is part of the output 2014. The output 2014 is used by the client device 2002, the inferencing device 2004, or the client device 2006 to perform subsequent actions in response to the output 2014.

In various embodiments, the ML model 2030 is a trained ML model 2030 using a set of training operations. An example of training operations to train the ML model 2030 is described with reference to FIG. 21.

Figure 21:
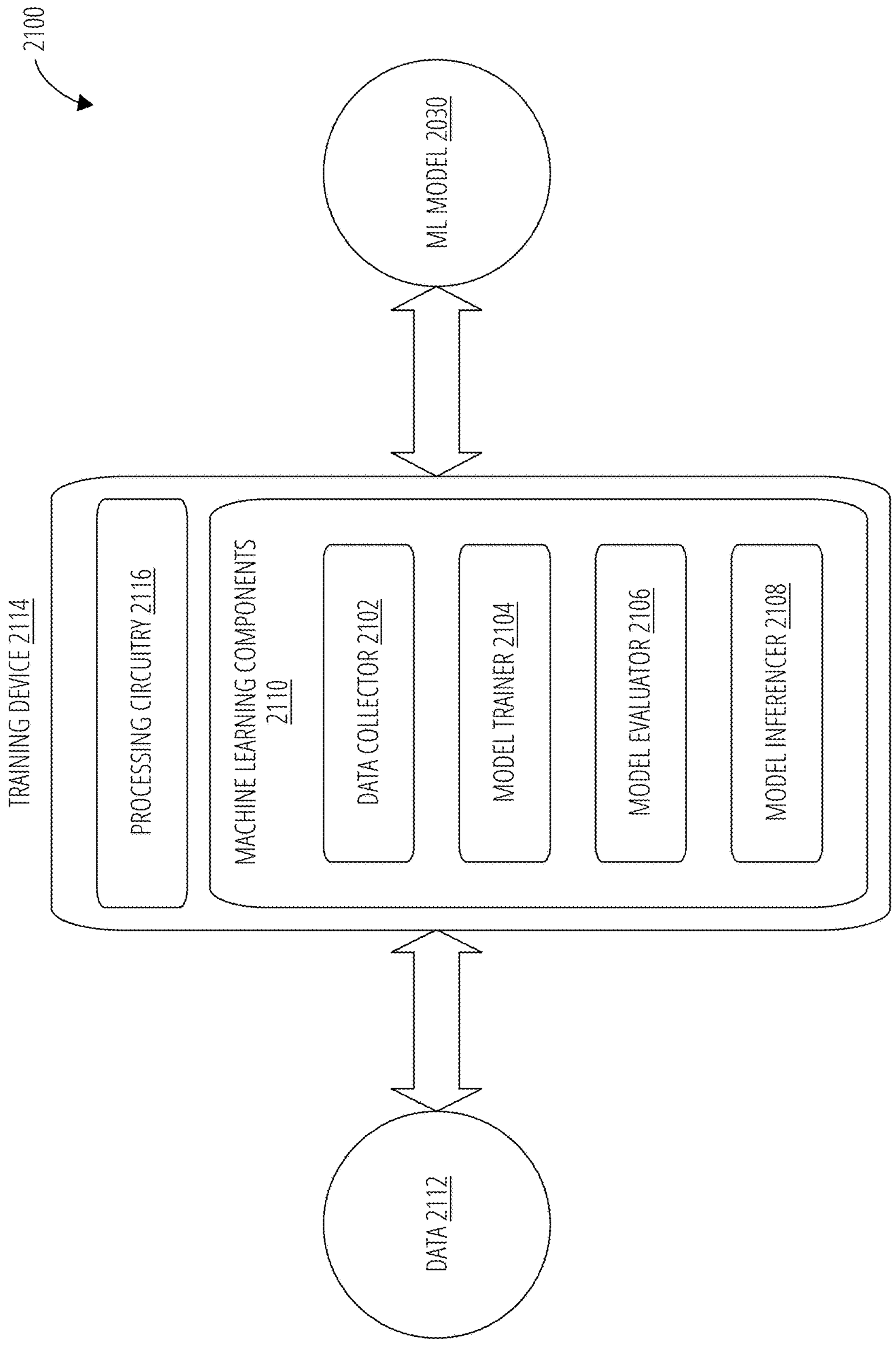
FIG. 21 illustrates an apparatus in accordance with one embodiment.

FIG. 21 illustrates an apparatus 2100. The apparatus 2100 depicts a training device 2114 suitable to generate a trained ML model 2030 for the inferencing device 2004 of the system 2000. As depicted in FIG. 21, the training device 2114 includes a processing circuitry 2116 and a set of ML components 2110 to support various AI/ML techniques, such as a data collector 2102, a model trainer 2104, a model evaluator 2106 and a model inferencer 2108.

In general, the data collector 2102 collects data 2112 from one or more data sources to use as training data for the ML model 2030. The data collector 2102 collects different types of data 2112, such as text information, audio information, image information, video information, graphic information, and so forth. The model trainer 2104 receives as input the collected data and uses a portion of the collected data as test data for an AI/ML algorithm to train the ML model 2030. The model evaluator 2106 evaluates and improves the trained ML model 2030 using a portion of the collected data as test data to test the ML model 2030. The model evaluator 2106 also uses feedback information from the deployed ML model 2030. The model inferencer 2108 implements the trained ML model 2030 to receive as input new unseen data, generate one or more inferences on the new data, and output a result such as an alert, a recommendation or other post-solution activity.

An exemplary AI/ML architecture for the ML components 2110 is described in more detail with reference to FIG. 22.

Figure 22:
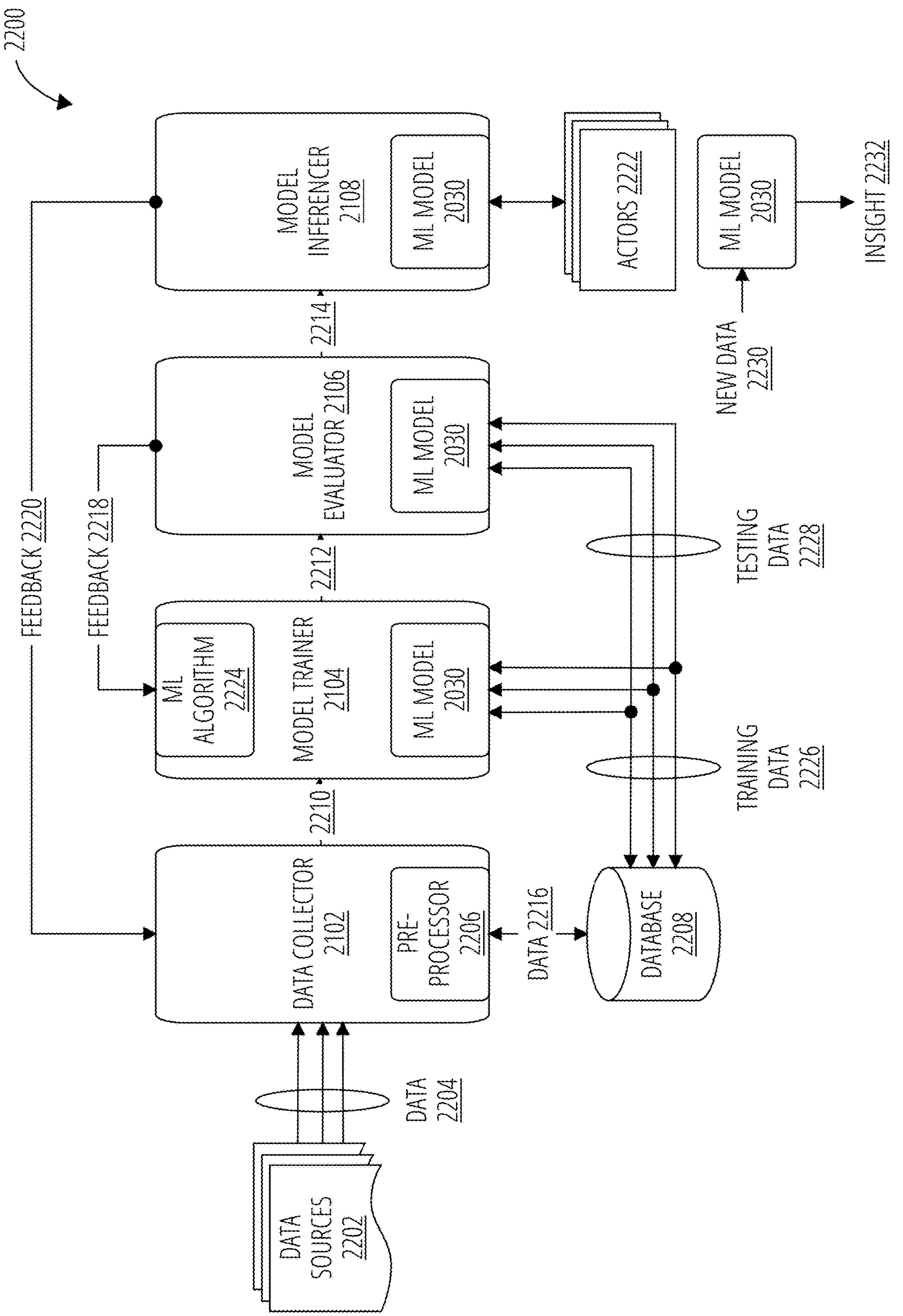
FIG. 22 illustrates an artificial intelligence architecture in accordance with one embodiment.

FIG. 22 illustrates an artificial intelligence architecture 2200 suitable for use by the training device 2114 to generate the ML model 2030 for deployment by the inferencing device 2004. The artificial intelligence architecture 2200 is an example of a system suitable for implementing various AI techniques and/or ML techniques to perform various inferencing tasks on behalf of the various devices of the system 2000.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 2200 includes various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 2030, evaluate performance of the trained ML model 2030, and deploy the tested ML model 2030 as the trained ML model 2030 in a production environment, and continuously monitor and maintain it.

The ML model 2030 is a mathematical construct used to predict outcomes based on a set of input data. The ML model 2030 is trained using large volumes of training data 2226, and it can recognize patterns and trends in the training data 2226 to make accurate predictions. The ML model 2030 is derived from an ML algorithm 2224 (e.g., a neural network, decision tree, support vector machine, etc.). A data set is fed into the ML algorithm 2224 which trains an ML model 2030 to "learn" a function that produces mappings between a set of inputs and a set of outputs with a reasonably high accuracy. Given a sufficiently large enough set of inputs and outputs, the ML algorithm 2224 finds the function for a given task. This function may even be able to produce the correct output for input that it has not seen during training. A data scientist prepares the mappings, selects and tunes the ML algorithm 2224, and evaluates the resulting model performance. Once the ML logic 2028 is sufficiently accurate on test data, it can be deployed for production use.

The ML algorithm 2224 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 2224 of the artificial intelligence architecture 2200 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 22, the artificial intelligence architecture 2200 includes a set of data sources 2202 to source data 2204 for the artificial intelligence architecture 2200. Data sources 2202 may comprise any device capable generating, processing, storing or managing data 2204 suitable for a ML system. Examples of data sources 2202 include without limitation databases, web scraping, sensors and Internet of Things (IoT) devices, image and video cameras, audio devices, text generators, publicly available databases, private databases, and many other data sources 2202. The data sources 2202 may be remote from the artificial intelligence architecture 2200 and accessed via a network, local to the artificial intelligence architecture 2200 an accessed via a network interface, or may be a combination of local and remote data sources 2202.

The data sources 2202 source difference types of data 2204. By way of example and not limitation, the data 2204 includes structured data from relational databases, such as customer profiles, transaction histories, or product inventories. The data 2204 includes unstructured data from websites such as customer reviews, news articles, social media posts, or product specifications. The data 2204 includes data from temperature sensors, motion detectors, and smart home appliances. The data 2204 includes image data from medical images, security footage, or satellite images. The data 2204 includes audio data from speech recognition, music recognition, or call centers. The data 2204 includes text data from emails, chat logs, customer feedback, news articles or social media posts. The data 2204 includes publicly available datasets such as those from government agencies, academic institutions, or research organizations. These are just a few examples of the many sources of data that can be used for ML systems. It is important to note that the quality and quantity of the data is critical for the success of a machine learning project.

The data 2204 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 2202 are communicatively coupled to a data collector 2102. The data collector 2102 gathers relevant data 2204 from the data sources 2202. Once collected, the data collector 2102 may use a pre-processor 2206 to make the data 2204 suitable for analysis. This involves data cleaning, transformation, and feature engineering. Data preprocessing is a critical step in ML as it directly impacts the accuracy and effectiveness of the ML model 2030. The pre-processor 2206 receives the data 2204 as input, processes the data 2204, and outputs pre-processed data 2216 for storage in a database 2208. Examples for the database 2208 includes a hard drive, solid state storage, and/or random access memory (RAM).

The data collector 2102 is communicatively coupled to a model trainer 2104. The model trainer 2104 performs AI/ML model training, validation, and testing which may generate model performance metrics as part of the model testing procedure. The model trainer 2104 receives the pre-processed data 2216 as input 2210 or via the database 2208. The model trainer 2104 implements a suitable ML algorithm 2224 to train an ML model 2030 on a set of training data 2226 from the pre-processed data 2216. The training process involves feeding the pre-processed data 2216 into the ML algorithm 2224 to produce or optimize an ML model 2030. The training process adjusts its parameters until it achieves an initial level of satisfactory performance.

The model trainer 2104 is communicatively coupled to a model evaluator 2106. After an ML model 2030 is trained, the ML model 2030 needs to be evaluated to assess its performance. This is done using various metrics such as accuracy, precision, recall, and F1 score. The model trainer 2104 outputs the ML model 2030, which is received as input 2210 or from the database 2208. The model evaluator 2106 receives the ML model 2030 as input 2212, and it initiates an evaluation process to measure performance of the ML model 2030. The evaluation process includes providing feedback 2218 to the model trainer 2104. The model trainer 2104 re-trains the ML model 2030 to improve performance in an iterative manner.

The model evaluator 2106 is communicatively coupled to a model inferencer 2108. The model inferencer 2108 provides AI/ML model inference output (e.g., inferences, predictions or decisions). Once the ML model 2030 is trained and evaluated, it is deployed in a production environment where it is used to make predictions on new data. The model inferencer 2108 receives the evaluated ML model 2030 as input 2214. The model inferencer 2108 uses the evaluated ML model 2030 to produce insights or predictions on real data, which is deployed as a final production ML model 2030. The inference output of the ML model 2030 is use case specific. The model inferencer 2108 also performs model monitoring and maintenance, which involves continuously monitoring performance of the ML model 2030 in the production environment and making any necessary updates or modifications to maintain its accuracy and effectiveness. The model inferencer 2108 provides feedback 2218 to the data collector 2102 to train or re-train the ML model 2030. The feedback 2218 includes model performance feedback information, which is used for monitoring and improving performance of the ML model 2030.

Some or all of the model inferencer 2108 is implemented by various actors 2222 in the artificial intelligence architecture 2200, including the ML model 2030 of the inferencing device 2004, for example. The actors 2222 use the deployed ML model 2030 on new data to make inferences or predictions for a given task, and output an insight 2232. The actors 2222 implement the model inferencer 2108 locally, or remotely receives outputs from the model inferencer 2108 in a distributed computing manner. The actors 2222 trigger actions directed to other entities or to itself. The actors 2222 provide feedback 2220 to the data collector 2102 via the model inferencer 2108. The feedback 2220 comprise data needed to derive training data, inference data or to monitor the performance of the ML model 2030 and its impact to the network through updating of key performance indicators (KPIs) and performance counters.

As previously described with reference to FIGS. 1, 2, the systems 2000, 2100 implement some or all of the artificial intelligence architecture 2200 to support various use cases and solutions for various AI/ML tasks. In various embodiments, the training device 2114 of the apparatus 2100 uses the artificial intelligence architecture 2200 to generate and train the ML model 2030 for use by the inferencing device 2004 for the system 2000. In one embodiment, for example, the training device 2114 may train the ML model 2030 as a neural network, as described in more detail with reference to FIG. 23. Other use cases and solutions for AI/ML are possible as well, and embodiments are not limited in this context.

Figure 23:
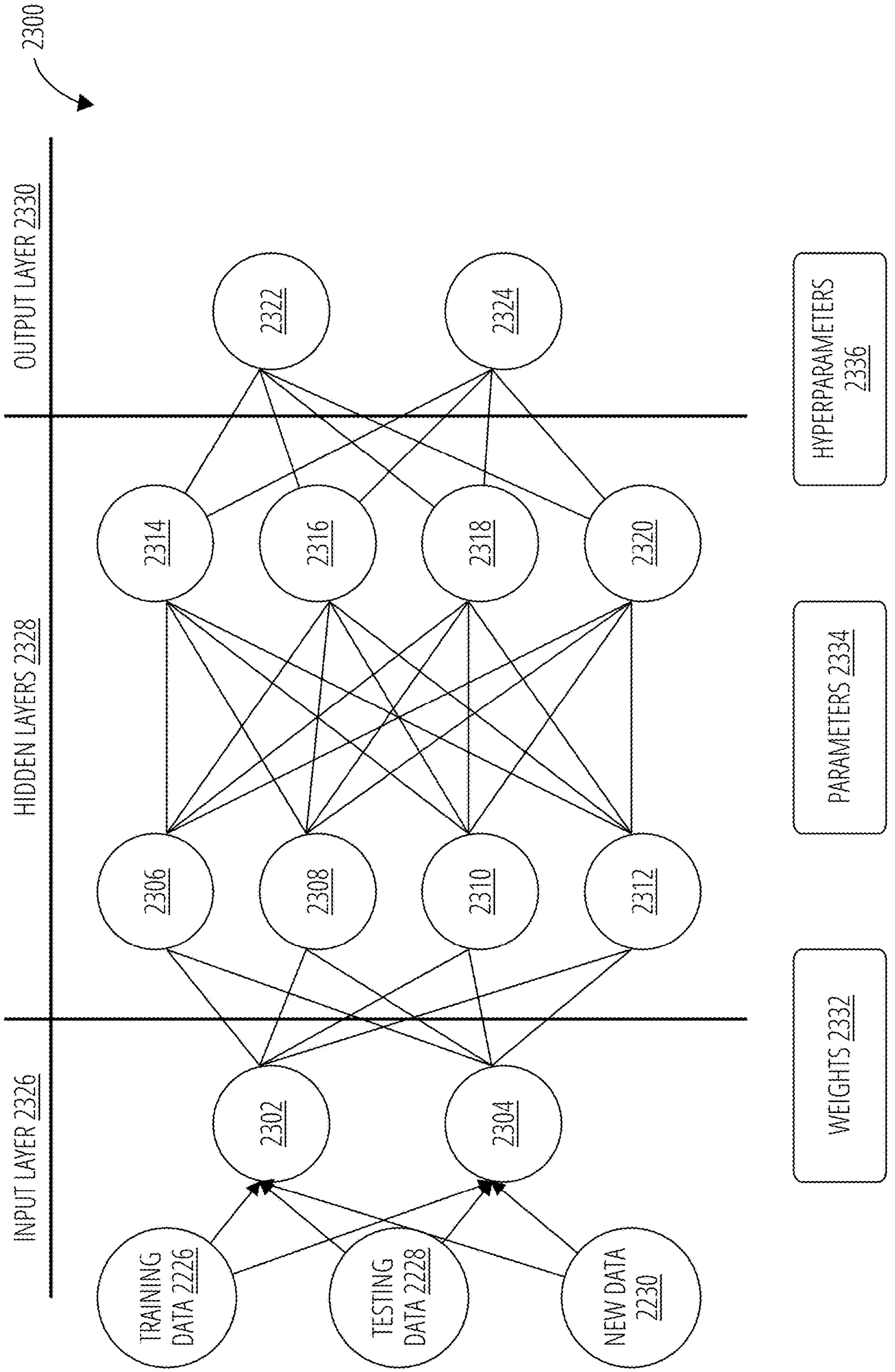
FIG. 23 illustrates an artificial neural network in accordance with one embodiment.

FIG. 23 illustrates an embodiment of an artificial neural network 2300. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 2300 comprises multiple node layers, containing an input layer 2326, one or more hidden layers 2328, and an output layer 2330. Each layer comprises one or more nodes, such as nodes 2302 to 2324. As depicted in FIG. 23, for example, the input layer 2326 has nodes 2302, 2304. The artificial neural network 2300 has two hidden layers 2328, with a first hidden layer having nodes 2306, 2308, 2310 and 2312, and a second hidden layer having nodes 2314, 2316, 2318 and 2320. The artificial neural network 2300 has an output layer 2330 with nodes 2322, 2324. Each node 2302 to 2324 comprises a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 2300 relies on training data 2226 to learn and improve accuracy over time. However, once the artificial neural network 2300 is fine-tuned for accuracy, and tested on testing data 2228, the artificial neural network 2300 is ready to classify and cluster new data 2230 at a high velocity. Tasks in speech recognition or image recognition can take minutes versus hours when compared to the manual identification by human experts.

Each individual node 2302 to 424 is a linear regression model, composed of input data, weights, a bias (or threshold), and an output. The linear regression model may have a formula similar to Equation (10), as follows:

$$\sum wixi + \text{bias} = w1x1 + w2x2 + w3x3 + \text{bias} \qquad \text{EQUATION (10)}$$

$$\text{output} = f(x) = 1 \text{ if } \sum w1x1 + b >= 0;\ 0 \text{ if } \sum w1x1 + b < 0$$

Once an input layer 2326 is determined, a set of weights 2332 are assigned. The weights 2332 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it “fires” (or activates) the node, passing data to the next layer in the network. This results in the output of one node becoming in the input of the next node. The process of passing data from one layer to the next layer defines the artificial neural network 2300 as a feedforward network.

In one embodiment, the artificial neural network 2300 leverages sigmoid neurons, which are distinguished by having values between 0 and 1. Since the artificial neural network 2300 behaves similarly to a decision tree, cascading data from one node to another, having x values between 0 and 1 will reduce the impact of any given change of a single variable on the output of any given node, and subsequently, the output of the artificial neural network 2300.

The artificial neural network 2300 has many practical use cases, like image recognition, speech recognition, text recognition or classification. The artificial neural network 2300 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \to \text{MIN} \qquad \text{EQUATION (11)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 2334 of the model adjust to gradually converge at the minimum.

In one embodiment, the artificial neural network 2300 is feedforward, meaning it flows in one direction only, from input to output. In one embodiment, the artificial neural network 2300 uses backpropagation. Backpropagation is when the artificial neural network 2300 moves in the opposite direction from output to input. Backpropagation allows calculation and attribution of errors associated with each neuron 2302 to 2324, thereby allowing adjustment to fit the parameters 2334 of the ML model 2030 appropriately.

The artificial neural network 2300 is implemented as different neural networks depending on a given task. Neural networks are classified into different types, which are used for different purposes. In one embodiment, the artificial neural network 2300 is implemented as a feedforward neural network, or multi-layer perceptrons (MLPs), comprised of an input layer 2326, hidden layers 2328, and an output layer 2330. While these neural networks are also commonly referred to as MLPs, they are actually comprised of sigmoid neurons, not perceptrons, as most real-world problems are nonlinear. Trained data 2204 usually is fed into these models to train them, and they are the foundation for computer vision, natural language processing, and other neural networks. In one embodiment, the artificial neural network 2300 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 2300 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 2300 is implemented as any type of neural network suitable for a given operational task of system 2000, and the MLP, CNN, and RNN are merely a few examples. Embodiments are not limited in this context.

The artificial neural network 2300 includes a set of associated parameters 2334. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 2300 is implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 2336. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

Figure 24:
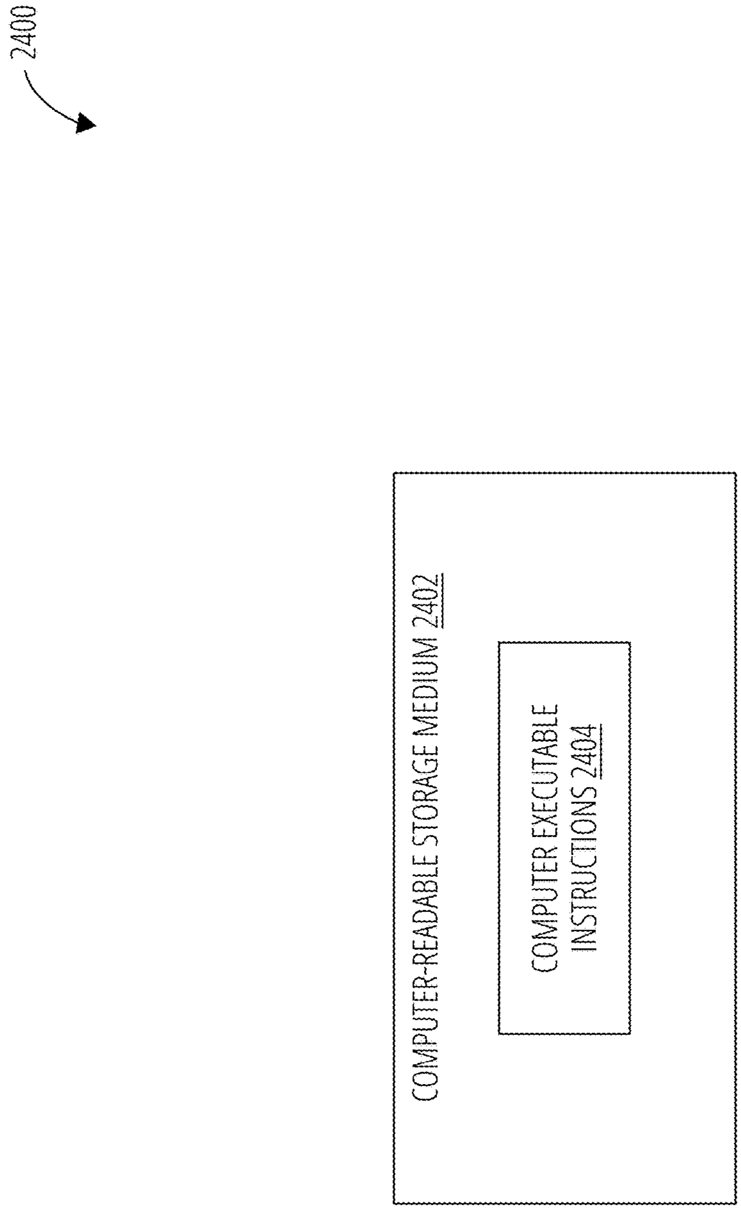
FIG. 24 illustrates a computer-readable storage medium in accordance with one embodiment.

FIG. 24 illustrates an apparatus 2400. Apparatus 2400 comprises any non-transitory computer-readable storage medium 2402 or machine-readable storage medium, such as an optical, magnetic or semiconductor storage medium. In various embodiments, apparatus 2400 comprises an article of manufacture or a product. In some embodiments, the computer-readable storage medium 2402 stores computer executable instructions with which one or more processing devices or processing circuitry can execute. For example, computer executable instructions 2404 includes instructions to implement operations described with respect to any logic flows described herein. Examples of computer-readable storage medium 2402 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 2404 include any suitable type of code, such as source code, compiled code, interpreted code, executable code, static code, dynamic code, object-oriented code, visual code, and the like.

FIG. 25 illustrates an embodiment of a computing architecture 2500. Computing architecture 2500 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 2500 has a single processor with one core or more than one processor. Note that the term "processor" refers to a processor with a single core or a processor package with multiple processor cores. In at least one embodiment, the computing architecture 2500 is representative of the components of the system 2000. More generally, the computing architecture 2500 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 2500. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 25, computing architecture 2500 comprises a system-on-chip (SoC) 2502 for mounting platform components. System-on-chip (SoC) 2502 is a point-to-point (P2P) interconnect platform that includes a first processor 2504 and a second processor 2506 coupled via a point-to-point interconnect 2570 such as an Ultra Path Interconnect (UPI). In other embodiments, the computing architecture 2500 is another bus architecture, such as a multi-drop bus. Furthermore, each of processor 2504 and processor 2506 are processor packages with multiple processor cores including core(s) 2508 and core(s) 2510, respectively. While the computing architecture 2500 is an example of a two-socket (2S) platform, other embodiments include more than two sockets or one socket. For example, some embodiments include a four-socket (4S) platform or an eight-socket (8S) platform. Each socket is a mount for a processor and may have a socket identifier. Note that the term platform refers to a motherboard with certain components mounted such as the processor 2504 and chipset 2532. Some platforms include additional components and some platforms include sockets to mount the processors and/or the chipset. Furthermore, some platforms do not have sockets (e.g. SoC, or the like). Although depicted as a SoC 2502, one or more of the components of the SoC 2502 are included in a single die package, a multi-chip module (MCM), a multi-die package, a chiplet, a bridge, and/or an interposer. Therefore, embodiments are not limited to a SoC.

The processor 2504 and processor 2506 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 2504 and/or processor 2506. Additionally, the processor 2504 need not be identical to processor 2506.

Processor 2504 includes an integrated memory controller (IMC) 2520 and point-to-point (P2P) interface 2524 and P2P interface 2528. Similarly, the processor 2506 includes an IMC 2522 as well as P2P interface 2526 and P2P interface 2530. IMC 2520 and IMC 2522 couple the processor 2504 and processor 2506, respectively, to respective memories (e.g., memory 2516 and memory 2518). Memory 2516 and memory 2518 are portions of the main memory (e.g., a dynamic random-access memory (DRAM)) for the platform such as double data rate type 4 (DDR4) or type 5 (DDR5) synchronous DRAM (SDRAM). In the present embodiment, the memory 2516 and the memory 2518 locally attach to the respective processors (i.e., processor 2504 and processor 2506). In other embodiments, the main memory couple with the processors via a bus and shared memory hub. Processor 2504 includes registers 2512 and processor 2506 includes registers 2514.

Computing architecture 2500 includes chipset 2532 coupled to processor 2504 and processor 2506. Furthermore, chipset 2532 are coupled to storage device 2550, for example, via an interface (I/F) 2538. The I/F 2538 may be, for example, a Peripheral Component Interconnect-enhanced (PCIe) interface, a Compute Express Link® (CXL) interface, or a Universal Chiplet Interconnect Express (UCIe) interface. Storage device 2550 stores instructions executable by circuitry of computing architecture 2500 (e.g., processor 2504, processor 2506, GPU 2548, accelerator 2554, vision processing unit 2556, or the like). For example, storage device 2550 can store instructions for the client device 2002, the client device 2006, the inferencing device 2004, the training device 2114, or the like.

Processor 2504 couples to the chipset 2532 via P2P interface 2528 and P2P 2534 while processor 2506 couples to the chipset 2532 via P2P interface 2530 and P2P 2536. Direct media interface (DMI) 2576 and DMI 2578 couple the P2P interface 2528 and the P2P 2534 and the P2P interface 2530 and P2P 2536, respectively. DMI 2576 and DMI 2578 is a high-speed interconnect that facilitates, e.g., eight Giga Transfers per second (GT/s) such as DMI 3.0. In other embodiments, the processor 2504 and processor 2506 interconnect via a bus.

The chipset 2532 comprises a controller hub such as a platform controller hub (PCH). The chipset 2532 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 2532 comprises more than one controller hub such as a chipset with a memory controller hub, a graphics controller hub, and an input/output (I/O) controller hub.

In the depicted example, chipset 2532 couples with a trusted platform module (TPM) 2544 and UEFI, BIOS, FLASH circuitry 2546 via I/F 2542. The TPM 2544 is a dedicated microcontroller designed to secure hardware by integrating cryptographic keys into devices. The UEFI, BIOS, FLASH circuitry 2546 may provide pre-boot code. The I/F 2542 may also be coupled to a network interface circuit (NIC) 2580 for connections off-chip.

Furthermore, chipset 2532 includes the I/F 2538 to couple chipset 2532 with a high-performance graphics engine, such as, graphics processing circuitry or a graphics processing unit (GPU) 2548. In other embodiments, the computing architecture 2500 includes a flexible display interface (FDI) (not shown) between the processor 2504 and/or the processor 2506 and the chipset 2532. The FDI interconnects a graphics processor core in one or more of processor 2504 and/or processor 2506 with the chipset 2532.

The computing architecture 2500 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 2554 and/or vision processing unit 2556 are coupled to chipset 2532 via I/F 2538. The accelerator 2554 is representative of any type of accelerator device (e.g., a data streaming accelerator, cryptographic accelerator, cryptographic co-processor, an offload engine, etc.). One example of an accelerator 2554 is the Intel® Data Streaming Accelerator (DSA). The accelerator 2554 is a device including circuitry to accelerate copy operations, data encryption, hash value computation, data comparison operations (including comparison of data in memory 2516 and/or memory 2518), and/or data compression. Examples for the accelerator 2554 include a USB device, PCI device, PCIe device, CXL device, UCIe device, and/or an SPI device. The accelerator 2554 also includes circuitry arranged to execute machine learning (ML) related operations (e.g., training, inference, etc.) for ML models. Generally, the accelerator 2554 is specially designed to perform computationally intensive operations, such as hash value computations, comparison operations, cryptographic operations, and/or compression operations, in a manner that is more efficient than when performed by the processor 2504 or processor 2506. Because the load of the computing architecture 2500 includes hash value computations, comparison operations, cryptographic operations, and/or compression operations, the accelerator 2554 greatly increases performance of the computing architecture 2500 for these operations.

The accelerator 2554 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 2554. For example, the accelerator 2554 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 2554 via a non-posted write (e.g., a deferred memory write (DMWr)). One example of an instruction that atomically submits a work descriptor to the shared work queue of the accelerator 2554 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 2554. The dedicated work queue may accept job submissions via commands such as the movdir64b instruction.

Various I/O devices 2560 and display 2552 couple to the bus 2572, along with a bus bridge 2558 which couples the bus 2572 to a second bus 2574 and an I/F 2540 that connects the bus 2572 with the chipset 2532. In one embodiment, the second bus 2574 is a low pin count (LPC) bus. Various input/output (I/O) devices couple to the second bus 2574 including, for example, a keyboard 2562, a mouse 2564 and communication devices 2566.

Furthermore, an audio I/O 2568 couples to second bus 2574. Many of the I/O devices 2560 and communication devices 2566 reside on the system-on-chip (SoC) 2502 while the keyboard 2562 and the mouse 2564 are add-on peripherals. In other embodiments, some or all the I/O devices 2560 and communication devices 2566 are add-on peripherals and do not reside on the system-on-chip (SoC) 2502.

FIG. 26 illustrates a block diagram of an exemplary communications architecture 2600 suitable for implementing various embodiments as previously described. The communications architecture 2600 includes various common communications elements, such as a transmitter, receiver, transceiver, radio, network interface, baseband processor, antenna, amplifiers, filters, power supplies, and so forth. The embodiments, however, are not limited to implementation by the communications architecture 2600.

As shown in FIG. 26, the communications architecture 2600 includes one or more clients 2602 and servers 2604. The clients 2602 and the servers 2604 are operatively connected to one or more respective client data stores 2608 and server data stores 2610 that can be employed to store information local to the respective clients 2602 and servers 2604, such as cookies and/or associated contextual information.

The clients 2602 and the servers 2604 communicate information between each other using a communication framework 2606. The communication framework 2606 implements any well-known communications techniques and protocols. The communication framework 2606 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 2606 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/2000/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 2602 and the servers 2604. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may choose to share personal data with different platforms to provide services that are more tailored to the users. In instances where the users choose not to share personal data with the platforms, the choices made by the users will not have any impact on their ability to use the services that they had access to prior to making their choice.

According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalisation tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

The following examples pertain to further embodiments, from which numerous permutations and configurations will be apparent.

An example of a computer-implemented method, comprises receiving (1800) a request associated with a first user identifier, ID, to interact with a networking application of a connections networking system; subsequent (1804) to the first user ID interacting with the networking application of the connections networking system: retrieving (1806) connections data associated with the first user ID, the connections data comprising one or more parameters for the first user ID; determining (1808) a connections entity group from a set of connections entity groups that is associated with the first user ID using the connections data, wherein the set of connections entity groups is generated by a machine learning model; determining (1810) a second user ID associated with the connections entity group using a set of common parameters from the one or more parameters for the first user ID and one or more parameters for the second user ID; and causing (1812) presentation of the second user ID on a graphical user interface, GUI of a client system as a candidate to interact with the networking application of the connections networking system.

The example method of any preceding example, comprising: determining a result of the first user ID interacting with the networking application of the connections networking system; selecting the connections entity group from the set of connections entity groups that is associated with the first user ID, the set of connections entity groups arranged in a sequential order; updating a position of the connections entity group within the sequential order of the set of connections entity groups based on the result; and causing presentation of the sequential order of the set of connections entity groups on the GUI.

The example method of any preceding example, comprising: generating a set of entity groups by a first machine learning model; and generating the set of connections entity groups based on the set of entity groups by a second machine learning model trained.

The example method of any preceding example, comprising: receiving a natural language query by a first large language model, LLM, of the first machine learning model; generating a candidate set of entity groups by the first LLM; generating feedback information for the candidate set of entity groups by a second LLM of the first machine learning model using a set of critique parameters for the second LLM; and generating the set of entity groups by the first machine learning model based on the candidate set of entity groups generated by the first LLM and the feedback information from the second LLM.

The example method of any preceding example, comprising sending a message to a client system associated with the second user ID to request an interaction with the networking application of the connections networking system with the first user ID.

The example method of any preceding example, such as examples 2 to 5, wherein the networking application is a gaming application.

The example method of any preceding example, comprising: receiving a game score for a game executed by the gaming application associated with the first user ID; generating a ranking score for the first user ID based on the game score; and causing presentation of a ranking of the first user ID of a leaderboard for the gaming application on the GUI.

The example method of any preceding example, comprising: receiving multiple game scores for multiple games executed by the gaming application associated with an entity from the connections entity group of the set of connection entity groups; generating a ranking score for the entity based on the multiple game scores; and ranking the entity on a leaderboard for the gaming application on the GUI.

The example method of any preceding example, comprising generating the ranking score for the entity based on the multiple game scores by multiplying a first weight parameter by an average game score for the multiple game scores to obtain a first intermediate value; multiplying a second weight parameter by a number of member IDs associated with the entity divided by a number of daily unique member IDs associated with the entity to obtain a second intermediate value; and adding the first intermediate value and the second intermediate value to generate the ranking score for the entity.

The example method of any preceding example, such as any of examples 6 to 9, comprising: generating a player pool for an entity of the connections entity group of the set of connections entity groups, the player pool comprising multiple user IDs representing users of the connections networking system associated with the entity; receiving connections data for the multiple user IDs; generating a set of player recommendations for the entity of the connections entity group by a third machine learning model based on the connections data and the multiple member IDs; and forming a player group for the entity of the connections entity group by a fourth machine learning model based on the set of player recommendations.

An example computing apparatus comprising: circuitry; and a memory storing instructions that, when executed by the circuitry, causes the circuitry to: receive (1802) a request associated with a first user identifier (ID) to interact with a networking application of a connections networking system; subsequent (1804) to the first user ID interact with the networking application of the connections networking system: retrieve (1806) connections data associated with the first user ID, the connections data comprising one or more parameters for the first user ID; determine (1808) a connections entity group from a set of connections entity groups that is associated with the first user ID using the connections data, wherein the set of connections entity groups is generated by a machine learning model; determine (1810) a second user ID associated with the connections entity group using a set of common parameters from the one or more parameters for the first user ID and one or more parameters for the second user ID; and cause presentation (1812) of the second user ID on a graphical user interface, GUI of a client system as a candidate to interact with the networking application of the connections networking system.

The example apparatus of any preceding example, the circuitry to: determine a result of the first user ID interacting with the networking application of the connections networking system; select the connections entity group from the set of connections entity groups that is associated with the first user ID, the set of connections entity groups arranged in a sequential order; update a position of the connections entity group within the sequential order of the set of connections entity groups based on the result; and cause presentation of the sequential order of the set of connections entity groups on the GUI.

The example apparatus of any preceding example, the circuitry to: generate a set of entity groups by a first machine learning model; and generate the set of connections entity groups based on the set of entity groups by a second machine learning model trained.

The example apparatus of any preceding example, the circuitry to: receive a natural language query by a first large language model (LLM) of the first machine learning model; generate a candidate set of entity groups by the first LLM; generate feedback information for the candidate set of entity groups by a second LLM of the first machine learning model using a set of critique parameters for the second LLM; and generate the set of entity groups by the first machine learning model based on the candidate set of entity groups generated by the first LLM and the feedback information from the second LLM.

The example apparatus of any preceding example, such as examples 12 to 14, the circuitry to send a message to a client system associated with the second user ID to request an interaction with the networking application of the connections networking system with the first user ID.

An example non-transitory computer-readable storage medium, the computer-readable storage medium including instructions that when executed by circuitry, cause the circuitry to: receive (1802) a request associated with a first user identifier, ID, to interact with a networking application of a connections networking system; subsequent (1804) to the first user ID interact with the networking application of the connections networking system: retrieve (1806) connections data associated with the first user ID, the connections data comprising one or more parameters for the first user ID; determine (1808) a connections entity group from a set of connections entity groups that is associated with the first user ID using the connections data, wherein the set of connections entity groups is generated by a machine learning model; determine (1810) a second user ID associated with the connections entity group using a set of common parameters from the one or more parameters for the first user ID and one or more parameters for the second user ID; and cause (1812) presentation of the second user ID on a graphical user interface, GUI, of a client system as a candidate to interact with the networking application of the connections networking system.

The example storage medium of any preceding example, comprising instructions that when executed by circuitry, cause the circuitry to: determine a result of the first user ID interacting with the networking application of the connections networking system; select the connections entity group from the set of connections entity groups that is associated with the first user ID, the set of connections entity groups arranged in a sequential order; update a position of the connections entity group within the sequential order of the set of connections entity groups based on the result; and cause presentation of the sequential order of the set of connections entity groups on the GUI.

The example storage medium of any preceding example, comprising instructions that when executed by circuitry, cause the circuitry to: generate a set of entity groups by a first machine learning model; and generate the set of connections entity groups based on the set of entity groups by a second machine learning model trained.

The example storage medium of any preceding example, comprising instructions that when executed by circuitry, cause the circuitry to: receive a natural language query by a first large language model, LLM, of the first machine learning model; generate a candidate set of entity groups by the first LLM; generate feedback information for the candidate set of entity groups by a second LLM of the first machine learning model using a set of critique parameters for the second LLM; and generate the set of entity groups by the first machine learning model based on the candidate set of entity groups generated by the first LLM and the feedback information from the second LLM.

The example storage medium of any preceding example, comprising instructions that when executed by circuitry, cause the circuitry to, comprising send a message to a client system associated with the second user ID to request an interaction with the networking application of the connections networking system with the first user ID.

What is claimed is:

1. A method, comprising:

receiving a request associated with a first user identifier (ID) to interact with a networking application of a connections networking system, wherein the first user ID represents a first user of the connections networking system;

generating, by a first machine learning model, a set of entity groups based on the request, wherein at least one of the entity groups comprises multiple related entities defined by a first set of rules;

generating, by a second machine learning model, a set of connections entity groups based on the set of entity groups generated by the first machine learning model, wherein a connections entity group comprises two or more related entities from the multiple related entities defined by a second set of rules;

retrieving connections data associated with the first user ID, the connections data comprising one or more parameters for the first user ID;

determining a connections entity group from the set of connections entity groups generated by the second machine learning model based on the first user ID using the connections data;

determining a second user ID of the connections entity group using a set of common parameters from the one or more parameters for the first user ID and one or more parameters for the second user ID, wherein the second user ID represents a second user of the connections networking system; and causing presentation of the second user ID on a graphical user interface (GUI) of a client system as a candidate to interact with the networking application of the connections networking system.

2. The method of claim 1, comprising:

determining a result of the first user ID interacting with the networking application of the connections networking system, wherein the result is a user score associated with the first user ID;

selecting the connections entity group from the set of connections entity groups that is associated with the first user ID, the set of connections entity groups arranged in a sequential order;

updating a position of the connections entity group within the sequential order of the set of connections entity groups based on the user score; and causing presentation of the sequential order of the set of connections entity groups on the GUI.

3. The method of claim 2, comprising:

collecting activity data associated with the second user ID representing interactions between the second user and the networking application of the connections networking system; and using a clustering technique for grouping the second user in the connections entity group of the first user based on the collected activity data.

4. The method of claim 1, comprising:

receiving a natural language query by a first large language model (LLM) of the first machine learning model;

generating a candidate set of entity groups by the first LLM;

generating feedback information for the candidate set of entity groups by a second LLM of the first machine learning model using a set of critique parameters for the second LLM; and generating the set of entity groups by the first machine learning model based on the candidate set of entity groups generated by the first LLM and the feedback information from the second LLM.

5. The method of claim 2, comprising sending a message to a client system associated with the second user ID to request an interaction with the networking application of the connections networking system with the first user ID.

6. The method of claim 2, wherein the networking application is a gaming application.

7. The method of claim 6, comprising:

receiving a game score for a game executed by the gaming application associated with the first user ID;

generating a ranking score for the first user ID based on the game score; and causing presentation of a ranking of the first user ID of a leaderboard for the gaming application on the GUI.

8. The method of claim 6, comprising:

receiving multiple game scores for multiple games executed by the gaming application associated with an entity from the connections entity group of the set of connection entity groups;

generating a ranking score for the entity based on the multiple game scores; and ranking the entity on a leaderboard for the gaming application on the GUI.

9. The method of claim 8, comprising generating the ranking score for the entity based on the multiple game scores by:

multiplying a first weight parameter by an average game score for the multiple game scores to obtain a first intermediate value;

multiplying a second weight parameter by a number of member IDs associated with the entity divided by a number of daily unique member IDs associated with the entity to obtain a second intermediate value; and adding the first intermediate value and the second intermediate value to generate the ranking score for the entity.

10. The method of claim 6, comprising:

generating a player pool for an entity of the connections entity group of the set of connections entity groups, the player pool comprising multiple user IDs representing users of the connections networking system associated with the entity;

receiving connections data for the multiple user IDs;

generating a set of player recommendations for the entity of the connections entity group by a third machine learning model based on the connections data and the multiple member IDs; and forming a player group for the entity of the connections entity group by a fourth machine learning model based on the set of player recommendations.

11. A computing apparatus comprising:

circuitry; and a memory storing instructions that, when executed by the circuitry, causes the circuitry to:

receive a request associated with a first user identifier (ID) to interact with a networking application of a connections networking system, wherein the first user ID represents a first user of the connections networking system;

generate, by a first machine learning model, a set of entity groups based on the request, wherein at least one of the entity groups comprises multiple related entities defined by a first set of rules;

generate, by a second machine learning model, a set of connections entity groups based on the set of entity groups generated by the first machine learning model, wherein a connections entity group comprises two or more related entities from the multiple related entities defined by a second set of rules;

retrieve connections data associated with the first user ID, the connections data comprising one or more parameters for the first user ID;

determine a connections entity group from the set of connections entity groups generated by the second machine learning model based on the first user ID using the connections data;

determine a second user ID of the connections entity group using a set of common parameters from the one or more parameters for the first user ID and one or more parameters for the second user ID, wherein the second user ID represents a second user of the connections networking system; and cause presentation of the second user ID on a graphical user interface (GUI) of a client system as a candidate to interact with the networking application of the connections networking system.

12. The computing apparatus of claim 11, the circuitry to:

determine a result of the first user ID interacting with the networking application of the connections networking system, wherein the result is a user score associated with the first user ID;

select the connections entity group from the set of connections entity groups that is associated with the first user ID, the set of connections entity groups arranged in a sequential order;

update a position of the connections entity group within the sequential order of the set of connections entity groups based on the result; and cause presentation of the sequential order of the set of connections entity groups on the GUI.

13. The computing apparatus of claim 12, the circuitry to:

collect activity data associated with the second user ID representing interactions between the second user and the networking application of the connections networking system; and use a clustering technique for grouping the second user in the connections entity group of the first user based on the collected activity data.

14. The computing apparatus of claim 11, the circuitry to:

receive a natural language query by a first large language model (LLM) of the first machine learning model;

generate a candidate set of entity groups by the first LLM;

generate feedback information for the candidate set of entity groups by a second LLM of the first machine learning model using a set of critique parameters for the second LLM; and generate the set of entity groups by the first machine learning model based on the candidate set of entity groups generated by the first LLM and the feedback information from the second LLM.

15. The computing apparatus of claim 12, the circuitry to send a message to a client system associated with the second user ID to request an interaction with the networking application of the connections networking system with the first user ID.

16. A non-transitory computer-readable storage medium, the computer-readable storage medium including instructions that when executed by circuitry, cause the circuitry to:

receive a request associated with a first user identifier (ID) to interact with a networking application of a connections networking system, wherein the first user ID represents a first user of the connections networking system;

generate, by a first machine learning model, a set of entity groups based on the request, wherein at least one of the entity groups comprises multiple related entities defined by a first set of rules;

generate, by a second machine learning model, a set of connections entity groups based on the set of entity groups generated by the first machine learning model, wherein a connections entity group comprises two or more related entities from the multiple related entities defined by a second set of rules;

retrieve connections data associated with the first user ID, the connections data comprising one or more parameters for the first user ID;

determine a connections entity group from the set of connections entity groups generated by the second machine learning model based on the first user ID using the connections data;

determine a second user ID of the connections entity group using a set of common parameters from the one or more parameters for the first user ID and one or more parameters for the second user ID, wherein the second user ID represents a second user of the connections networking system; and cause presentation of the second user ID on a graphical user interface (GUI) of a client system as a candidate to interact with the networking application of the connections networking system.

17. The computer-readable storage medium of claim 16, comprising instructions that when executed by circuitry, cause the circuitry to:

determine a result of the first user ID interacting with the networking application of the connections networking system, wherein the result is a user score associated with the first user ID;

select the connections entity group from the set of connections entity groups that is associated with the first user ID, the set of connections entity groups arranged in a sequential order;

update a position of the connections entity group within the sequential order of the set of connections entity groups based on the result; and cause presentation of the sequential order of the set of connections entity groups on the GUI.

18. The computer-readable storage medium of claim 17, comprising instructions that when executed by circuitry, cause the circuitry to:

collect activity data associated with the second user ID representing interactions between the second user and the networking application of the connections networking system; and use a clustering technique for grouping the second user in the connections entity group of the first user based on the collected activity data.

19. The computer-readable storage medium of claim 16, comprising instructions that when executed by circuitry, cause the circuitry to:

receive a natural language query by a first large language model (LLM) of the first machine learning model;

generate a candidate set of entity groups by the first LLM;

generate feedback information for the candidate set of entity groups by a second LLM of the first machine learning model using a set of critique parameters for the second LLM; and generate the set of entity groups by the first machine learning model based on the candidate set of entity groups generated by the first LLM and the feedback information from the second LLM.

20. The computer-readable storage medium of claim 17 instructions that when executed by circuitry, cause the circuitry to, comprising send a message to a client system associated with the second user ID to request an interaction with the networking application of the connections networking system with the first user ID.

* * * * *